United States Patent [19]

MeLampy et al.

[11] Patent Number: 5,515,422
[45] Date of Patent: May 7, 1996

[54] AUTOMATED ATTENDANT FOR ANY COMBINATION OF PBX, CENTREX AND SINGLE-LINE TELEPHONES

[75] Inventors: Patrick J. MeLampy, Beverly; Christopher R. Sklarin, Arlington; Scott A. Jones, Prides Crossing, all of Mass.

[73] Assignee: Boston Technology, Inc., Wakefield, Mass.

[21] Appl. No.: 385,092

[22] Filed: Feb. 3, 1995

Related U.S. Application Data

[63] Continuation of Ser. No. 872,242, Apr. 23, 1992, Pat. No. 5,402,472.

[51] Int. Cl.[6] .............................. H04M 3/50; H04M 3/58
[52] U.S. Cl. .................. 379/67; 379/69; 379/84; 379/212; 379/214; 379/233
[58] Field of Search .............................. 379/201, 210, 379/212, 213, 214, 218, 216, 265, 266, 67, 69, 84, 88, 89

[56] References Cited

U.S. PATENT DOCUMENTS

| | | | |
|---|---|---|---|
| 4,696,028 | 9/1987 | Morganstein et al. | 379/88 |
| 4,757,267 | 7/1988 | Riskin | 379/113 |
| 4,783,796 | 11/1988 | Ladd | 379/67 |
| 4,809,321 | 2/1989 | Morganstein et al. | 379/211 |
| 4,825,460 | 4/1989 | Carter et al. | 379/67 |
| 4,879,743 | 11/1989 | Burke et al. | 379/142 |
| 4,922,526 | 5/1990 | Morganstein et al. | 379/157 |
| 4,926,462 | 5/1990 | Ladd et al. | 379/67 |
| 4,935,956 | 6/1990 | Hellwarth et al. | 379/112 |
| 4,955,047 | 9/1990 | Morganstein et al. | 379/112 |
| 4,975,941 | 12/1990 | Morganstein et al. | 379/88 |
| 5,020,095 | 5/1991 | Morganstein et al. | 379/67 |
| 5,027,384 | 6/1991 | Morganstein | 379/67 |
| 5,029,196 | 7/1991 | Morganstein et al. | 379/67 |
| 5,099,509 | 3/1992 | Morganstein et al. | 379/84 |
| 5,109,405 | 4/1992 | Morganstein et al. | 379/89 |
| 5,113,429 | 5/1992 | Morley, Jr. et al. | 379/88 |
| 5,155,761 | 10/1992 | Hammond | 379/67 |
| 5,159,626 | 10/1992 | Baum et al. | 379/67 |
| 5,163,080 | 11/1992 | Amoroso et al. | 379/33 |
| 5,199,062 | 3/1993 | Von Meister et al. | 379/67 |
| 5,303,298 | 4/1994 | Morganstein et al. | 379/67 |

FOREIGN PATENT DOCUMENTS

| | | |
|---|---|---|
| 0429770A2 | 6/1991 | European Pat. Off. . |
| 0429770A3 | 6/1991 | European Pat. Off. . |

OTHER PUBLICATIONS

European Search Report, Jul. 6, 1994, No. EP 93303134.

*Primary Examiner*—Thomas W. Brown
*Attorney, Agent, or Firm*—Staas & Halsey

[57] ABSTRACT

An automated attendant service supports any combination of single-line telephones, CENTREX telephones and one or more PBX in a single logical configuration. Multiple access numbers can be used to call the automated service and calls forwarded from DID lines can also be handled. The appropriate transfer codes are determined for the switch connecting a caller to the automated attendant service. Subscribers to the automated attendant service may be connected via different types of switches using different call progress signals. Analysis of the call progress signals is performed using parameters specific to the switch used for each call to an extension. The types of transfers supported by the automated attendant service include screened calls in which the caller is prompted to give a name provided identification. The name given by the caller may be stored, together with the time of the call and the phone number of the caller, so that a subscriber may return calls even if the caller does not leave a message.

17 Claims, 52 Drawing Sheets

FIG. 4A

```
                  Boston Technology CO ACCESS: bt002m01          1 of 1
   Action:  CREATE            QuickACCESS
                         Switch Configuration Screen
Name of centrex/PBX:  centrex2

Transfer start:        fh
 Transfer complete:
 RNA pullback:          fh*1
 Busy pullback:         fh*1
 Tie line pullback:

Transfer types         Transfer Type Status    CAP file to use
  Blind                      enabled             generic
  Monitor                    enabled             generic
  Busy monitor               enabled             generic
  Screened                   enabled             generic
  Announce called party      enabled             generic
  Called party screen        enabled             generic
```
Type enable or disable for this transfer type.

Use <TAB> to move between fields. <F10> for options. <F10><F10> for field help.
<F9> for screen help. <Ctrl>Z to save data. <Ctrl>g to abort.

FIG. 4B

```
Class of service: 5  Boston Technology CO ACCESS: bt002m01        1 of 1
                            QuickACCESS
                        Class of Service Settings
Name of COS:  small businesses Specifications                      COS assignments
  Max num announcements:    60      Define keys:             enabled
  Max announcement len:     60      Special announcements:   enabled
  Max num subscribers:      20      Change defaults:         enabled
  Greeting type:           B/RNA    Personal operator:       enabled
                                    Directory services:      enabled
                                    Do not disturb:          enabled
                                    Alternate ext:           enabled
                                    Modify ext:              enabled
                                    Extension specs:         enabled
```
Type a name for this service class.

Use <TAB> to move between fields. <F10> for options. <F10><F10> for field help.
<F9> for screen help. <Ctrl>Z to save data. <Ctrl>g to abort.

FIG. 4C

```
Acct num: test/1      Boston Technology CO ACCESS: bt002m01    1 of 1
                             QuickACCESS
                    Extension Specification Matrix (ESM)
 Starting Ending Subscriber  Default    Default sub  Ac Cn  Centrex/
   ext    ext   acct spec   voicemail acct telephone num Rt Tp  PBX name
   1230   1230  617/231....  617/231....   231....    U>  N>  Rolm
  ┌─────────────────────────────────────────────┐    U>  N>  Rolm
  │            ADD ESM ENTRY                    │    U>  N>  Rolm
  │                                             │    U>  N>  Rolm
  │  Starting ext:         ░░░░░░░              │    U>  N>  Rolm
  │  Ending ext:                                │    U>  N>  Rolm
  │  Sub acct specification: _____           │
  │  Default voicemail acct: _____           │
  │  Default sub phone num:  _____           │
  │  Access rights:          _____           │
  │  Connection type:        _____           │
  │  Centrex/PBX name:       _____           │
  │  Press ^Z to save; ^g to abort this action  │
  └─────────────────────────────────────────────┘

<FILL-IN>
         Use <F11> to page back, <F12> to page ahead.
              <Ctrl>z to save changes, <Ctrl>g to Abort
```

FIG. 4D

```
              Boston Technology CO ACCESS Series: bt002m01    1 of 2
  Acct num: vml/new             QuickACCESS
  Action: EDIT              Default Account Settings Company name:   vml
  Address:

City:                             State:      Zip code:
  Billing code:

Class of service:       2         Incoming Trunk Groups:  1-29
  Hide ext. in directory: enabled
  Initial digit timeout:  3
  Interdigit timeout:     3
  Name silence time:      3
  Hold time:              30        B/RNA call action scenario: 4
  Transfer annoucement:   Sil-ext   Descriptive Text:
  Transfer type:          Blind     Always plays the busy or RNA greeting
  Rings before NA:        3         if available, or plays the call status.
                                    This is followed by the announcement,
                                    which is always played.

Type a name for this service account.
  Use <TAB> to move between fields. <F10> for options. <F10><F10> for field help.
       <F9> for screen level help. <Ctrl-v> or <PgDn> for next page.
```

FIG. 4E

```
           Boston Technology CO ACCESS Series: bt002m01        2 of 2
Acct num: vm1/new              QuickACCESS
Action: EDIT               Default Account Settings
```

| Access telephone nums | Switch  | Administrative mailboxes |
|---|---|---|
| 617/6669999 | Centrex | 617/6669998 |

Enter a phone number, or press <F1> to edit admin. mailboxes.
Use <TAB> to move between fields. <F10> for options. <F10><F10> for field help.
  <F9> for screen help. <Ctrl-^> or <PgUp> for previous page.

FIG. 4F

```
           Boston Technology CO ACCESS Series: bt002m01        1 of 1
Acct num: vml/new              QuickACCESS
Action: EDIT               Subscriber Administration
Subscriber ext: 0400               Voice messaging: disabled
```

| Subscriber name: | Hugh Winter | | |
|---|---|---|---|
| Do not distrub: | disabled | Alternate ext: | default |
| Hide ext in direcctory: | enabled | Mailbox num: | <Use default> |
| Transfer announcement: | sil-ext | Passcode: | xxxxxxxxx |
| Transfer type: | blind | Language: | english |
| Rings before NA: | 3 | Mailbox init: | disabled |

Directory entries
Last name:
first name:

B/RNA call action scenario: 3
Descriptive text:
Always plays the status for every      Personal operator
attempt that fails. The current busy   Extension:
or RNA announcement is always played.  Start time:    00:00
Greetings are never played.            End time:      00:00

Type the name of the subscriber for this extension.
Use <TAB> to move between fields. <F10> for options. <F10><F10> for field help.
  <F9> for screen help. <Ctrl>z to save data. <Ctrl>g to abort.

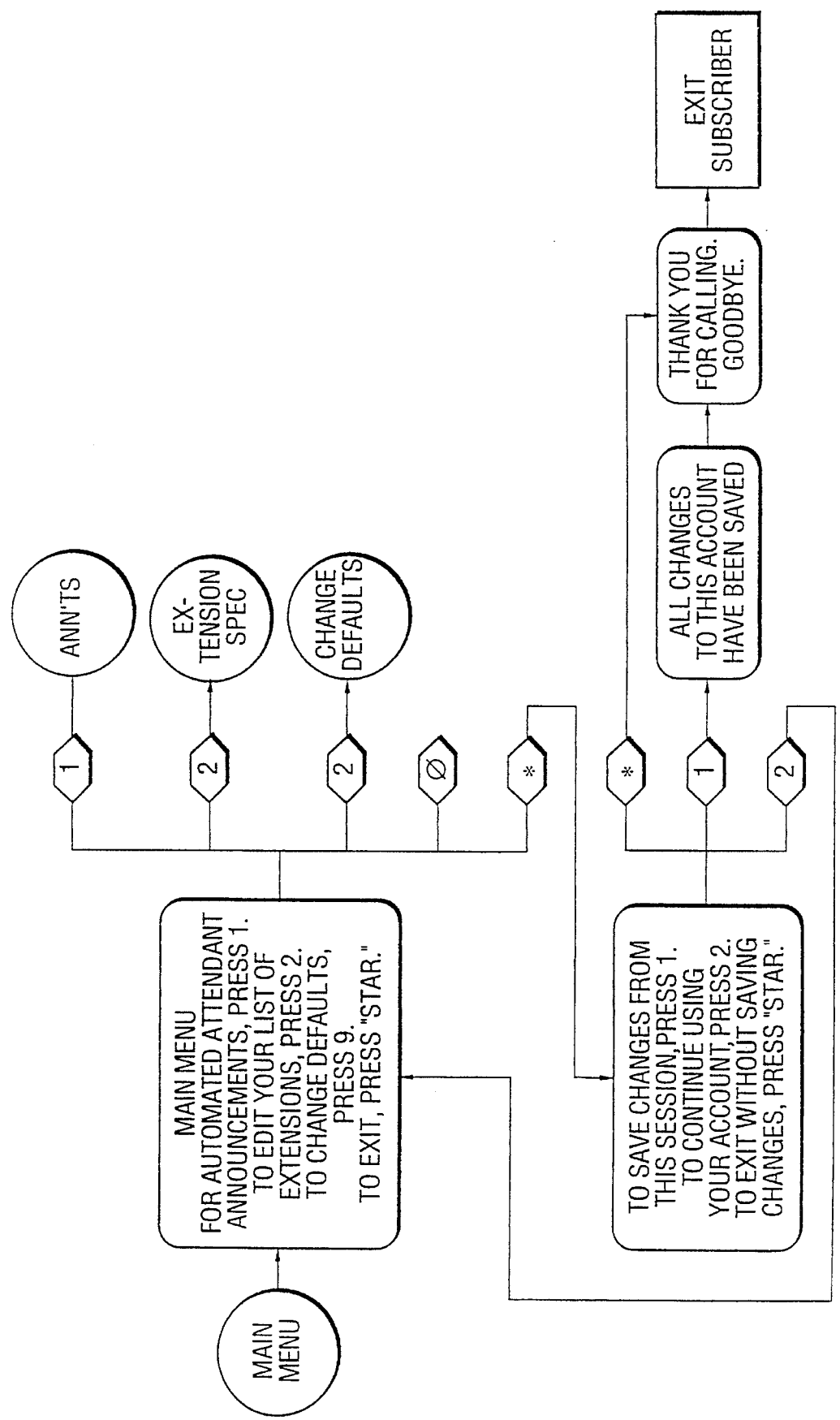

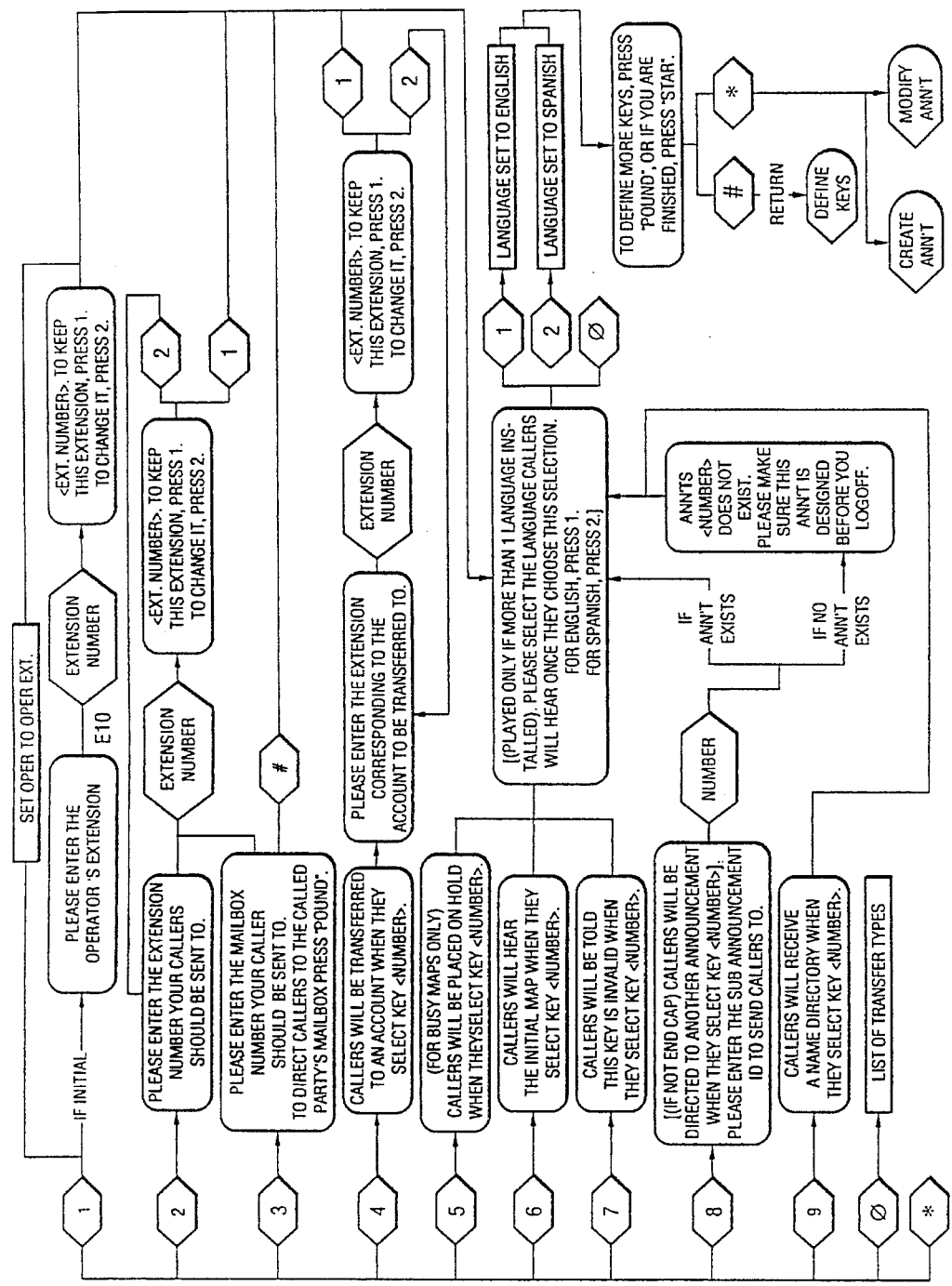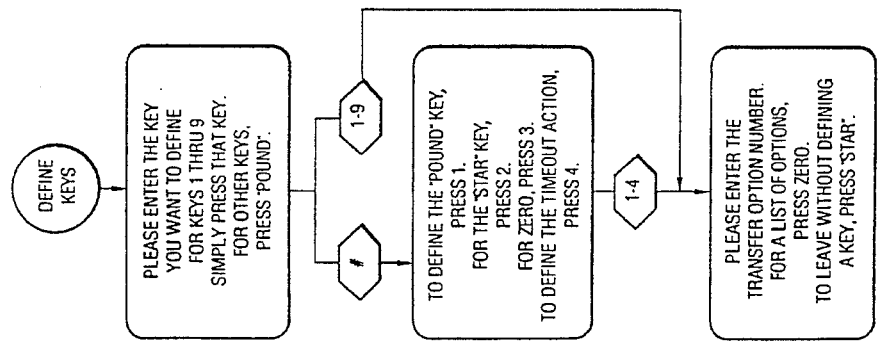
FIG. 51

1

AUTOMATED ATTENDANT FOR ANY COMBINATION OF PBX, CENTREX AND SINGLE-LINE TELEPHONES

This application is a continuation of application Ser. No. 07/872,242, filed Apr. 23, 1992, now U.S. Pat. No. 5,402,472.

BACKGROUND OF THE INVENTION

1. Field of the Invention

The present invention is directed to an information services system accessed via telephone and, more particularly, to an information services system providing automated attendant services for subscribers, regardless of how the subscribers are connected to the public switched telephone network.

2. Description of the Related Art

There are presently many types of computer systems which automatically interact with people via a conventional telephone. One type of system performs functions similar to a telephone receptionist, including routing calls to extensions, trying more than one extension, taking messages, etc. This type of service will be referred to as an "automated attendant service".

A known computer system used to provide an automated attendant service is connected between a private business exchange (PBX) and a central office (CO) of the public switched telephone network (PSTN). When programmed by a user of the PBX, the system intercepts calls from the CO to a line of the PBX, requests an extension number and routes the call in accordance with previously stored instructions for calls to that extension number. When a person is reached, the call is placed through the system and the PBX. This enables the automated attendant service to again pick up if only one of the caller and the called party break the connection later, but requires a large number of ports to handle several calls to different extensions simultaneously. In addition, other services, such as voice mail, are provided by the same system, but typically there is little information passed by the automated attendant service to other services provided on the same system. Due to the position of this known system (between a CO and a PBX) the system can work closely with the PBX, but is limited to serving the PBX and by the capacity of the PBX.

SUMMARY OF THE INVENTION

An object of the present invention is to provide an automated attendant service using a system which can set up an unlimited number of telephone calls to extensions.

Another object of the present invention is to provide an automated attendant service for any type of telephone, including CENTREX and single-line phones.

A further object of the present invention is to provide an automated attendant service flexible enough to connect a caller to a single-line telephone and to extensions on different PBXs.

A still further object of the present invention is to integrate an automated attendant service provided by an information services system with other services provided by the information services system.

Yet another object of the present invention is to store information obtained from telephone callers when a called party is not reached, even if the caller does not leave a message.

The above objects are attained by providing a method of automatically answering telephone calls for subscribers of an automated attendant service, comprising the steps of: obtaining an extension number from a caller using an audio menu to prompt input of the extension number; signaling a first physical switch connecting the caller to the automated attendant service to place the caller on hold; and calling the extension number input by the caller. If the called party answers the call and an indication is received to connect the caller to the called party, the caller is directly connected to the extension number and all connection to the system providing the automated attendant service is severed. This enables a system according to the present invention to make simultaneous connections for as many calls as supported by the central office and for subscribers with any kind of phone including CENTREX and single-line phones. If the called party is not connected to the caller, a failed call procedure is performed.

In the preferred embodiment, subscribers to the automated attendant service may select from a plurality of transfer types, including a screened transfer. In a screened transfer the caller is prompted to speak a name to provide identification of the caller. The response to the prompt is temporarily stored and if a called party is reached, the automated attendant service reproduces the response. If the caller is not connected to the called party, the response may be stored, together with the time of the call, and if available, the caller's telephone number. In addition, if the caller leaves a message, the message is also stored.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIGS. 4A–4F are sample screens used for administration by system administrators of an information services system in the maintenance of an automated attendant service;

DESCRIPTION OF THE PREFERRED EMBODIMENTS

Figure 1:
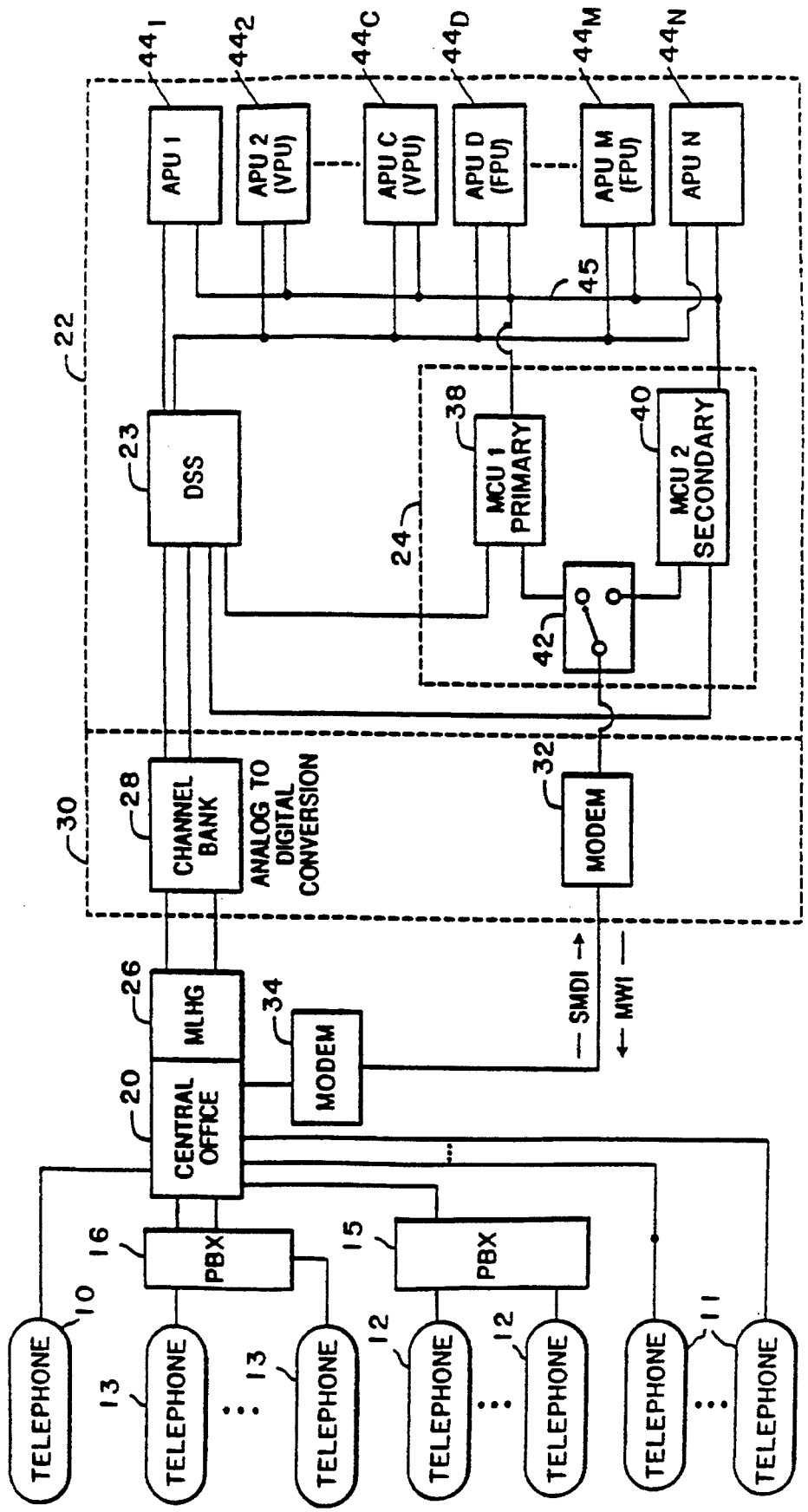
FIG. 1 is a block diagram of an information services system according to the present invention connected via a central office and other switches to telephones.

Before describing the operation of an automated attendant service according to the present invention, an information services system capable of providing automated attendant services will be described. As illustrated in FIG. 1, telephones 10–13 are connected, directly or via PBX's 15, 16 to a central office 20 in the public switched telephone network (PSTN). As described in U.S. Pat. Nos. 5,029,199 and 5,193,110 which are assigned to Boston Technology, Inc. and are both incorporated herein by reference, the central office 20 is also connected to an information services system 22. The information services system or platform 22 includes a digital switching system (DSS) 23 controlled by a control unit 24. The DSS 23 is connected to the central office 20 via multi-line hunt group (MLHG) 26. If the central office 20 is a digital central office, the DSS 23 can be connected directly to the MLHG 26. If the central office 20 is an older analog central office, a channel bank 28 is provided in an analog-to-digital conversion unit 30 to connect the DSS 23 to the MLHG 26. In addition to voice band signaling, the central office 20 typically provides information via a protocol, such as the simplified message desk interface (SMDI), between a modem 32 in analog-to-digital conversion unit 30 and a modem 34 for the central office 20.

The control unit 24 preferably includes at least two master control units (MCUs) 38, 40. As described in U.S. Pat. No. 5,029,199, only one MCU has control of the DSS 23 at any given time. A switch 42 is illustrated indicating which MCU has control of the system, although a physical switch 42 may not be present. The services of the information services platform 22 are provided by application processing units (APUs) 44 which are connected to each other and to the MCUs 38, 40 via an internal bus 45, such as an ETHERNET network. An APU 44 may be dedicated to a specific function, such as voice processing or facsimile processing, or may be multipurpose units, such as $APU_1$ $44_1$ and $APU_n$ $44_n$. All of the APUs 44 are connected to the DSS 23 via a digital line, such as a T1 line.

Figure 2:
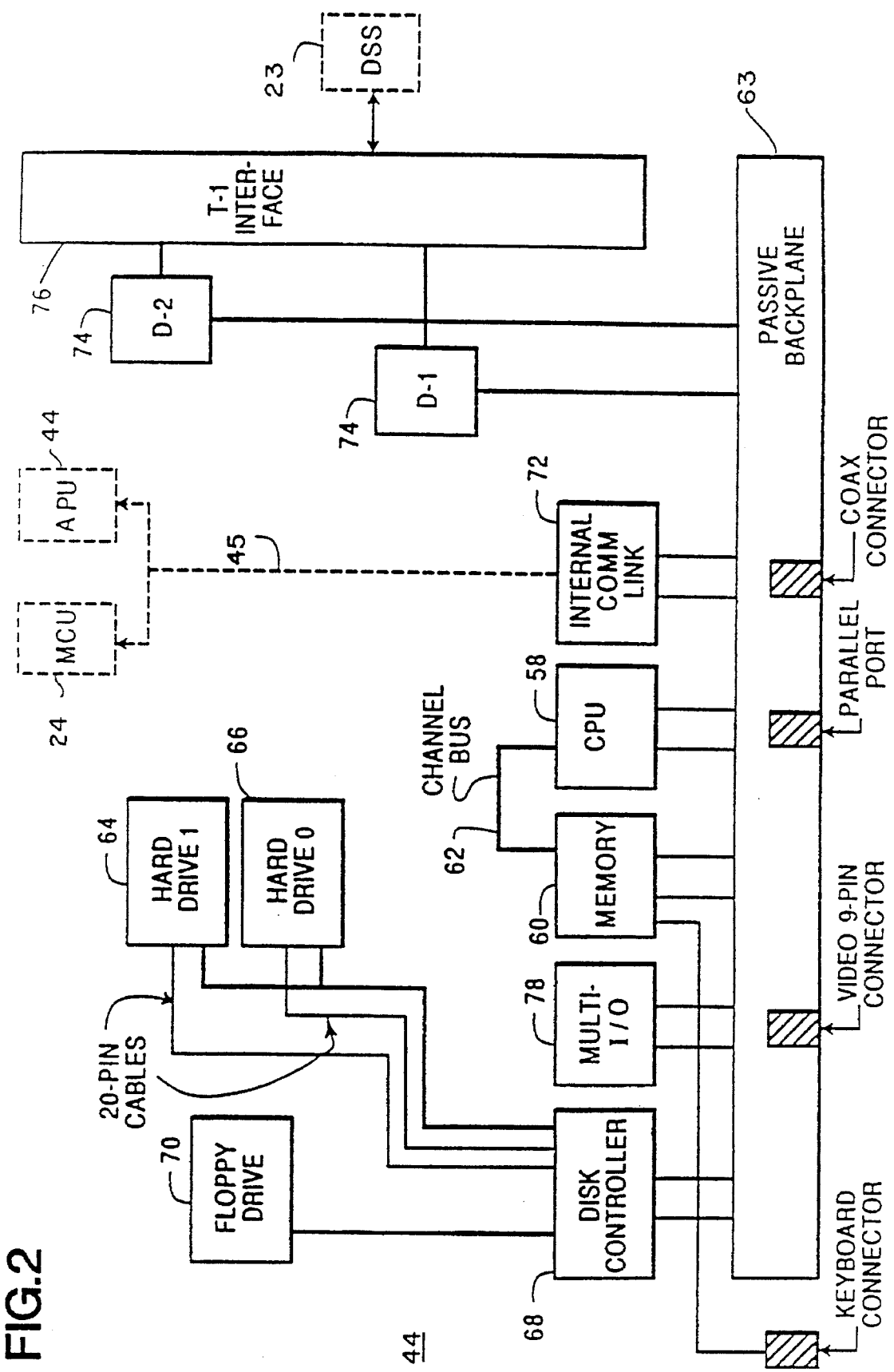
FIG. 2 is a block diagram of an application processing unit in the information services system of FIG. 1.

An example of an application processing unit 44 is illustrated in FIG. 2. A central processing unit (CPU) 58, such as an INTEL 80386, is connected to a memory 60 via a conventional 32 channel bus 62. Connections to other devices within an APU 44 are provided by a passive backplane 63. These devices include hard drives 64, 66 connected to a disk controller 68 which also controls a floppy drive 70. An internal communication link 72 such as an ETHERNET communication link, connects the APU 44 to other processors in the platform 22, such as the MCUs 38, 40 in the control unit 24 and other APUs 44. Digital ports 74 connect the passive backplane 63 to the digital switching system 23 via a telephone communication standard T1 interface 76. The digital ports 74 may be provided by line cards which include DTMF signal detection and generation, such as Model No. D/41 from DIALOGIC Corp. of Parsippany, N.J. Other input and output may be provided by multi-I/O unit 78. All the components in an APU 44 may be conventional, as disclosed in U.S. patent application Ser. No. 07/594,648.

The platform 22 illustrated in FIG. 1 can be used to provide many types of information services. Voice mail processing is described in detail in U.S. Pat. No. 5,029,199. At the same time, one to all of the APUs 44 may be operated under the control of the control unit 24 to provide an automated attendant service for one or more groups of subscribers. An automated attendant service according to the present invention is capable of servicing any combination of single-line telephones 10, CENTREX telephones 11 and telephones 12, 13 connected to a central office 20 via one or more PBX 15, 16. To simplify terminology, all telephones used by subscribers of an automated attendant service according to the present invention will be referred to as having an extension number, even though single-line telephones 10 and CENTREX telephones 11 are not extensions.

Figure 3:
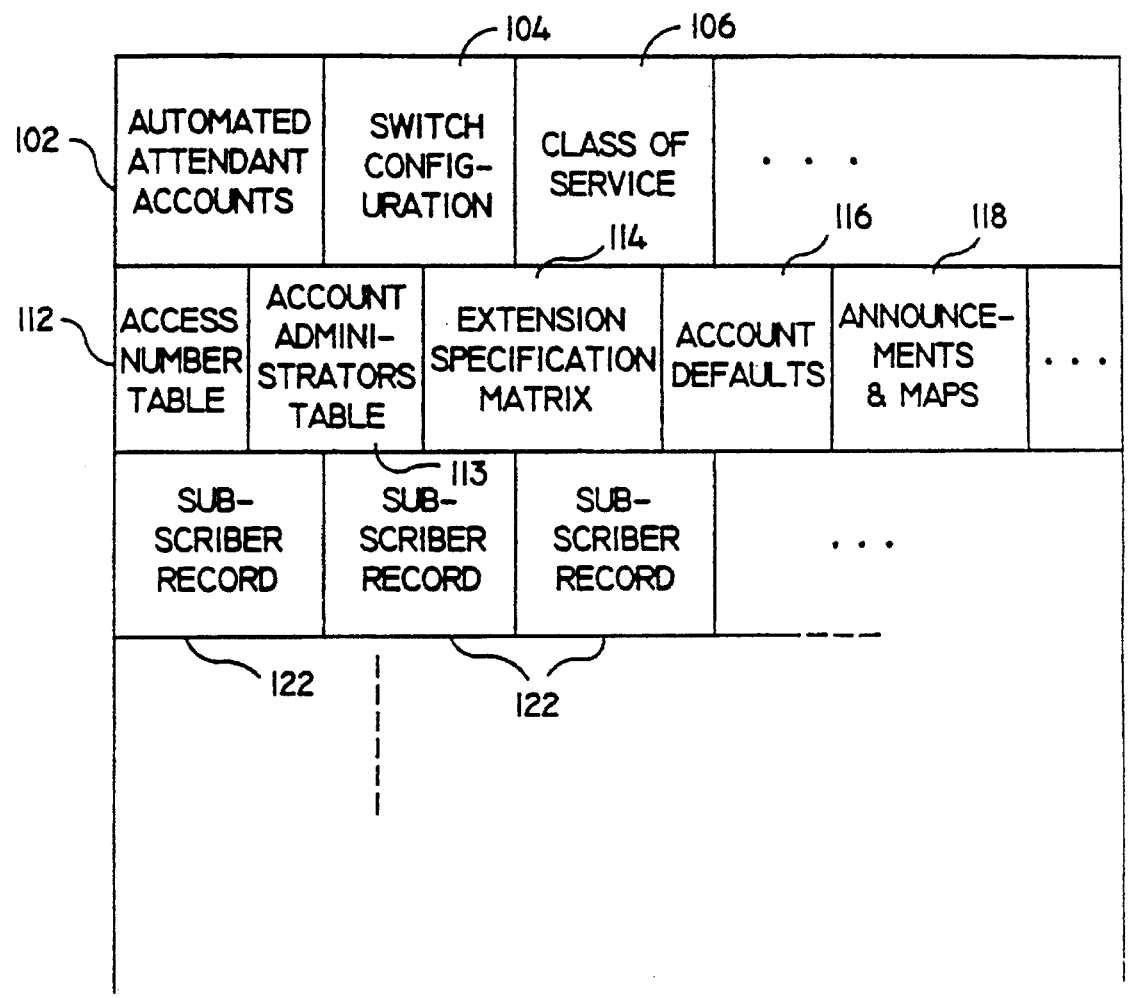
FIG. 3 is a data structure diagram of data used in an automated attendant service according to the present invention.

The flexibility of an automated attendant service according to the present invention is made possible by the information which is stored in a database. A portion of the administration database of the information services system is illustrated in FIG. 3. The most important types of data used to provide automated attendant services is illustrated in FIG. 3, but other data required to support other services are not illustrated.

In a database maintained in the control unit 24 are user records which exist and correspond for every telephone number provided with any type of service. A user record includes a number of flags indicating the options accessible to the associated user. The flags include a flag indicating whether the telephone number corresponding to that user record is provided with an automated attendant service, whether the user record represents a site manager and whether the user record represents an access number of an automated attendant account.

Illustrated in FIG. 3 are system level records defining automated attendant services provided in the preferred embodiment. A list of automated attendant accounts 102 includes records containing an account identifier and information regarding who is responsible for the account. Typically, this information will include a company name and may include other information, such as address, password(s) for access to the account, billing type, etc. Much of this information may appear in a single file, or in other files which are referenced using the account identifier or the company name.

In addition to the basic account information 102, other data which may be used in any automated attendant account is also included at this level. In the preferred embodiment, switch configuration data 104 is provided to enable more than one PBX, CENTREX lines and single-line telephones to be serviced by a single automated attendant service. The switch configuration data 104 includes a physical switch type, e.g., CENTREX2 or ROLM, transfer codes that are used in signalling the switch and call progress identification data. When a line card from DIALOGIC provides the digital ports 74 in the APUs 44, the line card interprets call progress signals, e.g., ringback, busy, etc. Since different switches may produce slightly different call progress signals, DIALOGIC cards are programmable using call analysis parameters which tailor the call analysis progress signal monitoring to the signals produced by a physical switch type. The call progress identification data in the switch configuration data 104 identifies a file of call analysis parameters to be used by the DIALOGIC card. Other programmable call progress monitoring systems can be controlled in a similar manner.

In the preferred embodiment, automated attendant services are tailored to the subscribers. While this could be done on an account-by-account basis, there are likely to be several accounts which will have the same configuration or class of service. Therefore, class of service settings 106 are preferably defined at a high level, so that accounts can be set up with any of the defined classes of service.

Below the data 102, 104, 106 which refer to many automated attendant accounts in FIG. 3 appear data for an individual automated attendant account. An access number table 112 includes at least one access number used to directly call the automated attendant service and a switch identifier indicating the physical switch type used for transfers from that access number. In other words, access numbers are telephone numbers that a caller from, e.g., telephone 10 (FIG. 1) can dial which are routed by the central office 20 to the information services platform 22 in a process described below. In most cases, the call will be routed directly through the central office 20 and the physical switch type will therefore be CENTREX. However, under certain circumstances, described below, the switch used for transfer operations of the caller's line would be a PBX. Since the access number is used to point to a specific automated attendant service, each access number in the access number table 112 is unique to that automated attendant service and will not appear in the access number table of any other automated attendant account.

Just as the access number table 112 has a field which identifies the physical switch type for incoming calls, an extension specification matrix (ESM) 114 has a field which identifies the physical switch type for outgoing calls transfers. The extension specification matrix 114 correlates extension numbers to several data fields, including telephone numbers and at least one switch identifier. As illustrated in FIG. 4C, the extension specification matrix 114 preferably uses ranges of starting and ending extensions and digits to be prepended to the extension to form a telephone number or other address. The extension specification matrix 114 of the preferred embodiment of the invention includes a subscriber account number and a default voice mail account in addition to the telephone number that must be dialed by the automated attendant service to reach the extension. Also, codes indicating access rights and connection type are included. The access rights code indicates the level of security required to make changes to a particular entry in the extension specification matrix 114. The connection type code indicates whether the extension is connected using the central office or PBX, or whether a tie line is used. The switch identifier is used to select one of the records in the switch configuration 104. The information obtained from the selected record is used for call analysis during call transfers to an extension in a row of the extension specification matrix 114.

The present invention supports multi-divisional automated attendant services for a single company. Each division may have a different automated attendant service account, accessed via a different telephone number with a different greeting. However, it is commonly desirable to permit callers to request an extension in another division. Therefore, the extension numbers and other addresses in the extension specification matrix 114 for one automated attendant service account may appear in another extension specification matrix 114 for another automated attendant service account.

Typically, most subscribers to an automated attendant service will use similar features. To simplify setting up subscriber records (described below with reference to FIG. 4F), account default settings 116 are established for each account.

As illustrated in FIG. 4D, the account defaults 116 preferably include class of service and how the automated attendant will respond to a failed call to an extension. The class of service corresponds to one of the classes of service 106 specified for all automated attendant accounts on the information services platform 22. A busy/ring-no-answer (B/RNA) call action scenario identifies how the automated attendant service will respond when a busy signal or no answer after a predetermined number of rings is received from a called extension. Examples of call action scenarios will be discussed below with reference to FIGS. 4F and 7G–7J. Other fields include the number of rings which must be received before a ring-no-answer will be determined, the type of transfer used to call extensions, whether an announcement is used in making a transfer, etc.

There are many types of announcements and prompts used by an automated attendant service. Many of these will be discussed below as the operation of an automated attendant service is described with reference to FIGS. 7A–7J. Generally speaking in the preferred embodiment there are seven types of announcements: welcome, initial, busy, ring-no-answer, end, emergency and subannouncements. Announcement maps are used to indicate the procedure(s) associated with each announcement recording.

Figure 7A:
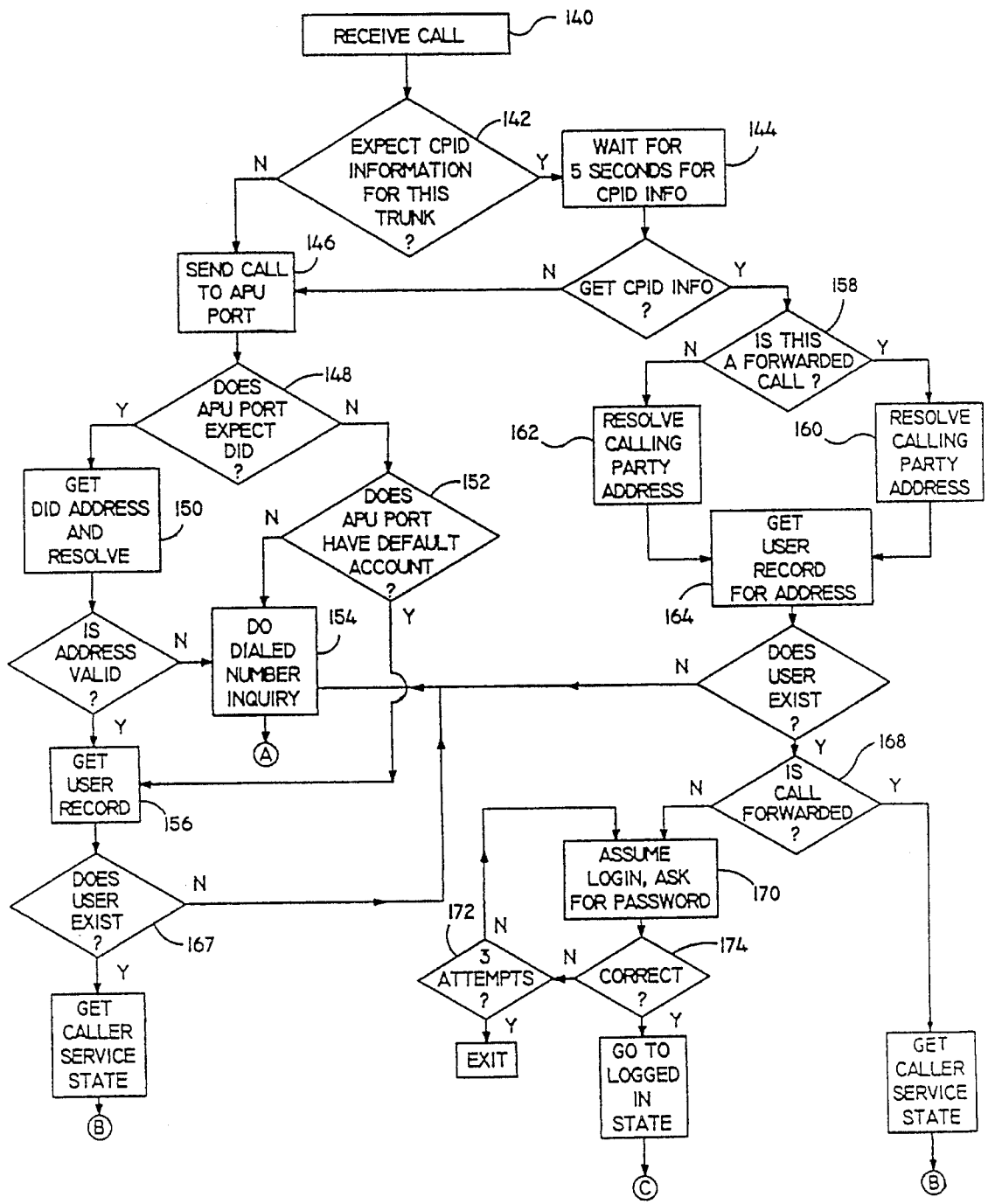
FIGS. 7A–7J are flowcharts for a caller interface in an automated attendant service according to the present invention.
Figure 7B:
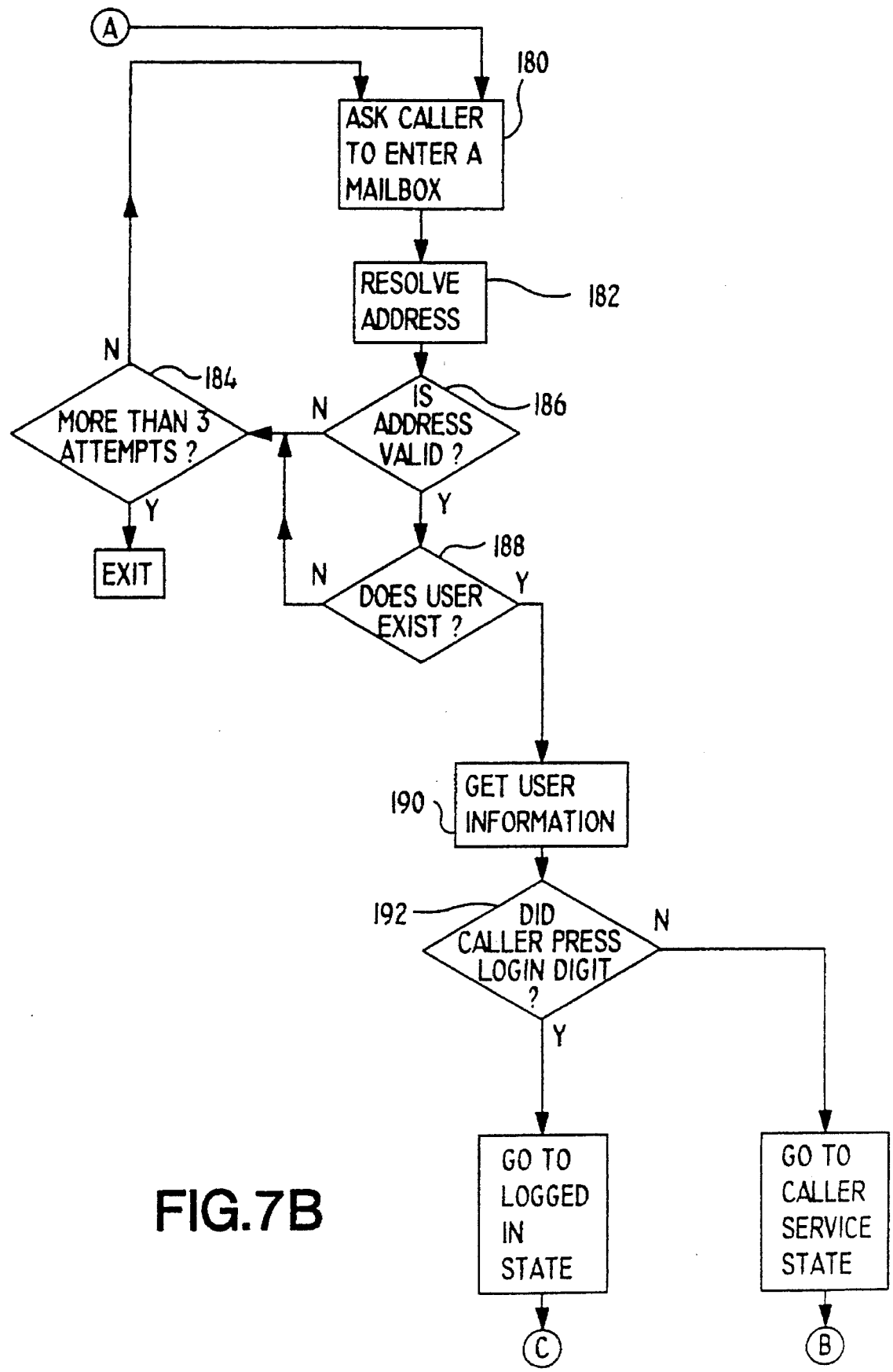
Figure 7C:
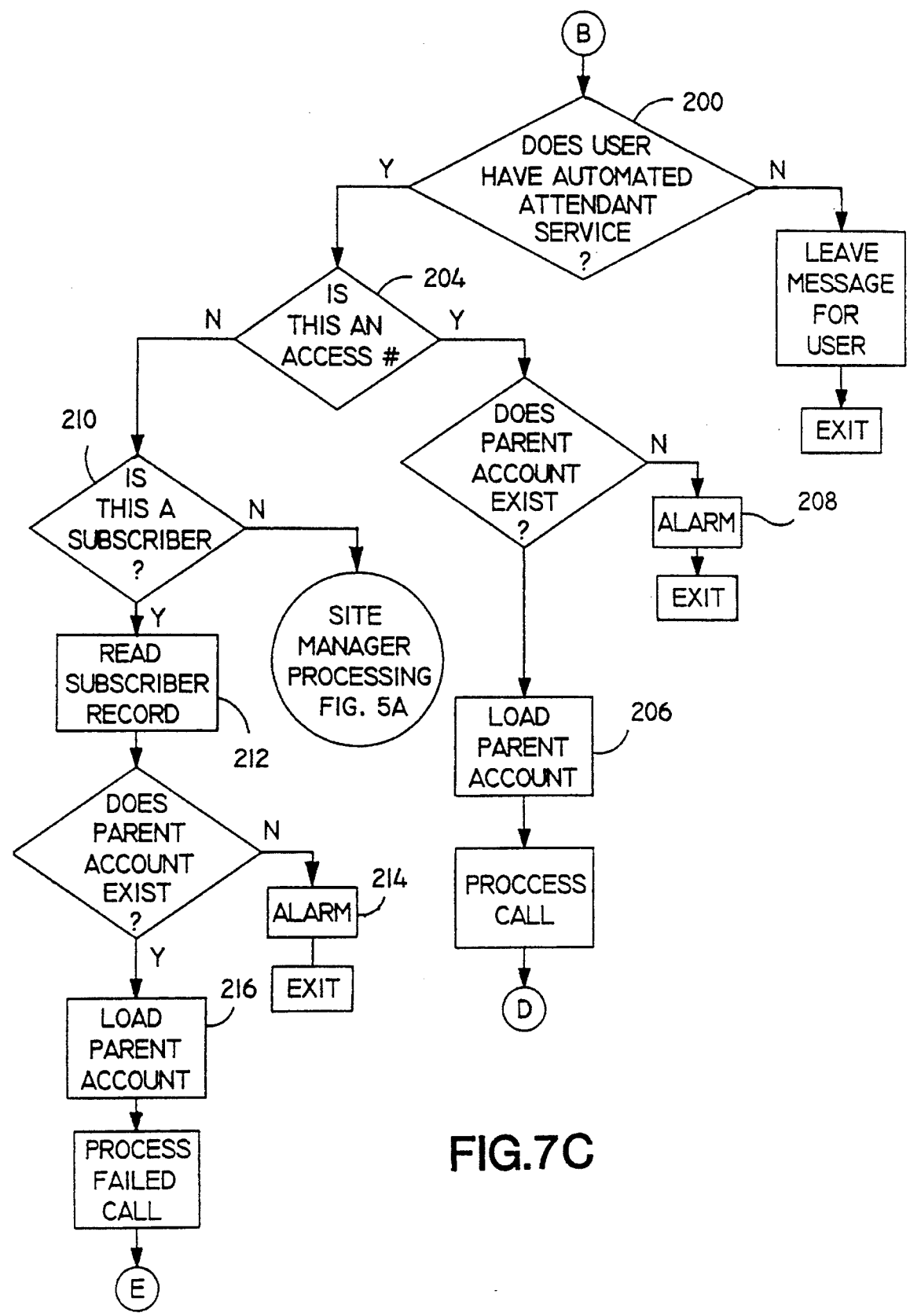
Figure 7D:
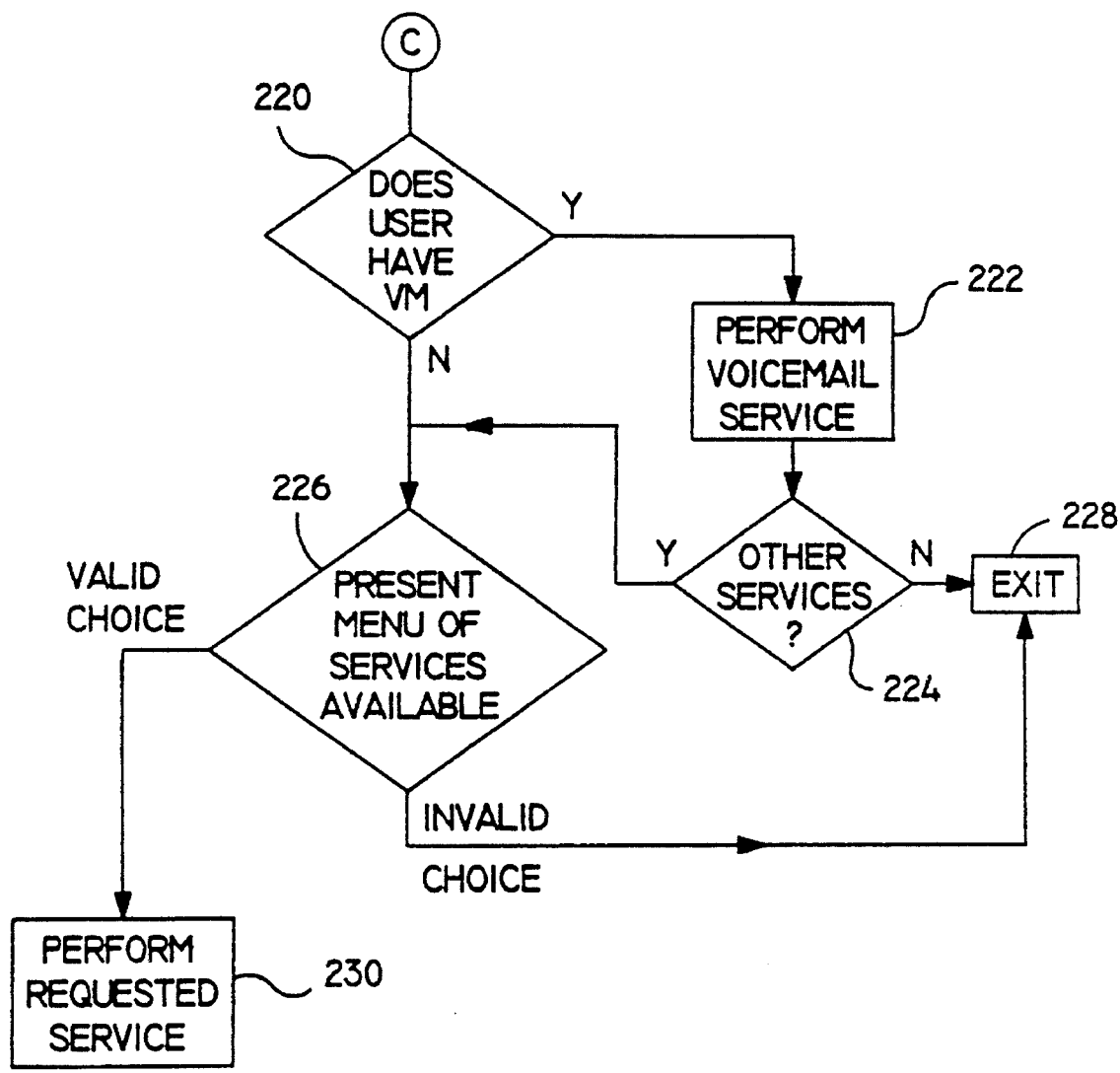
Figure 7E:
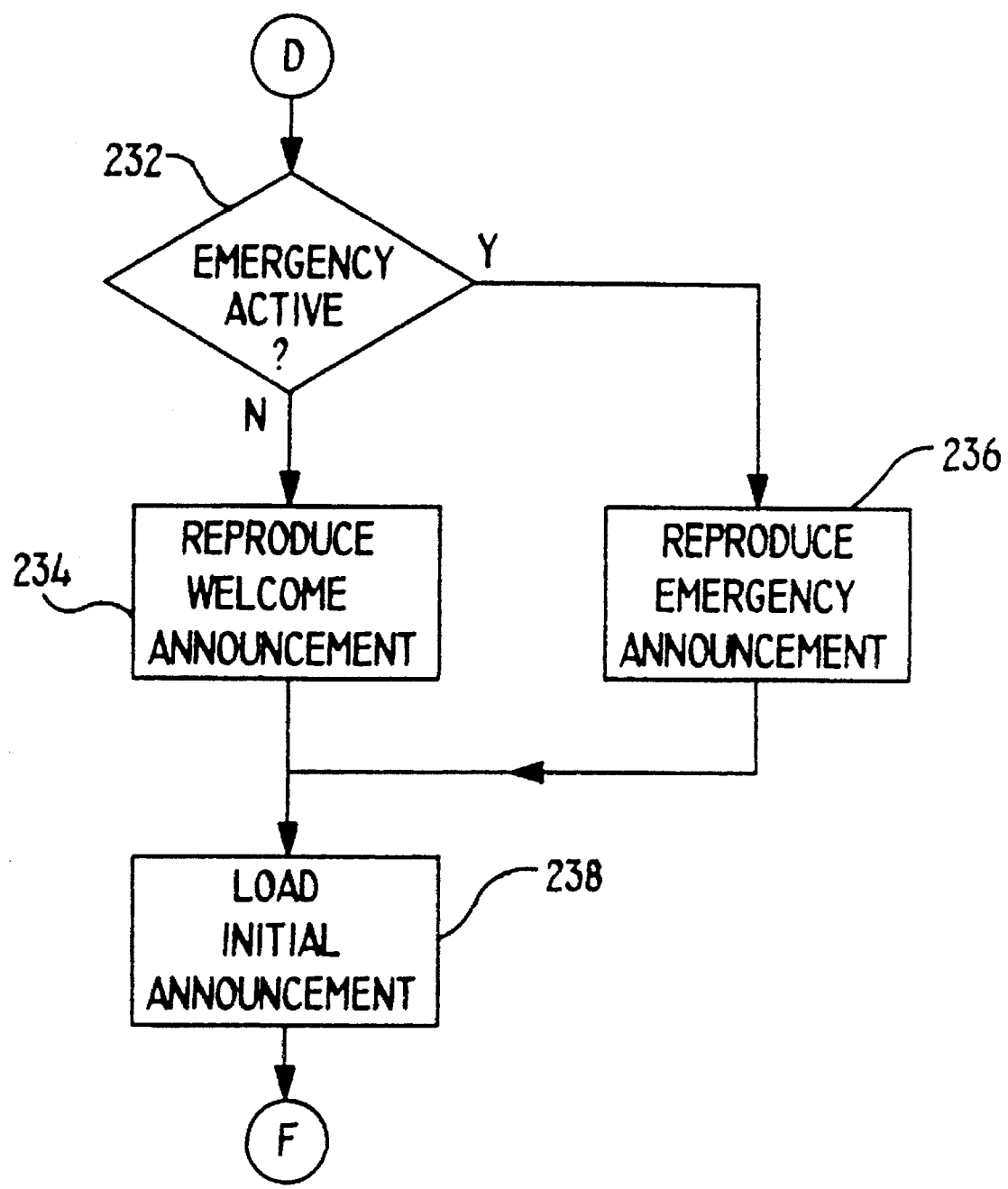
Figure 7F:
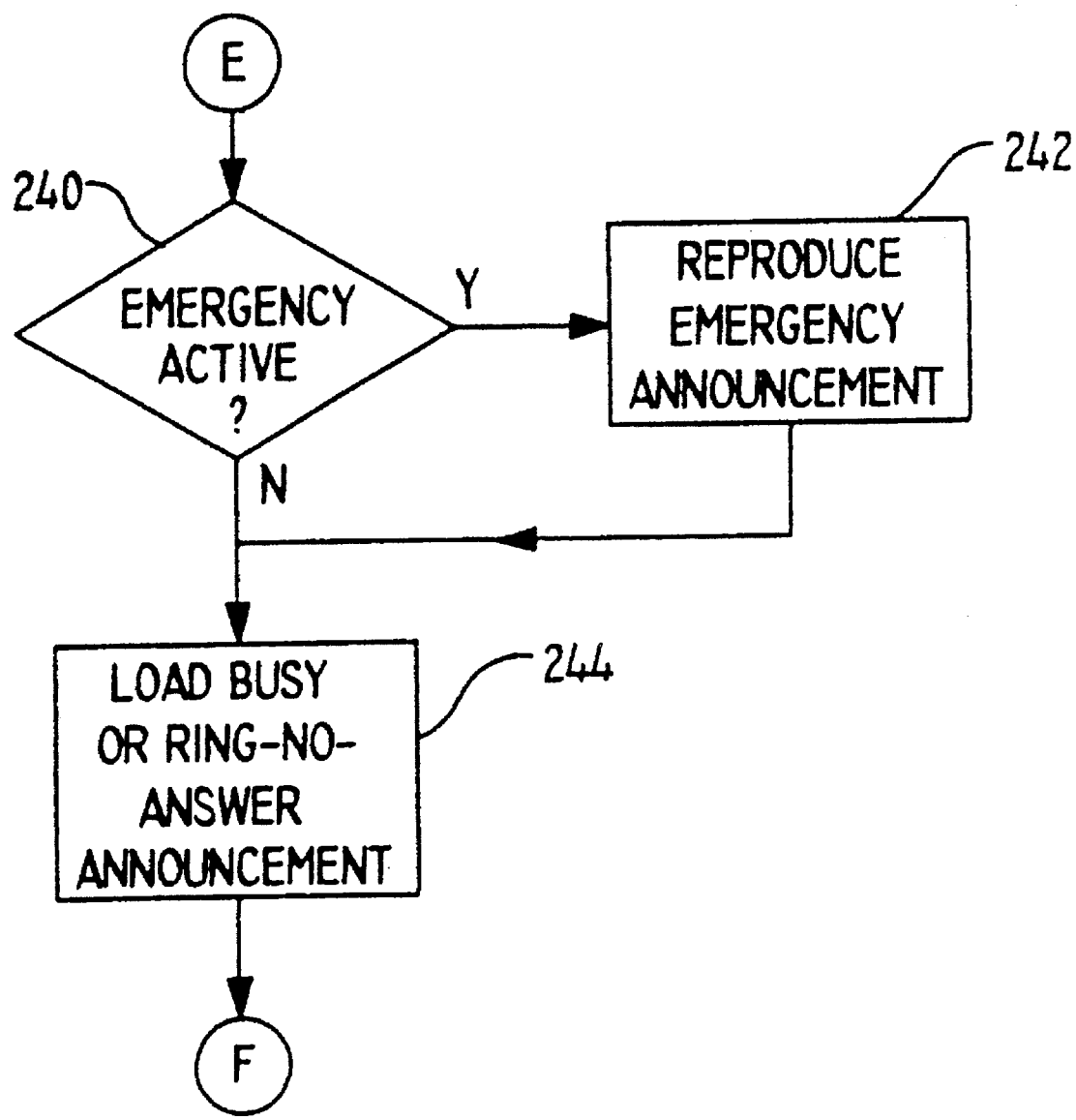
Figure 7G:
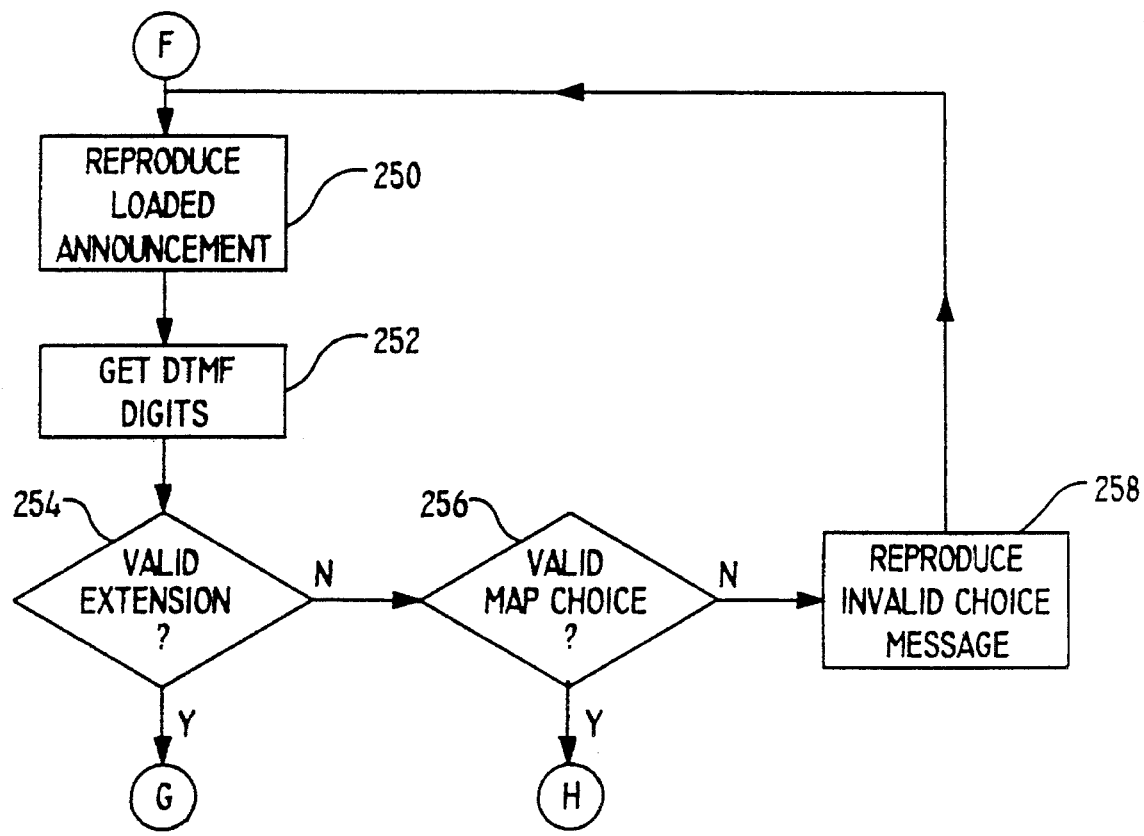

As illustrated in FIGS. 7G and 7I, examples of destinations for announcement maps include invalid entry; transfer to another extension; transfer to voicemail, either generally or to a specific voicemail box; subannouncement; directory; hangup; and human operator. Other options vary by announcement type and may include options such as hold for party and return to initial announcement. As indicated by the ellipsis following the announcements and maps 118, additional data relevant to an entire automated attendant account may be included. Of course when there is more than one automated attendant service account, there are an access number table 112, extension specification matrix 114, account defaults 116 and announcements and maps 118 for each account.

As noted above, each extension serviced by an automated attendant service has a subscriber record 122 defining how to handle calls to that extension. As illustrated in FIG. 4F, a subscriber record includes fields for subscriber specific class of service and subscriber specific response for failed calls to the extension. When a subscriber record is created, most of the fields are initially filled using the account defaults 116. Only the first and last name corresponding to a subscriber extension is required. A personal operator extension field is provided if the personal operator option is selected, but this field is not filled by default.

Figure 5A:
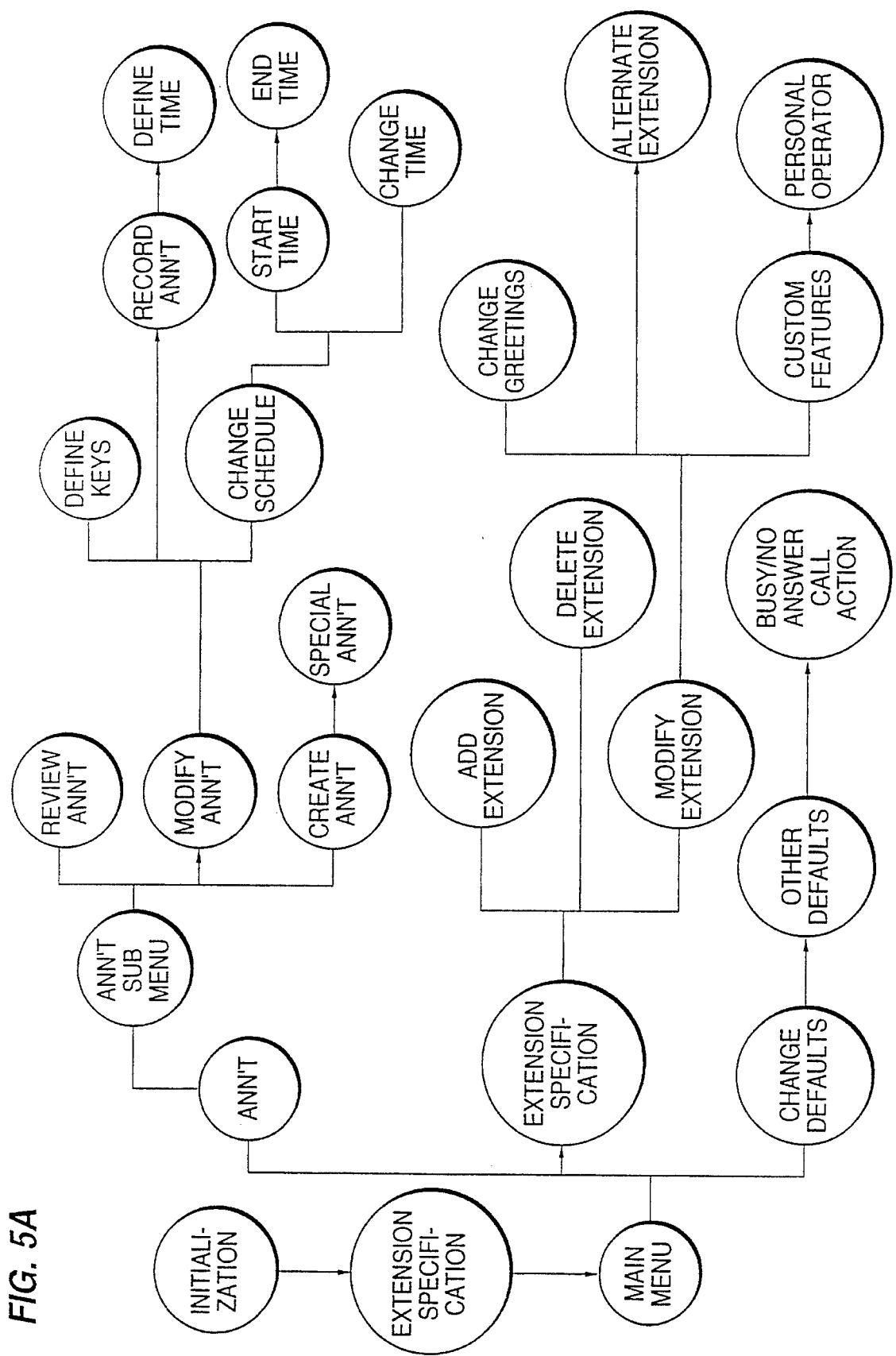
FIGS. 5A–5Z and 5AA are flowcharts of a sample voice interface between an information services system and the account administrator of an automated attendant service.

Using the file structure described above, an automated attendant service according to the present invention can be set up using the screens illustrated in FIGS. 4A–4F and the flowcharts illustrated in FIGS. 5A–5AA. In the preferred embodiment, there are at least three levels of security. At the highest level, a system administrator working for the company which operates the information services platform 22 creates user records, switch configuration data 104 and class of service 106. In addition, the system administrator initializes the access number table 112, extension specification matrix 114, account defaults 116 and announcement maps 118 for each account. The system administrator accesses the database illustrated in FIG. 3 via a screen interface which is used to administer other services provided by the information services platform 22. The screen interface may be built using a software package like the JYACC Application Manager from JYACC, Inc. of New York, N.Y. The screen interface is used in a conventional manner to create records associating account numbers with account names and other information pertinent to a specific account.

The switch configuration data 104 may be created using a screen like that illustrated in FIG. 4A. The information following the colons on the fourth through ninth lines is entered to provide a switch identifier for a physical switch type and transfer codes. In the preferred embodiment codes similar to those used in the industry standard modem command set are used, including "f" to indicate that a flash hook should be performed, "w" to indicate that the system should wait for a dial tone and "h" to indicate a one-half second pause. The "*", "#" and digits 0–9 are used to indicate generation dual tone multifrequency (DTMF) tones produced by a conventional 12-key telephone. The "transfer start" codes are used to place the caller on hold or otherwise enable a transfer of the caller to an extension. The "transfer complete" codes are used if more than a hang-up is required to complete the transfer. The pullback codes are used to reconnect to the caller in the event of an unsuccessful call to an extension.

The table of transfer types indicates which of the six transfer types used in the preferred embodiment are supported by the physical switch type and which call analysis parameters (CAP) file is to be used in monitoring each transfer type. In a blind transfer, the transfer complete codes (if any) immediately follow the dialing of an extension and an on-hook signal is then generated, i.e., the system 22 hangs up. The remaining five transfer types are all monitored transfer types. The "monitor" type will use the busy and RNA pullbacks if there is no answer at the extension. The "busy-monitor" type is similar except that as soon as a ringback is detected, the transfer is completed. In a "screened" transfer, the caller is prompted to speak a name identifying the caller which is used as a caller announcement when the call to the extension is answered. An "announce called party" type is used where several people share a single physical extension, but have separate extension numbers that may be dialed by a caller. The extension specification matrix 114 is used to convert the individual extension number into a telephone number dialed by the system 22 and the individual extension number is used to access a called party announcement identified in the subscriber record 122 to request the called party when the extension is answered. The person answering the call may hang up if the called party is not there and the automated attendant service handles the call as a ring-no-answer. The "called party screen" type combines both features of the "screened" and "announce called party" types.

The classes of service 106 used by automated attendant services on the system 22 may be created using a screen like that in FIG. 4B. A typical class of service, for small businesses, is illustrated in FIG. 4B. The specifications indicate the maximum number of announcements, the maximum length of each announcement and the maximum number of subscribers in an account, together with the type of greeting used. The assignments indicate what restrictions are placed on the account administrator and what features are enabled.

As noted above, the system administrator also has to create the access number table 112 and an account administrators table 113 with at least one user and initialize the extension specification matrix 114, account defaults 116 and announcements and maps 118. The access number table 112 may be a simple correlation of numbers or other addresses used to access the automated attendant service and the physical switch type used to place the callers on hold when an extension is called. This permits more than one access number to be serviced by a single automated attendant service, even if the callers are connected via different physical switch types.

Initialization of the extension specification matrix 114 creates database records with the fields previously described for the extension specification matrix 114. For some accounts, the system administrator may also set up the extension specification matrix (ESM) 114 using a screen like those illustrated in FIGS. 4C. In the preferred embodiment, the ESM screen allows the system administrator to enter starting and ending extension numbers for a range of extensions which may contain one extension number to thousands of extension numbers. The phone numbers which are dialed to reach that extension are entered with any leading digits that are the same for all numbers in the extension followed by dots which are replaced by the digits in the extension within the range. If there are fewer dots than in the extension, e.g., if there were three dots instead of four in the illustrated default subscriber telephone number, only the last three digits of the extension would be used. This permits the numbers to be dialed to be different from the extension number, providing greater flexibility. To permit ranges to include leading zeros without requiring entry of a leading zero, leading zeros are inserted if there are fewer digits in the extension number dialed by a caller than there are dots in the corresponding telephone number field. The remaining data entered by the system administrator using the screen illustrated in FIG. 4C provides account numbers, access rights, connection types and switch identifiers as described above for the extension specification matrix 114.

The account defaults 116 may be entered using screens like those illustrated in FIGS. 4D and 4E. In addition to information regarding who is responsible for the account, default settings are created. These defaults are copied into subscriber records when they initially created as discussed below with reference to FIG. 7F. Included in the defaults are a transfer type, transfer announcement and B/RNA call action scenario which determines the response of the automated attendant service to a failed call.

Usually the subscriber records 122 will be created by the account administrator and individual subscribers using voice interfaces as described below with reference to FIGS. 5A–5AA. However, the system administrator also has access to subscriber records via the screen interface. An example of a screen used for accessing subscriber records 122 is illustrated in FIG. 4F. As illustrated in FIG. 4F, most of the defaults from the account default settings illustrated in FIGS. 4D and 4E are used by the illustrated subscriber record. However, the B/RNA call action scenario has been changed and the transfer announcement has been changed from "sil-name" to "sil-ext". In the preferred embodiment, the default "sil-name" announcement is "Please hold during a moment of silence while I ring (subscriber's name)," while the announcement chosen by this subscriber, "sil-ext", is "Please hold during the silence." Other announcements or modifications to these announcements may be used as known in the art.

As noted above, each automated attendant account has an account administrator who has access to at least the extension specification matrix 114, account defaults 116, announcements and maps 118 and subscriber records 122 within the restrictions created by the system administrator. For example, if the system administrator has entered an "R" in the access rights for an entry in the extension specification matrix (see FIG. 4C), the account administrator may not make any changes to this entry, i.e., may not update the entry, which would be permitted if the access rights field had a "U". Access to the files via the voice interface is obtained by dialing a number corresponding to an entry in the account administrators table 113 for the automated attendant, entering a menu option (which may be hidden, i.e., not included in the announcement) and responding to a prompt for a password. The password security provides a level of access to an account administrator which is not as extensive as the system administrator, but greater than the level of access of a subscriber who is limited to accessing the subscriber's own records 122.

Figure 5B:
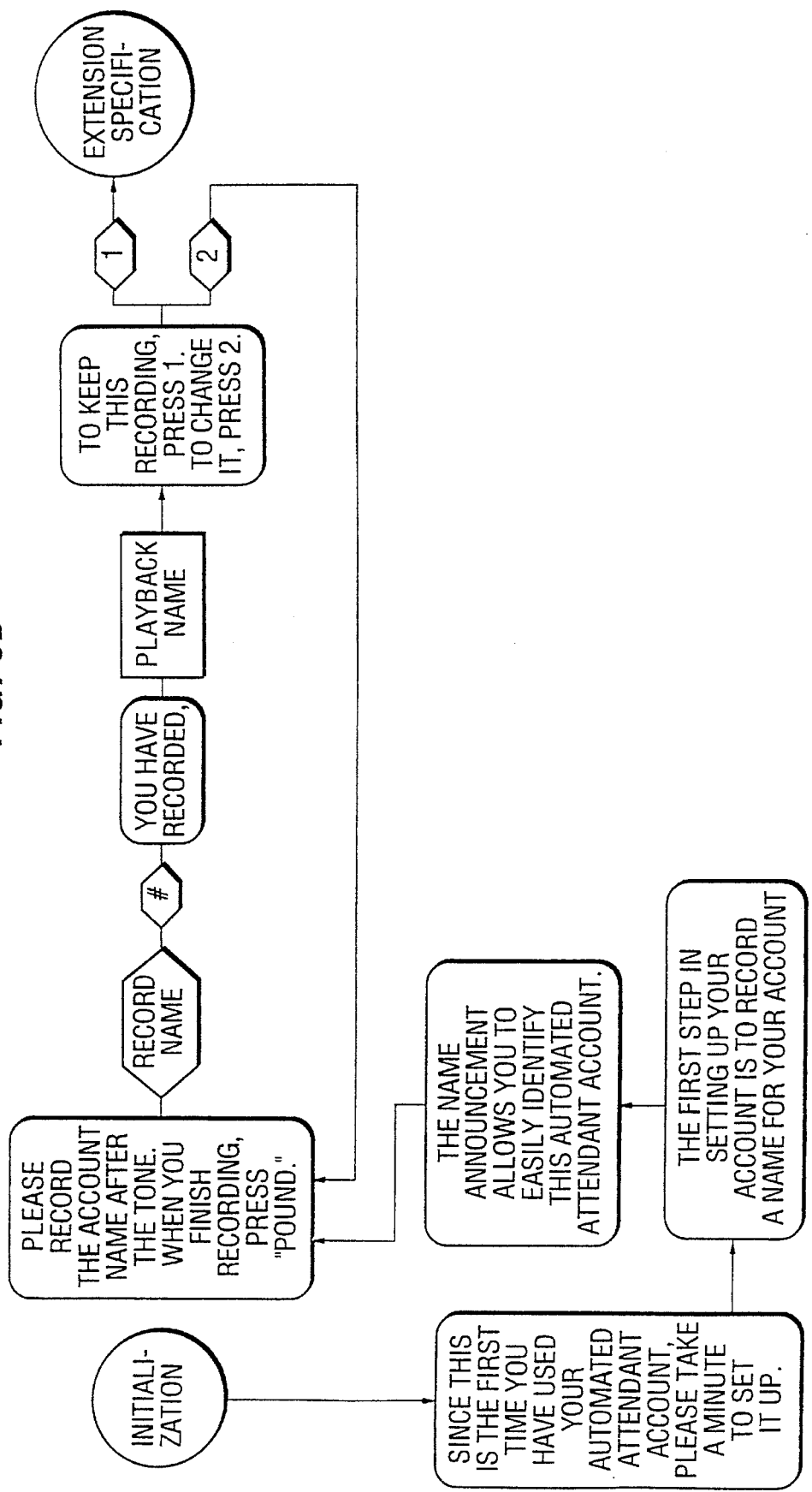
Figure 5C:
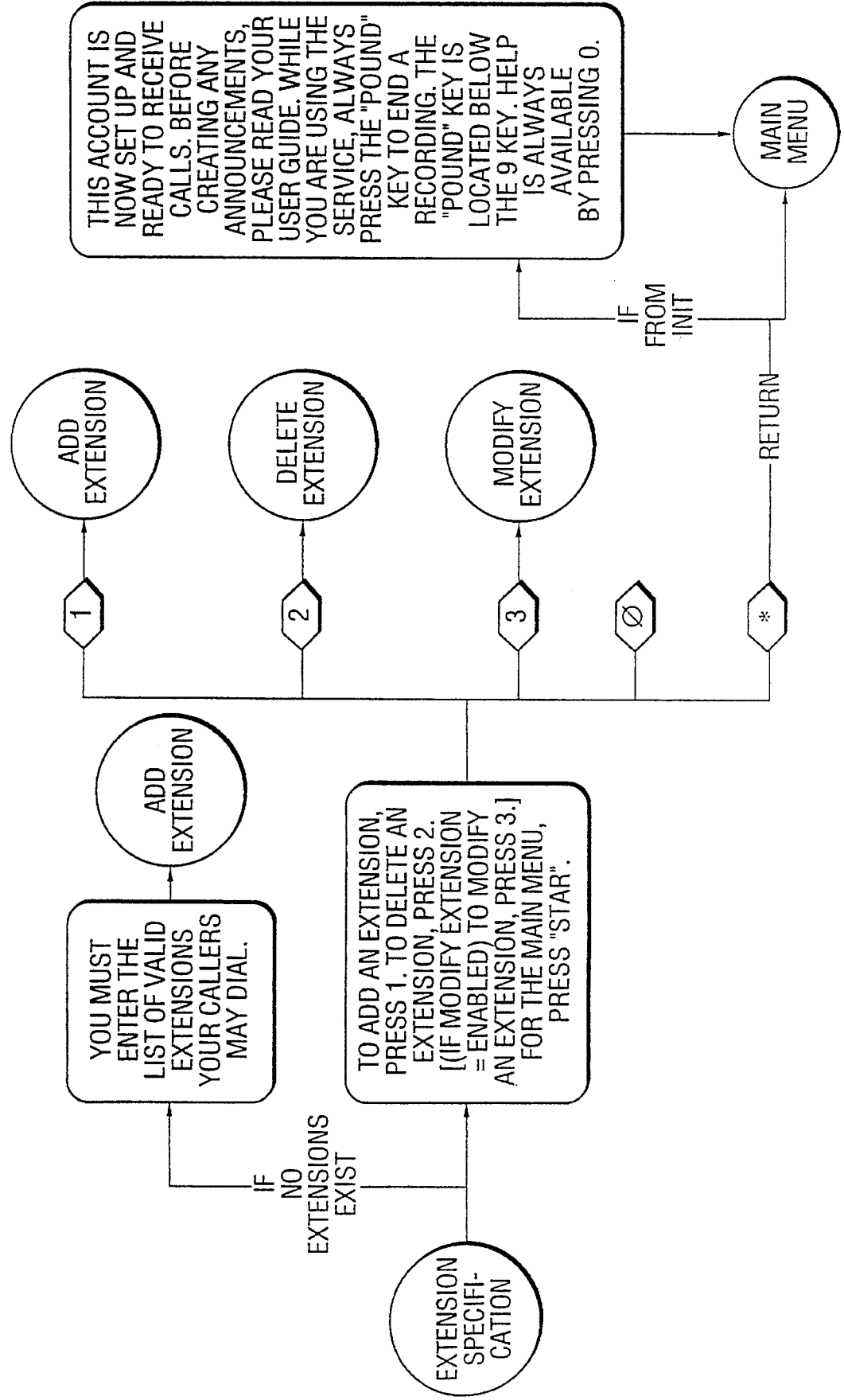
Figure 5E:
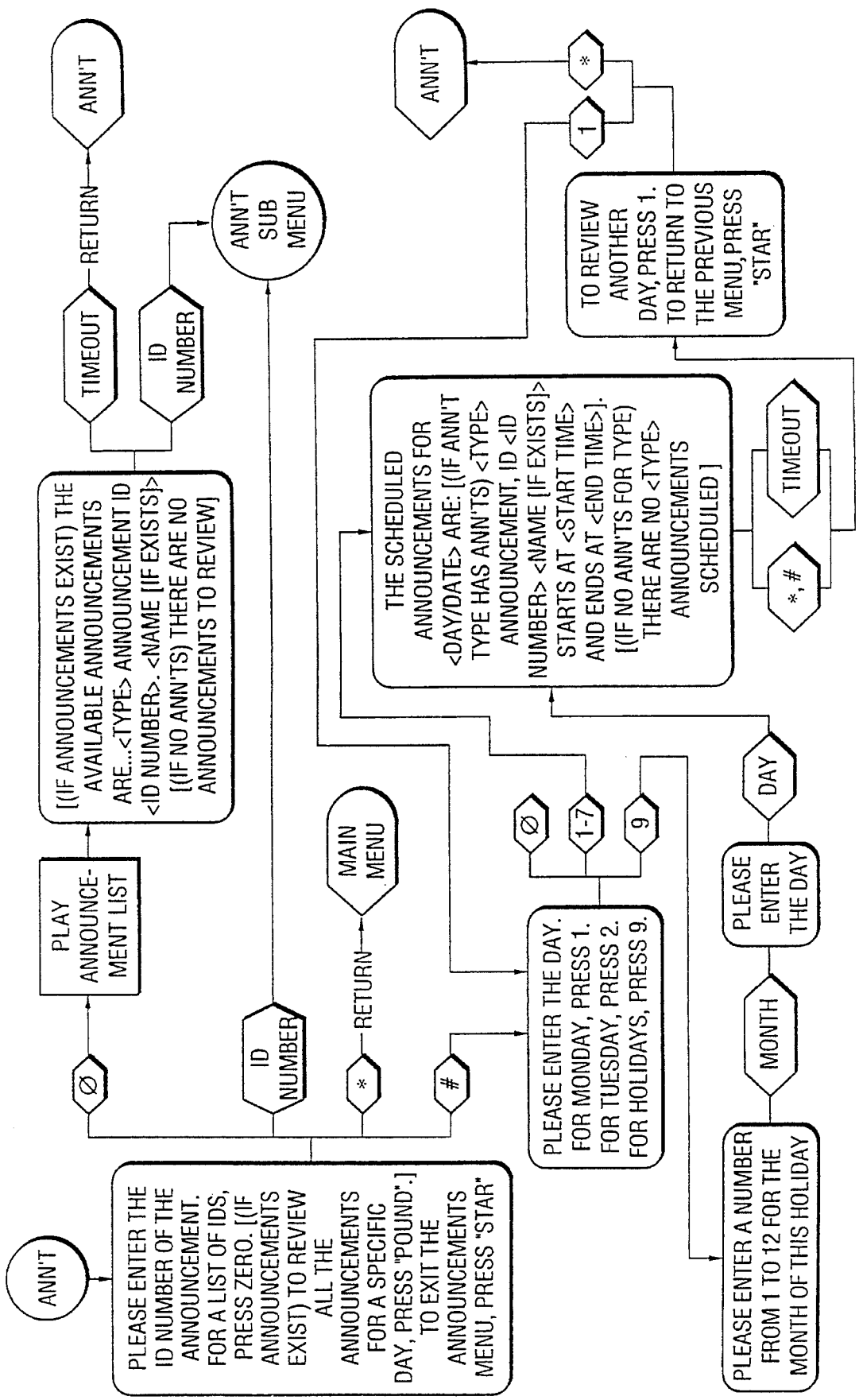
Figure 5F:
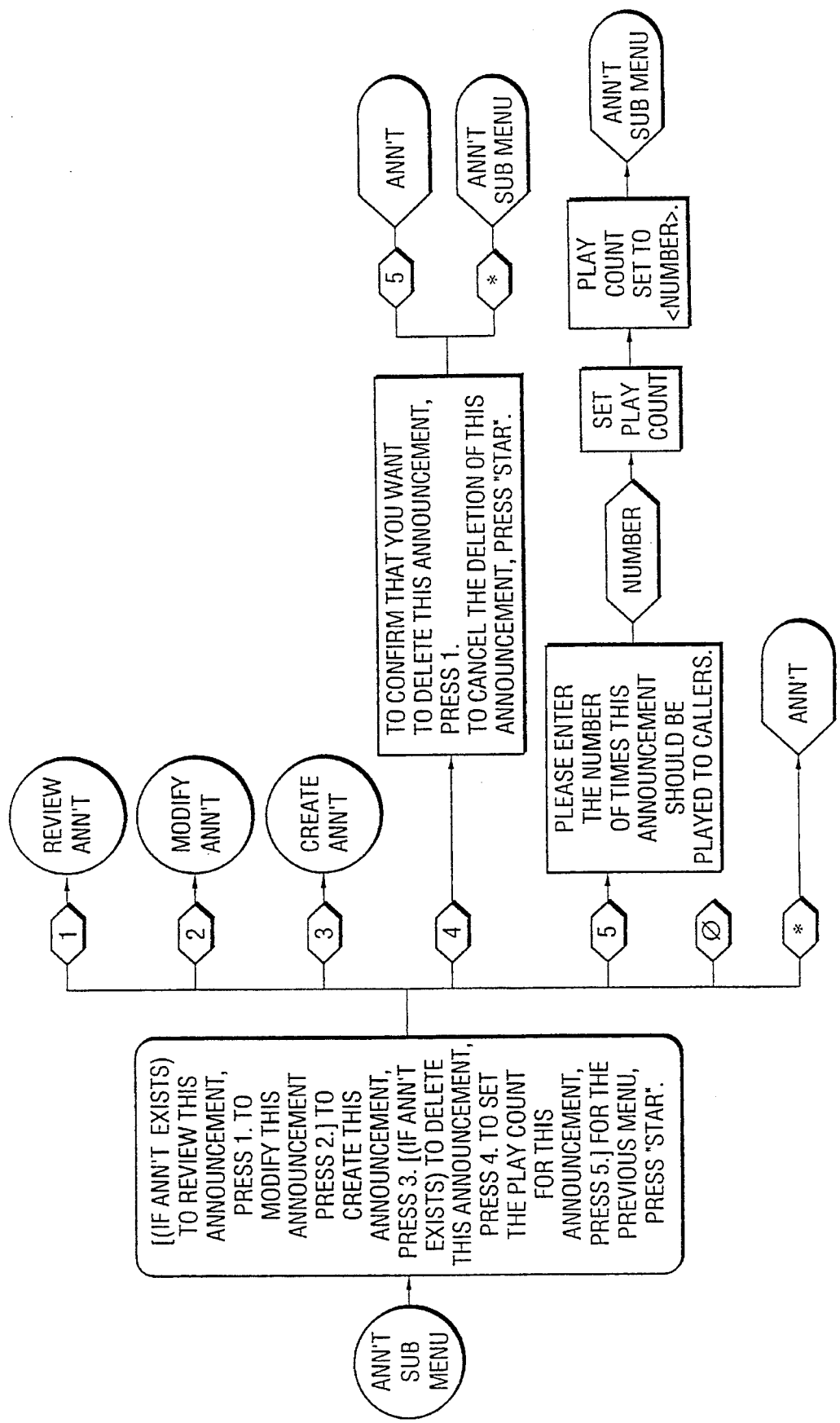
Figure 5G:
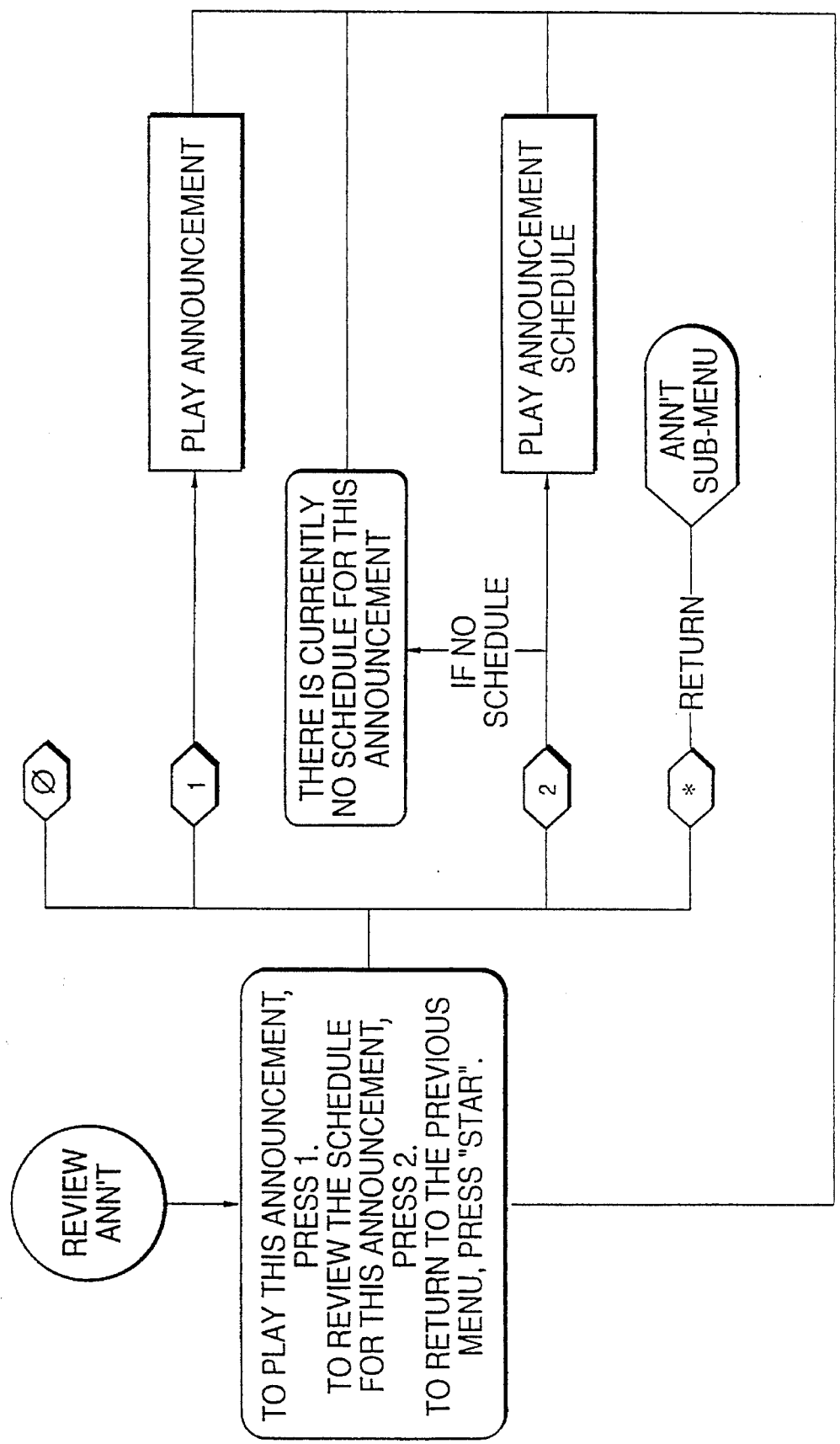
Figure 5H:
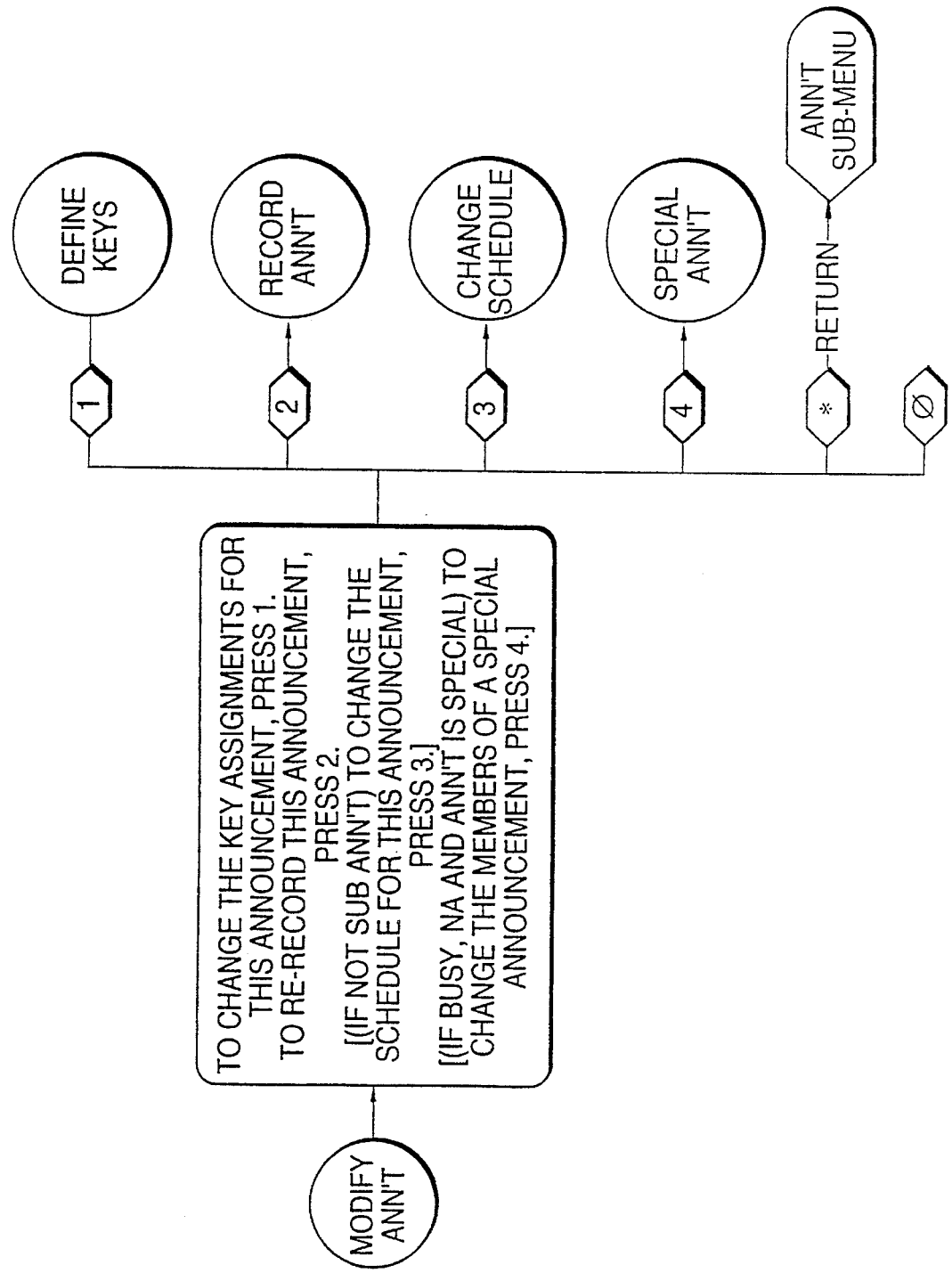
Figure 5J:
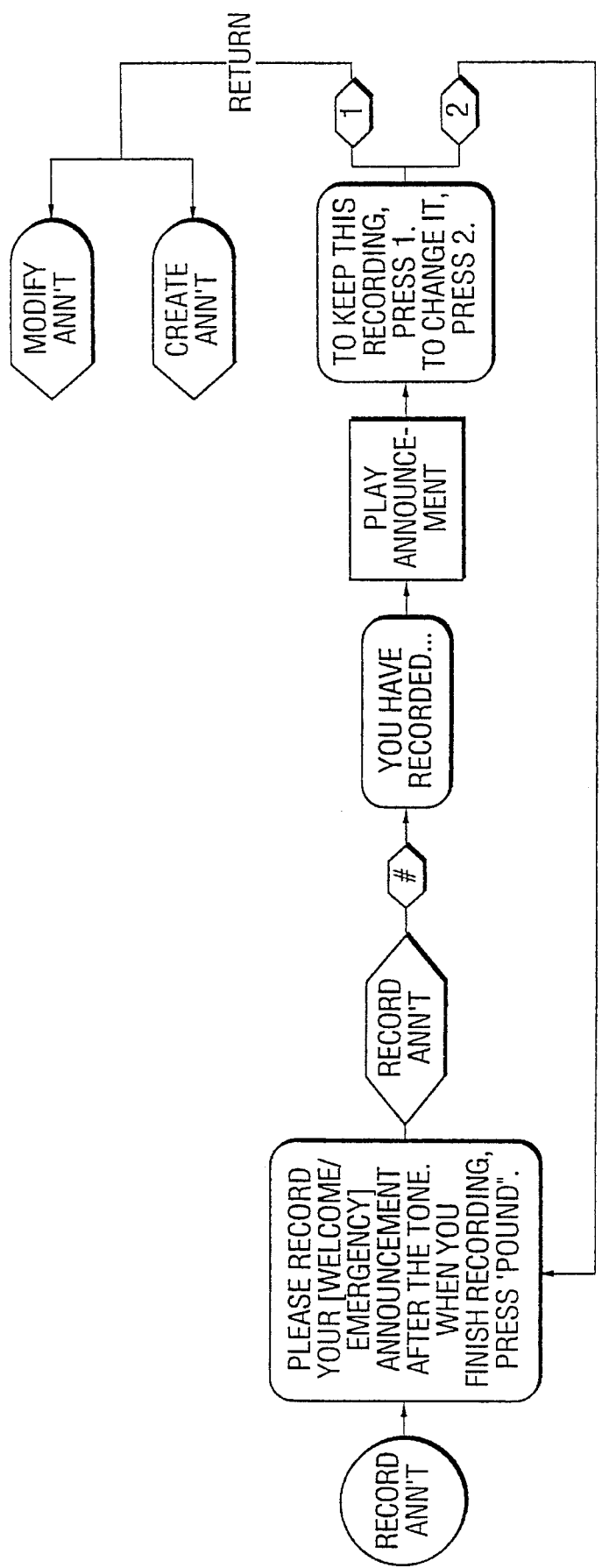
Figure 5K:
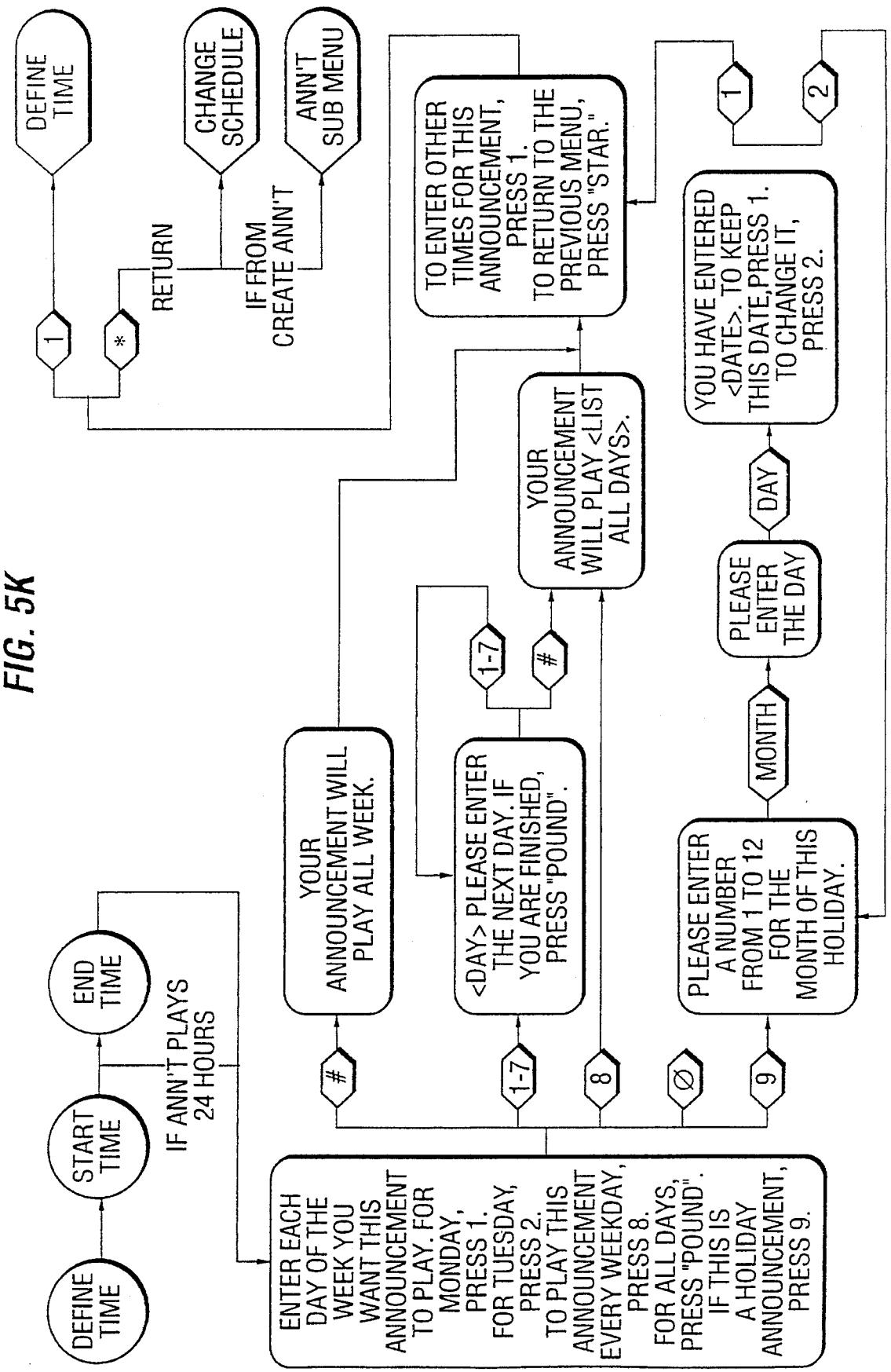
Figure 5L:
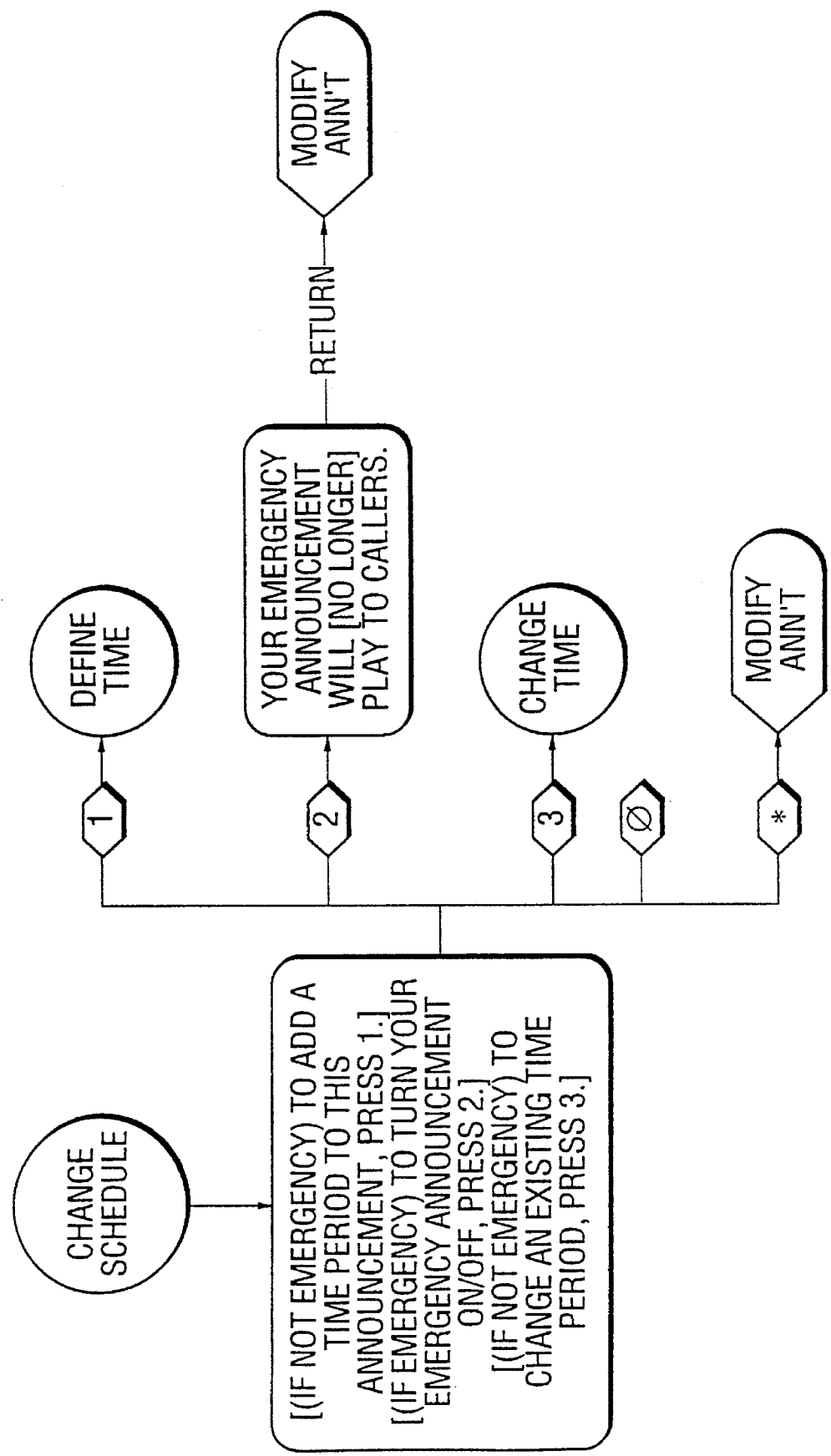
Figure 5M:
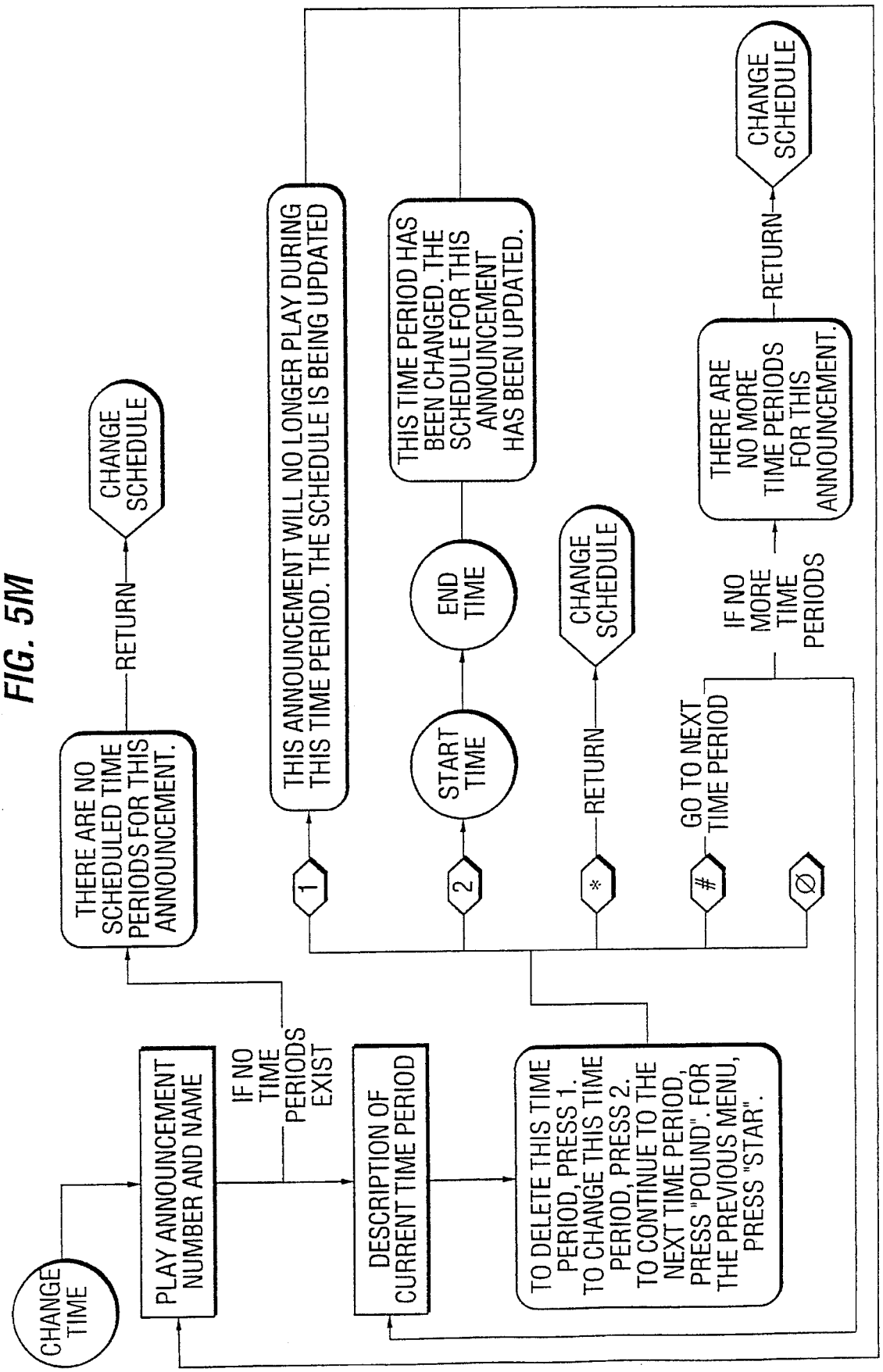
Figure 5N:
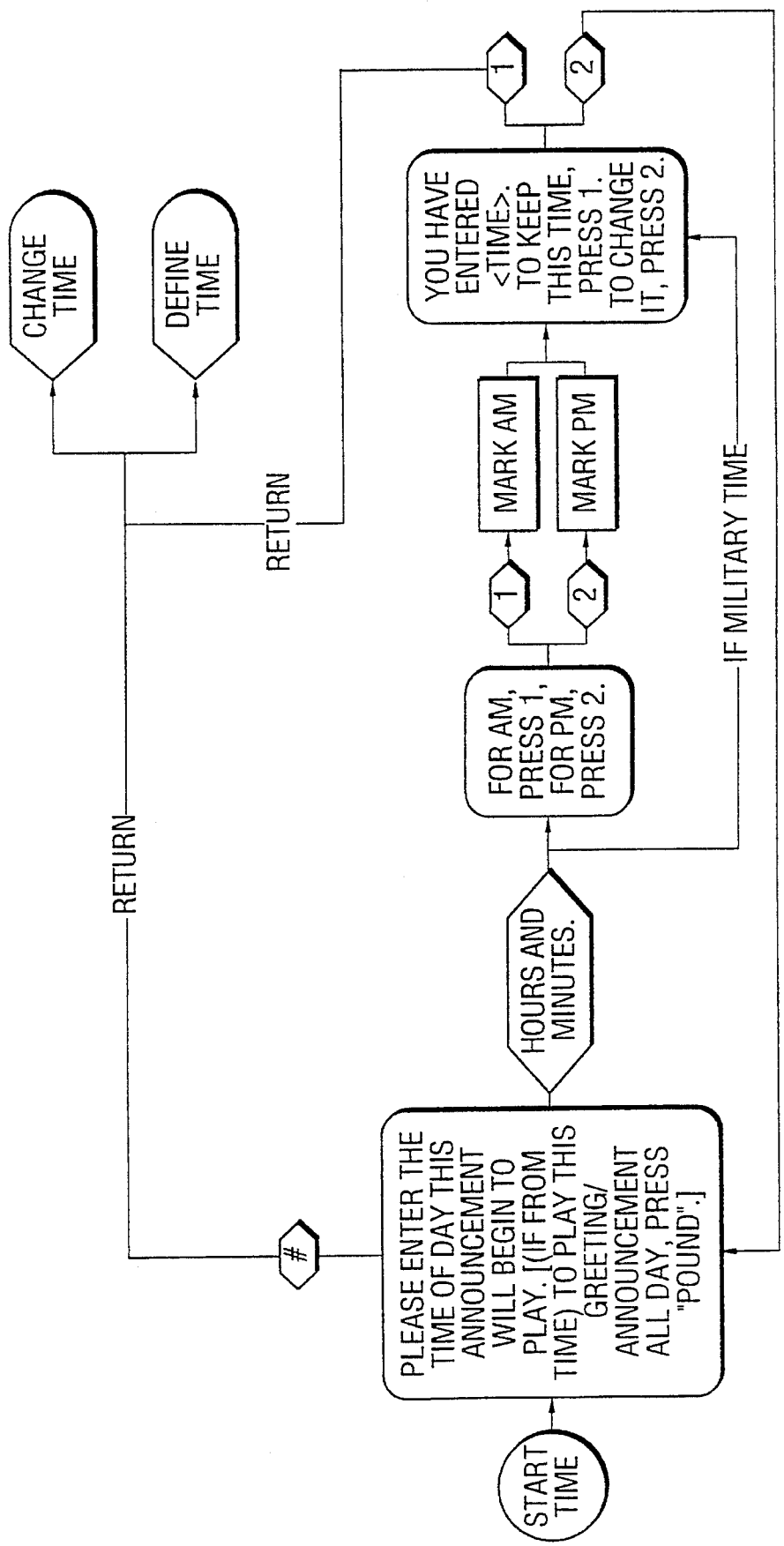
Figure 50:
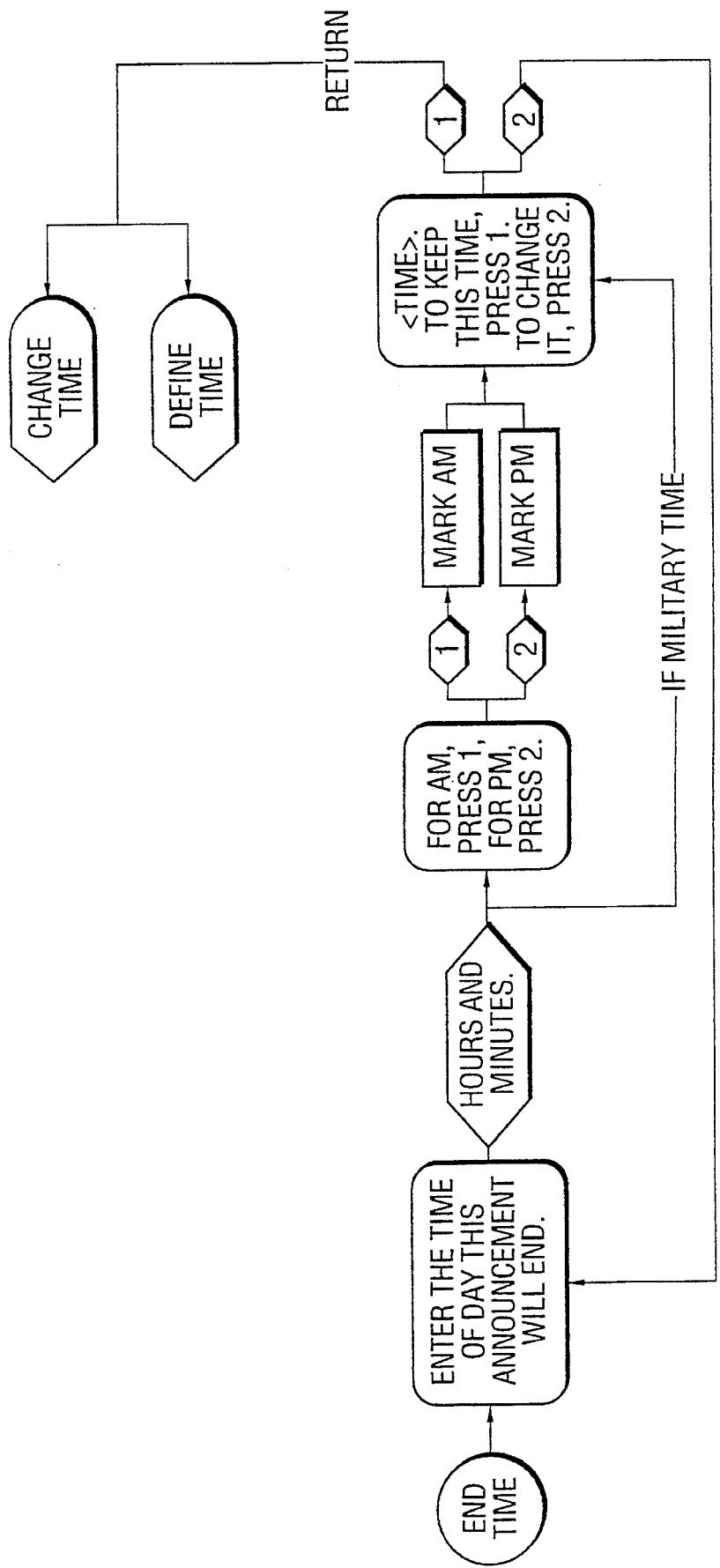
Figure 5P:
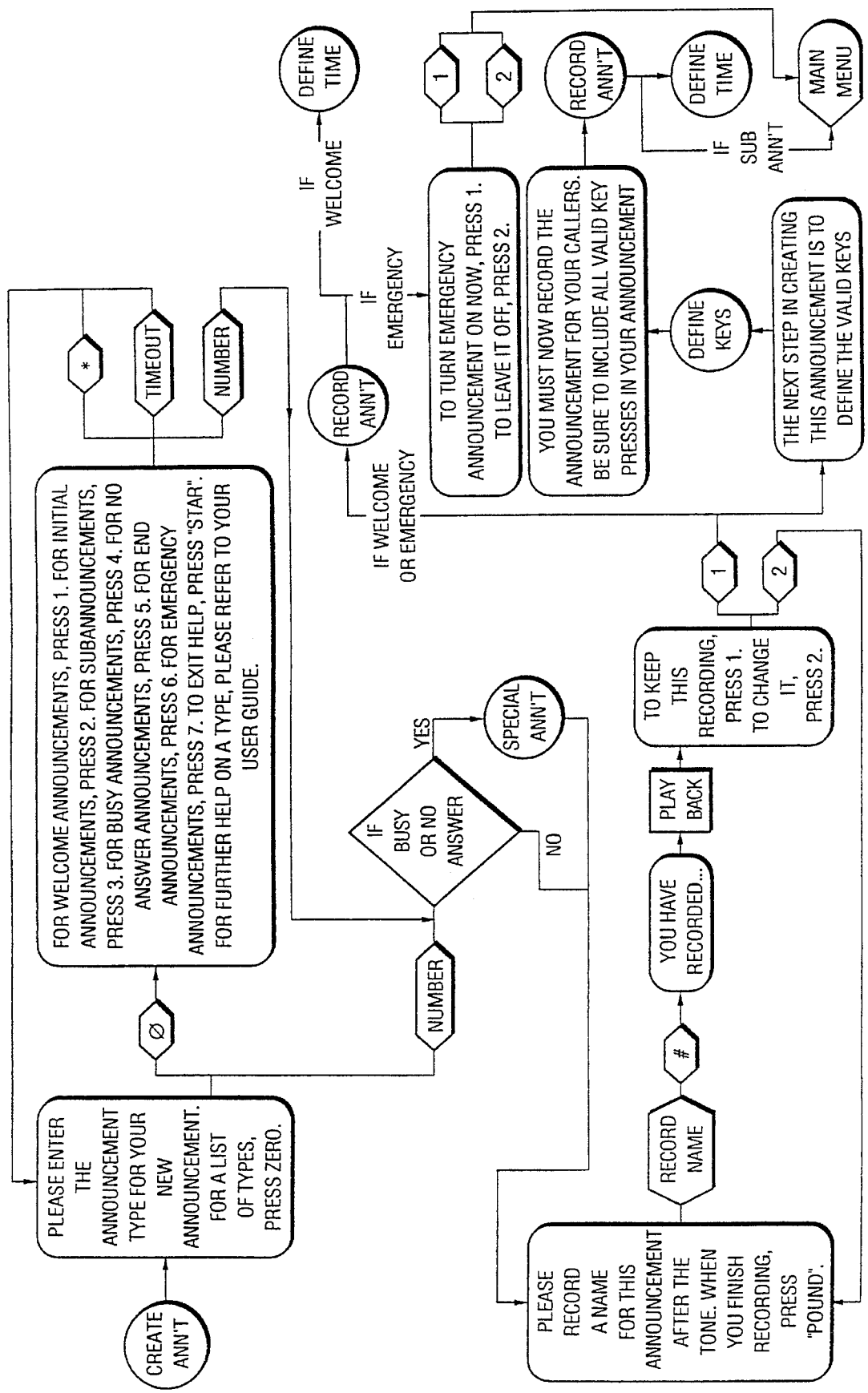
Figure 5Q:
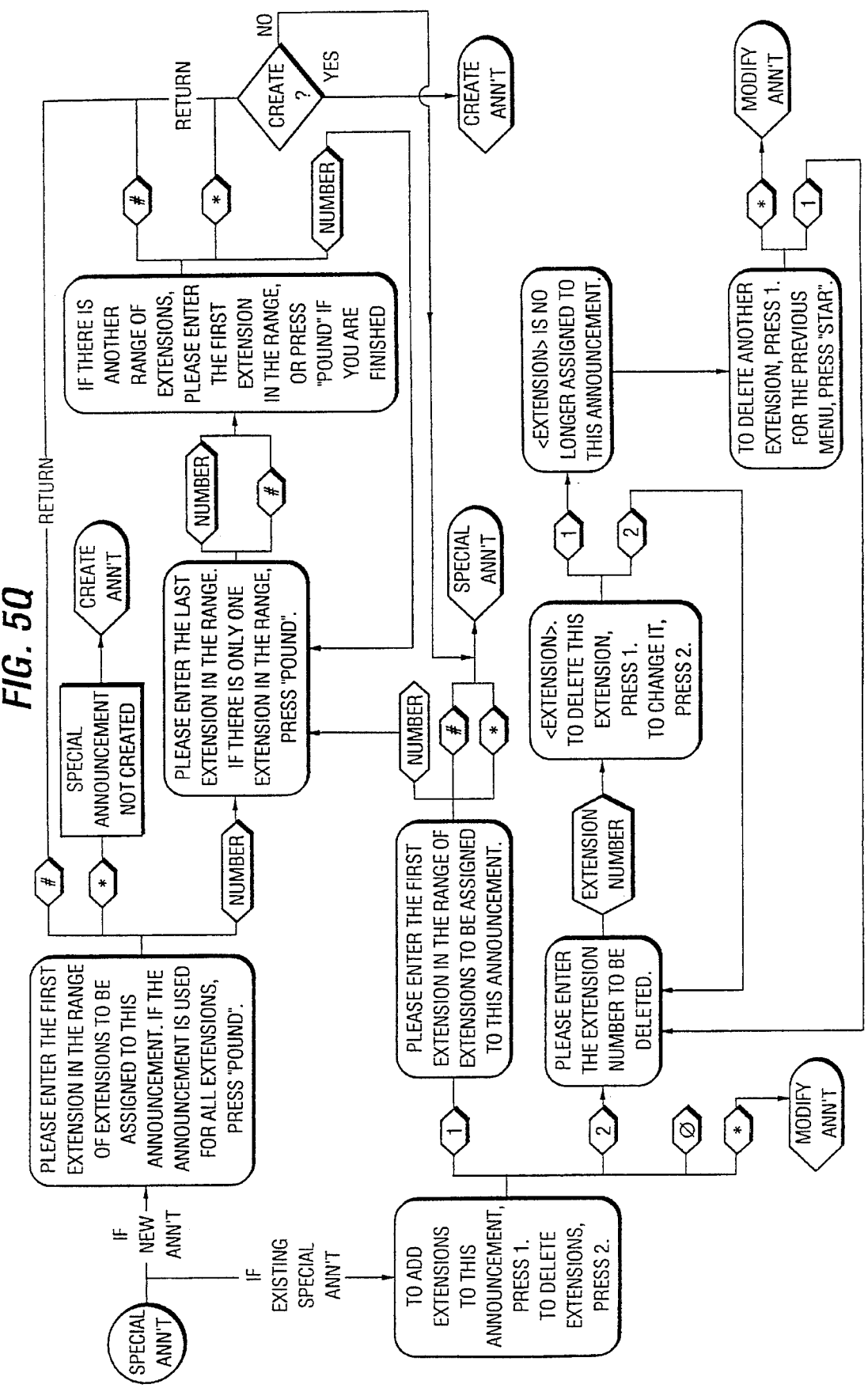
Figure 5R:
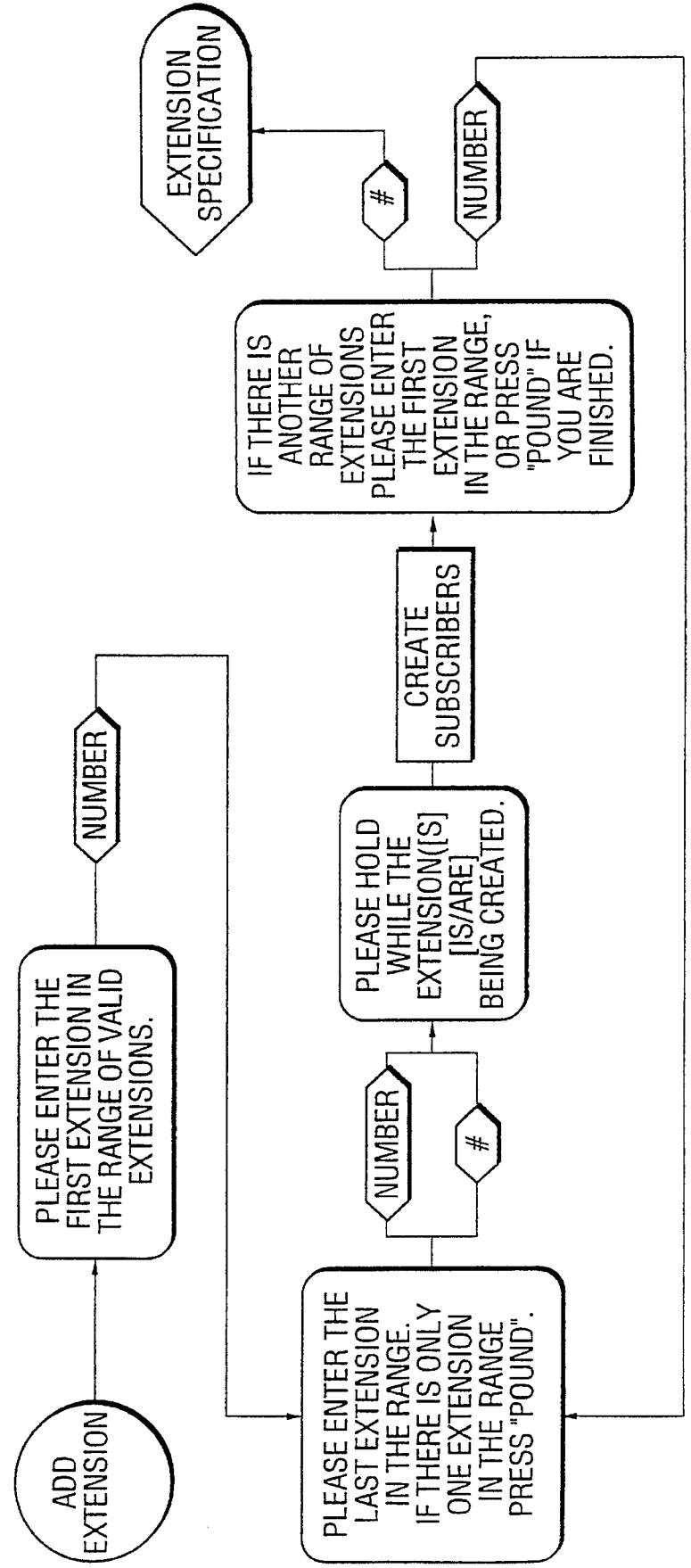
Figure 5S:
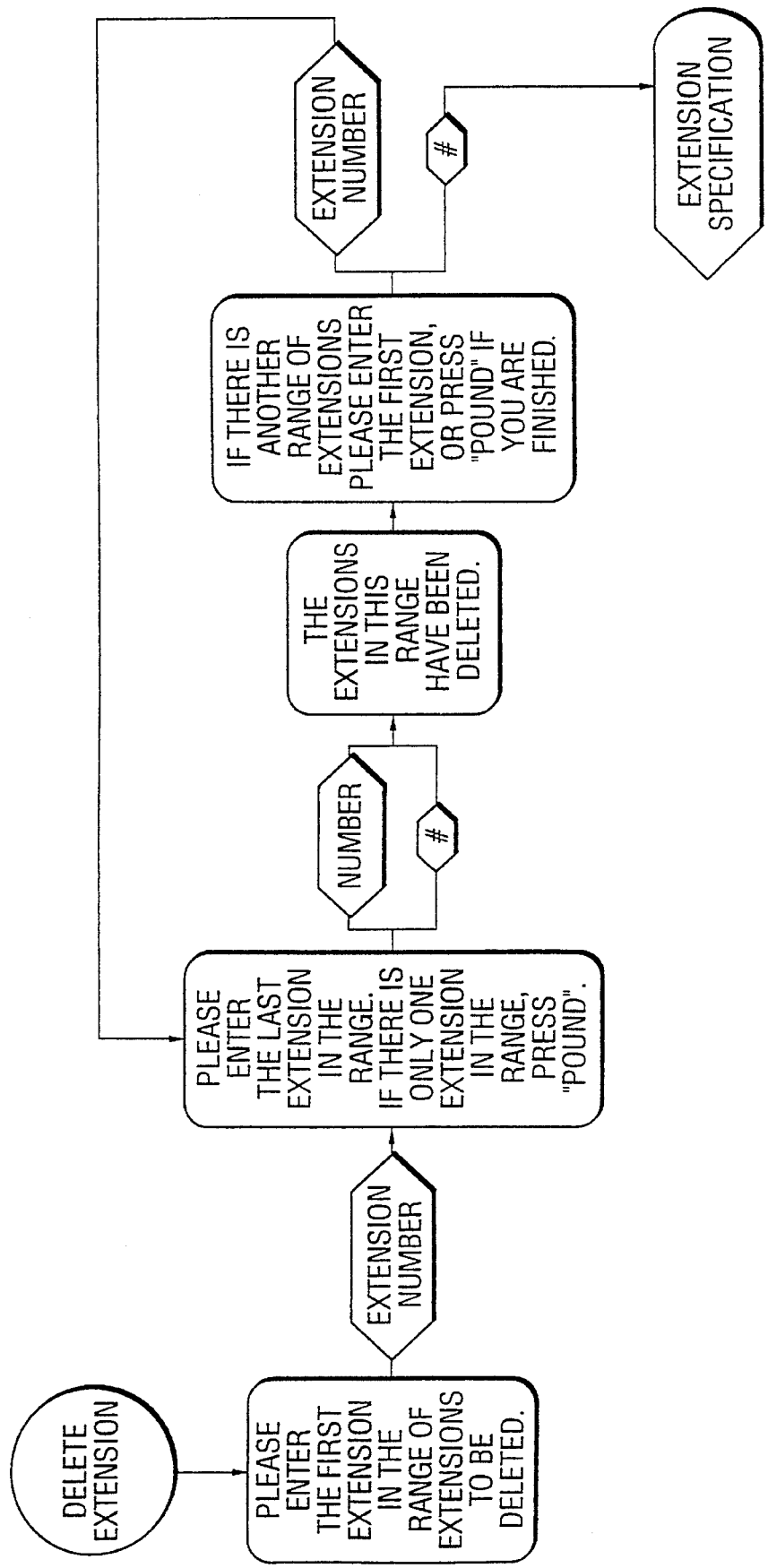
Figure 5T:
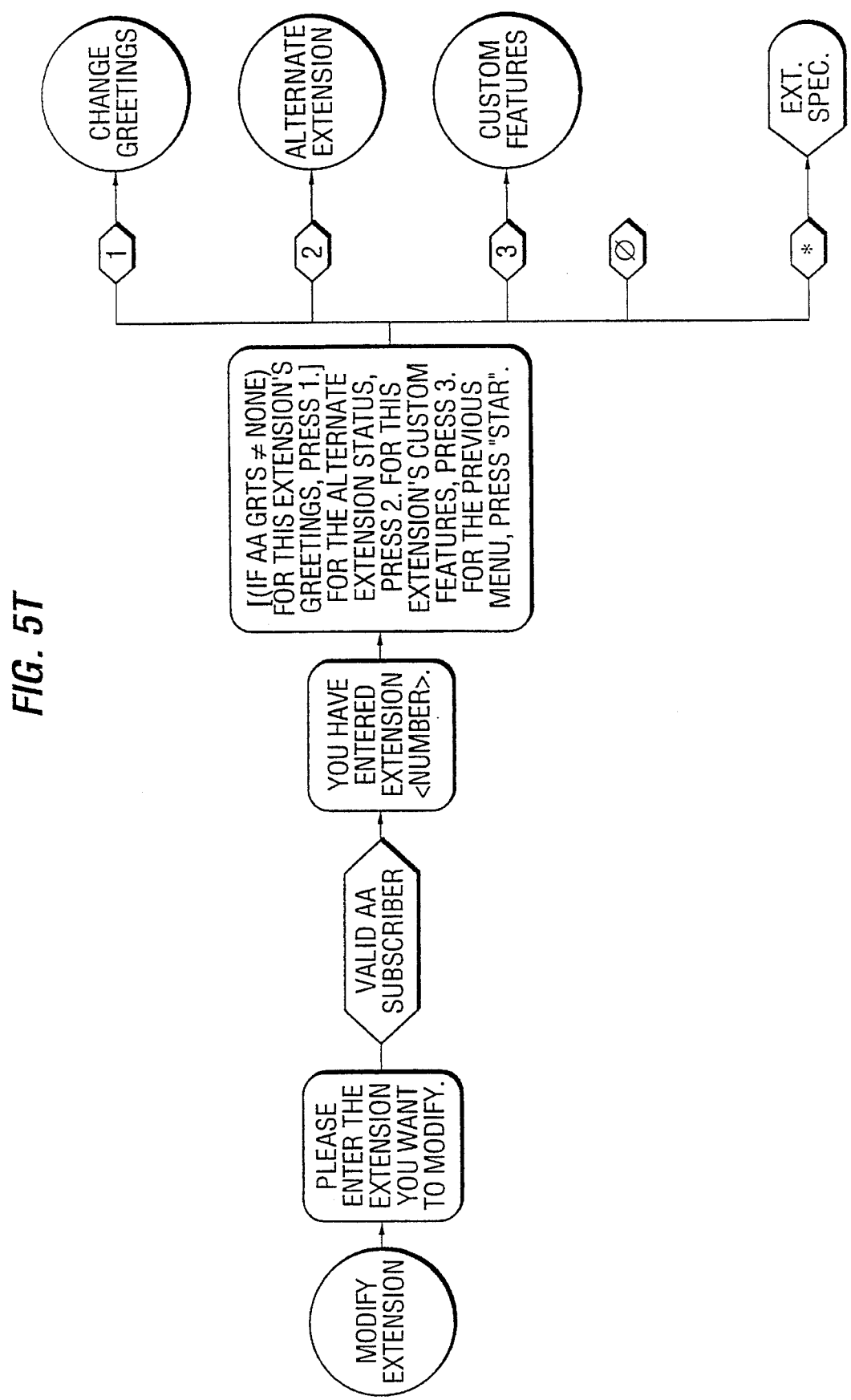
Figure 5U:
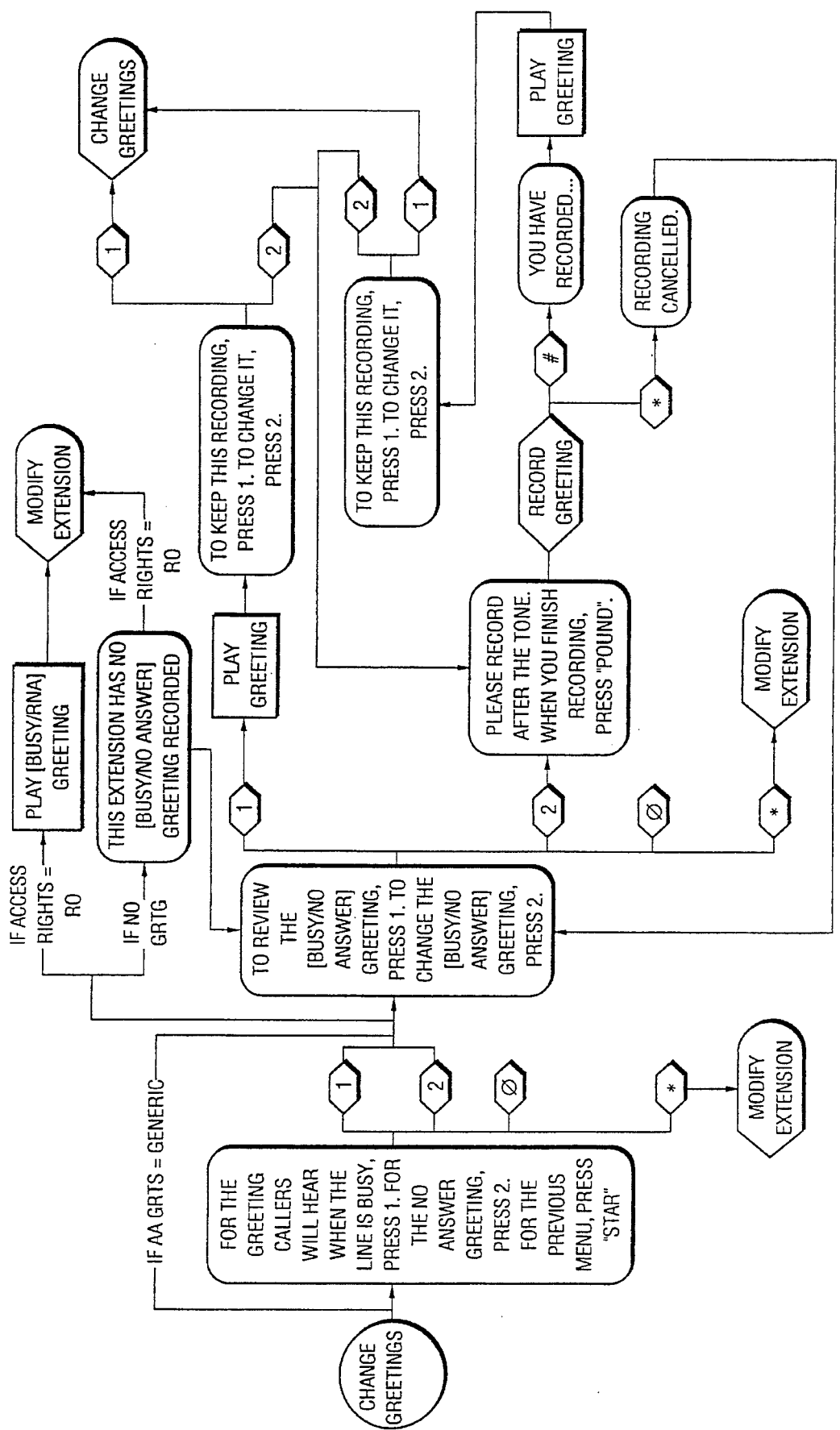
Figure 5V:
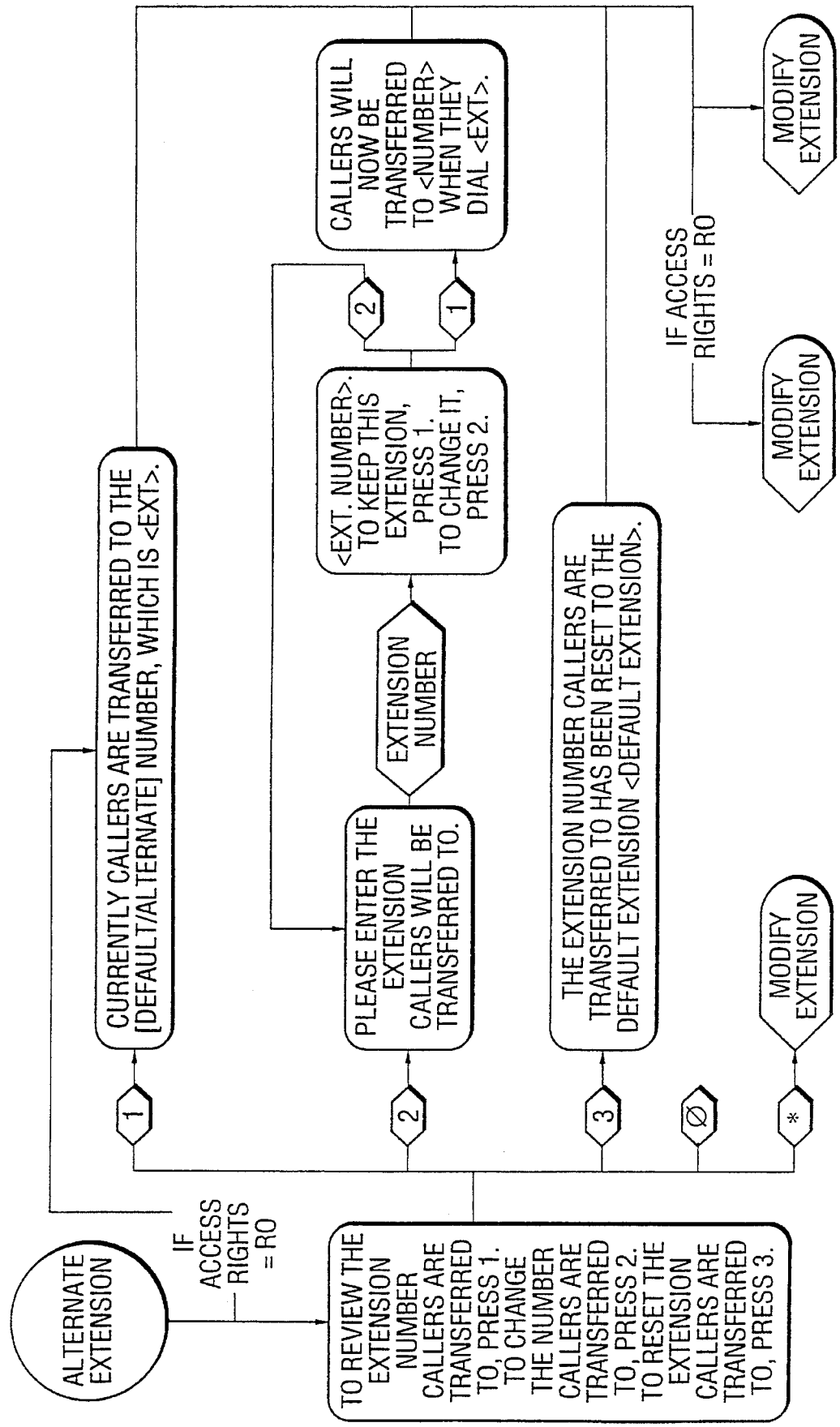
Figure 5W:
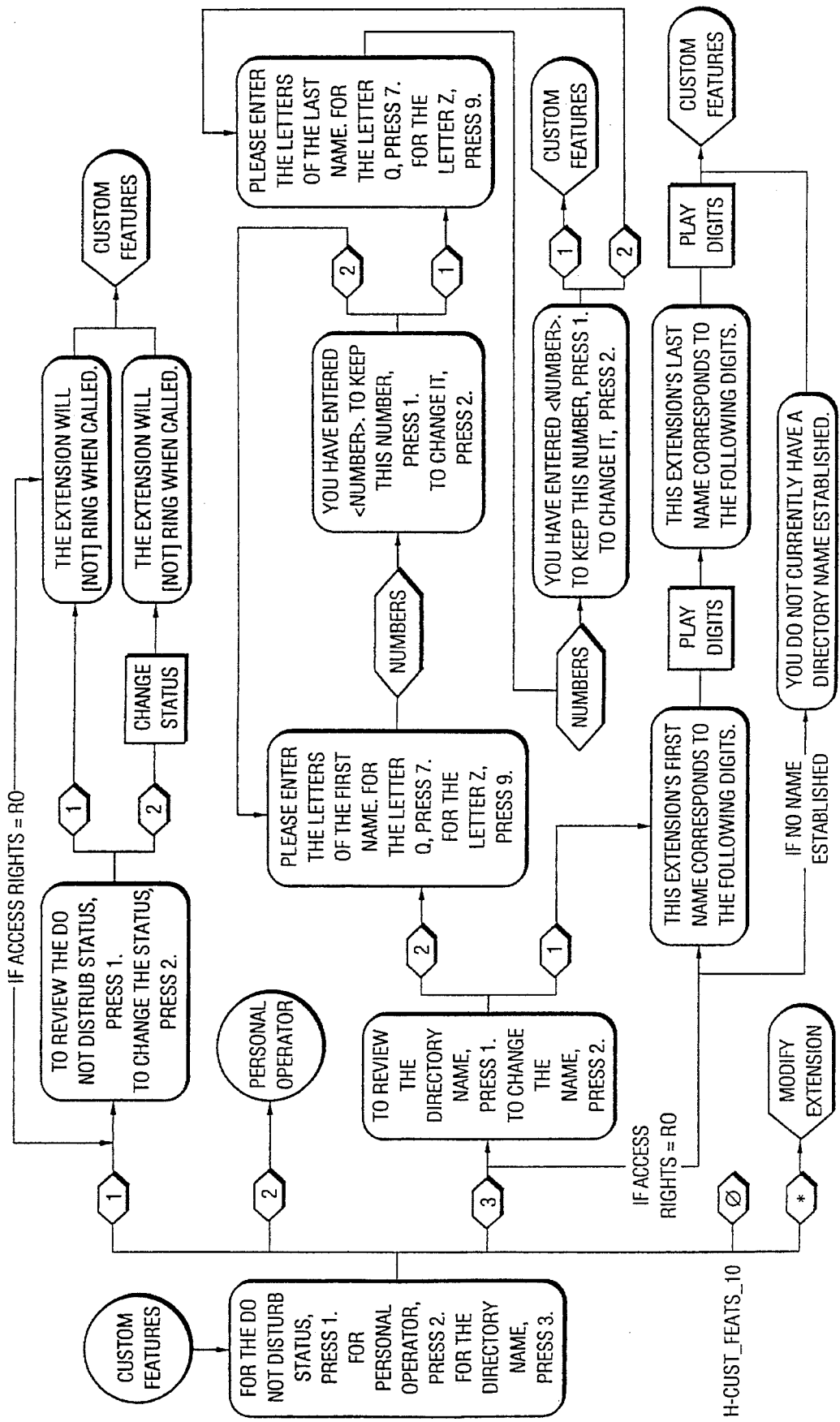
Figure 5X:
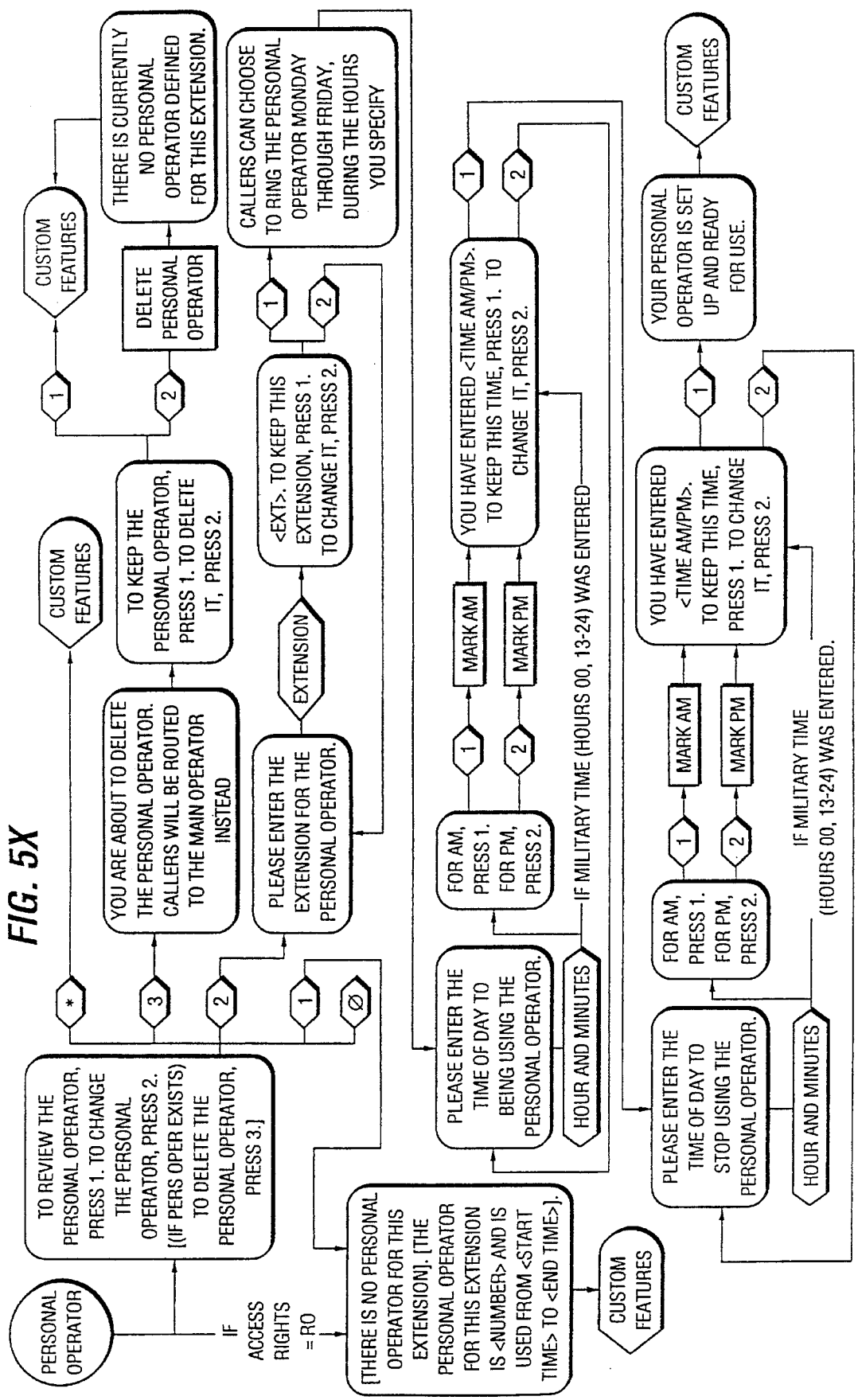
Figure 5Y:
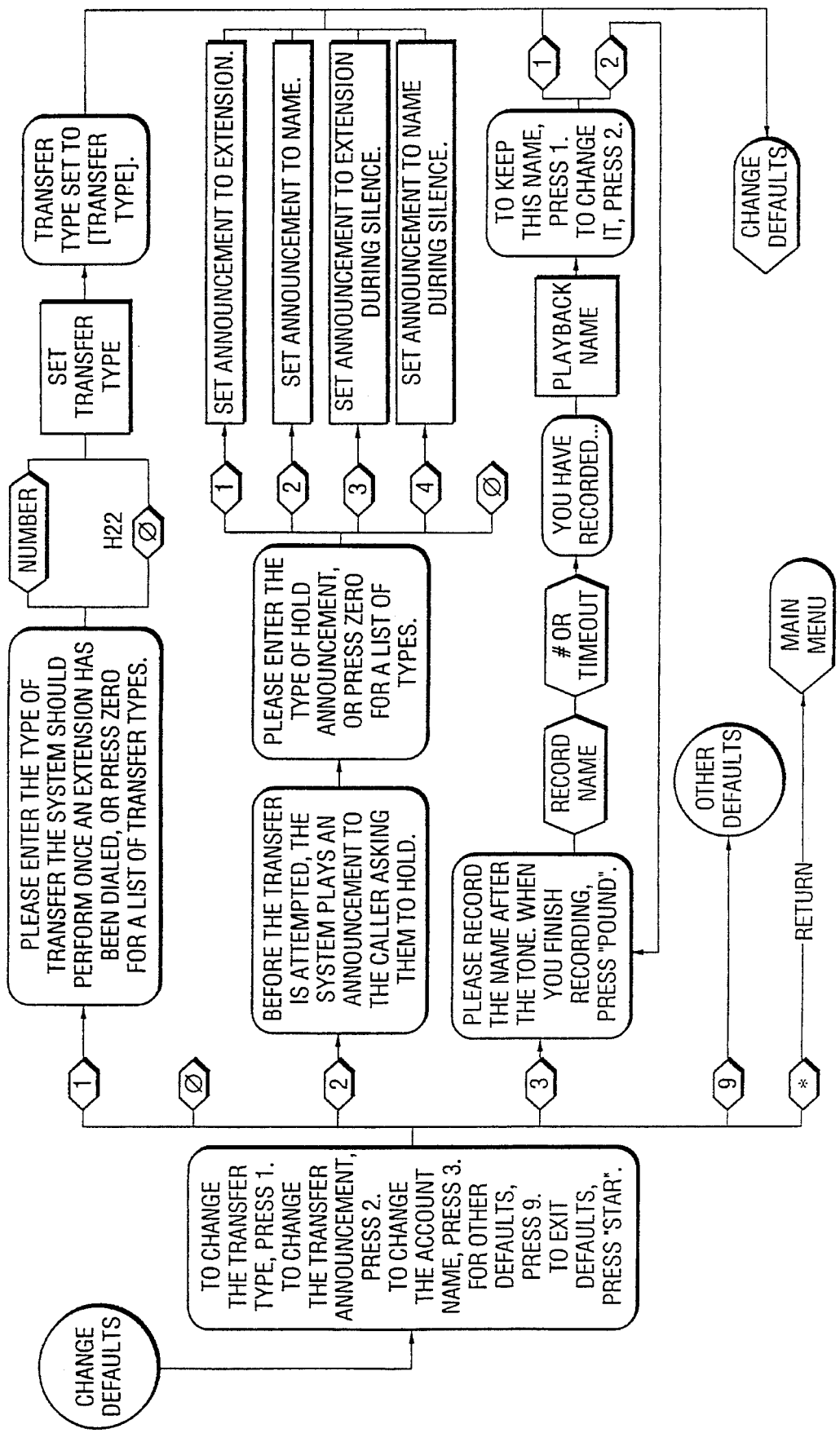
Figure 5Z:
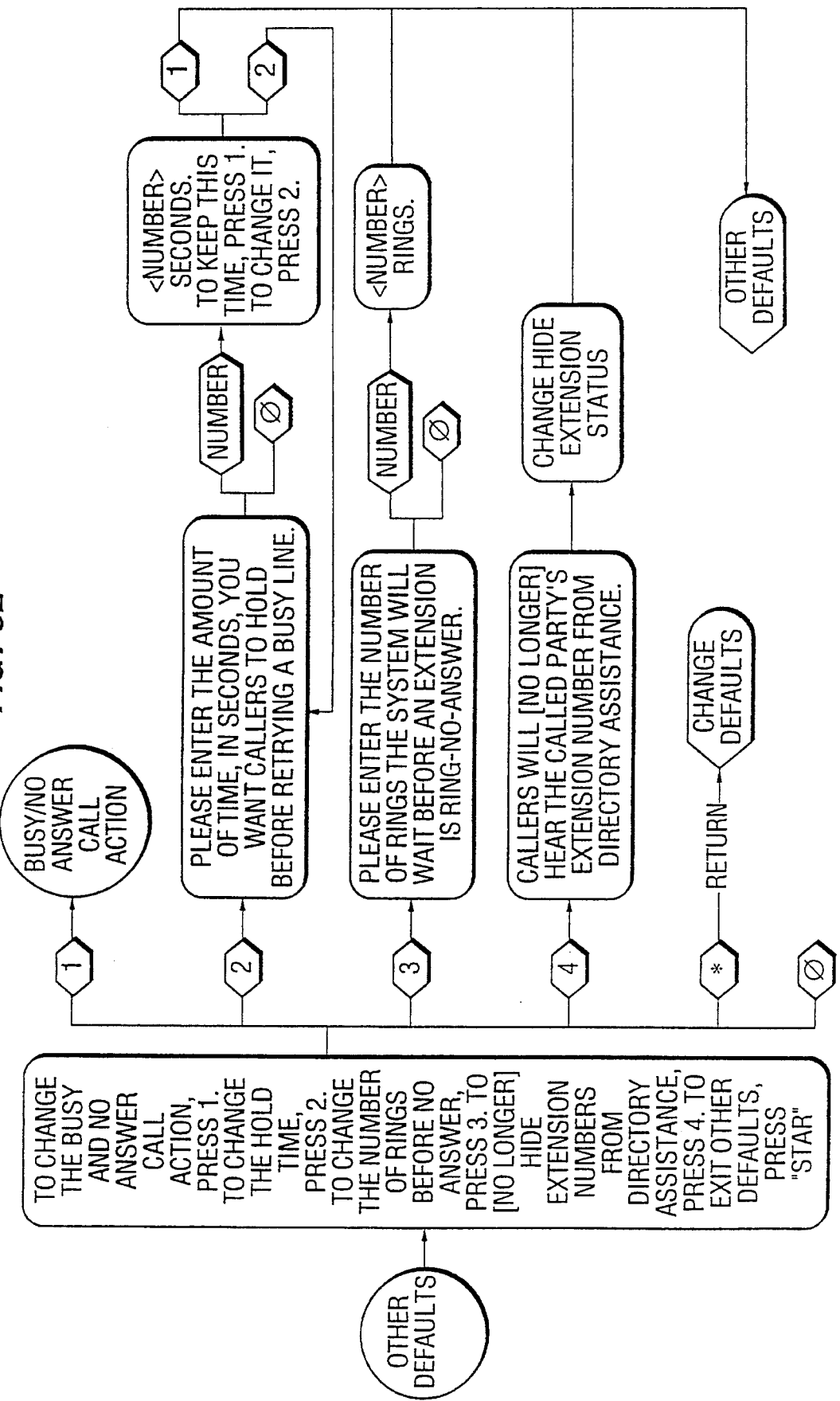
Figure 5A:
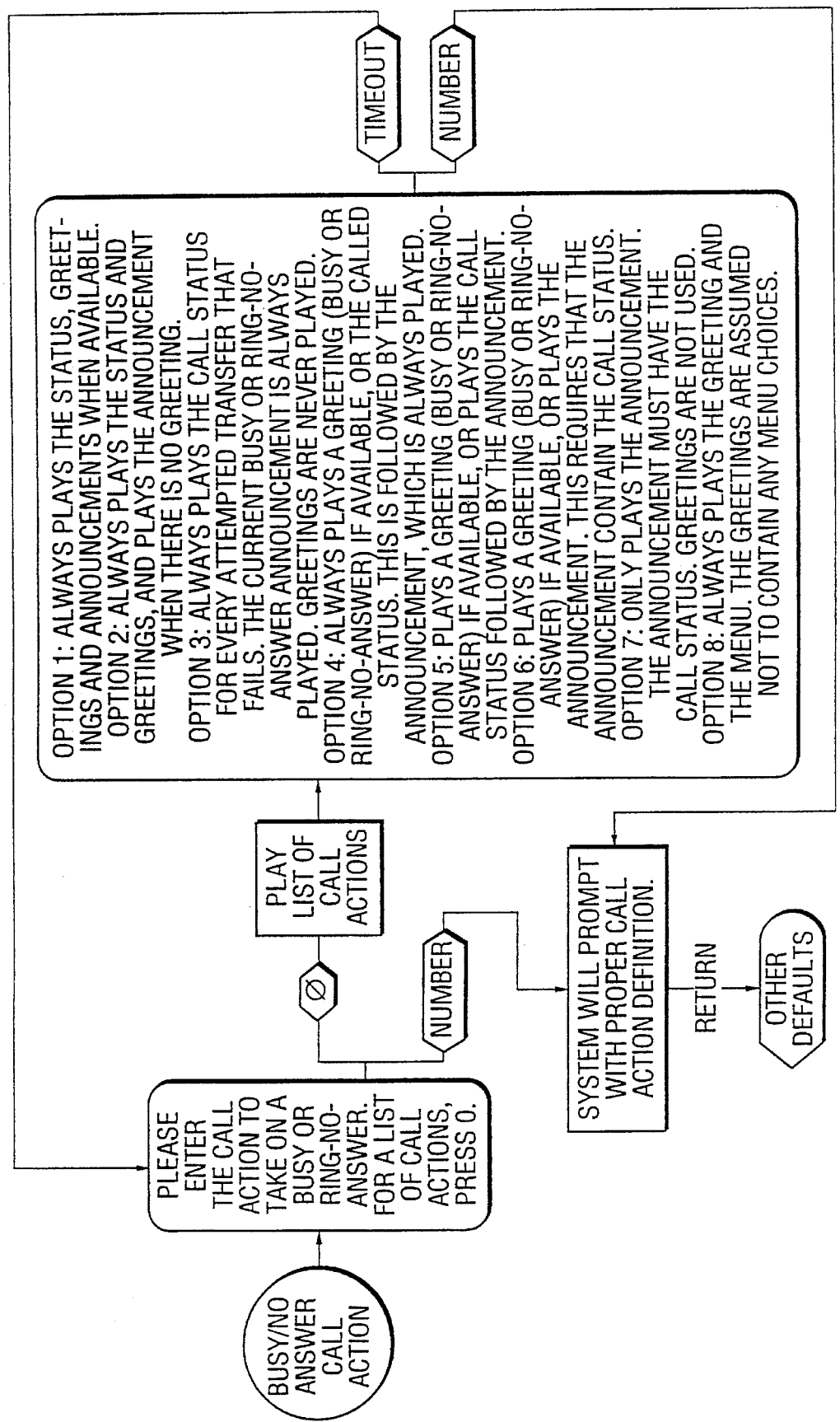

A set of flowcharts illustrating the voice interface for account administrators is provided in FIGS. 5A–5AA. As illustrated in FIG. 5B, if the system administrator does not fill in the account name information in the account defaults 116, the account administrator is required to enter the information before proceeding. In addition, as illustrated in FIG. 5A, an opportunity will be given to initiate the extension specification matrix 114. The main audio menu for the account administrator is illustrated in FIG. 5D and provides access to the extension specification matrix 114, account defaults 116 and announcements and maps 118. In the flowcharts in FIGS. 5B–5AA, the audio prompts are illustrated in rectangular boxes with rounded corners and the f no actions taken in response to possible responses are indicated by elongated hexagons with one of the digits 0–9, "#" or "*".

Figure 6A:
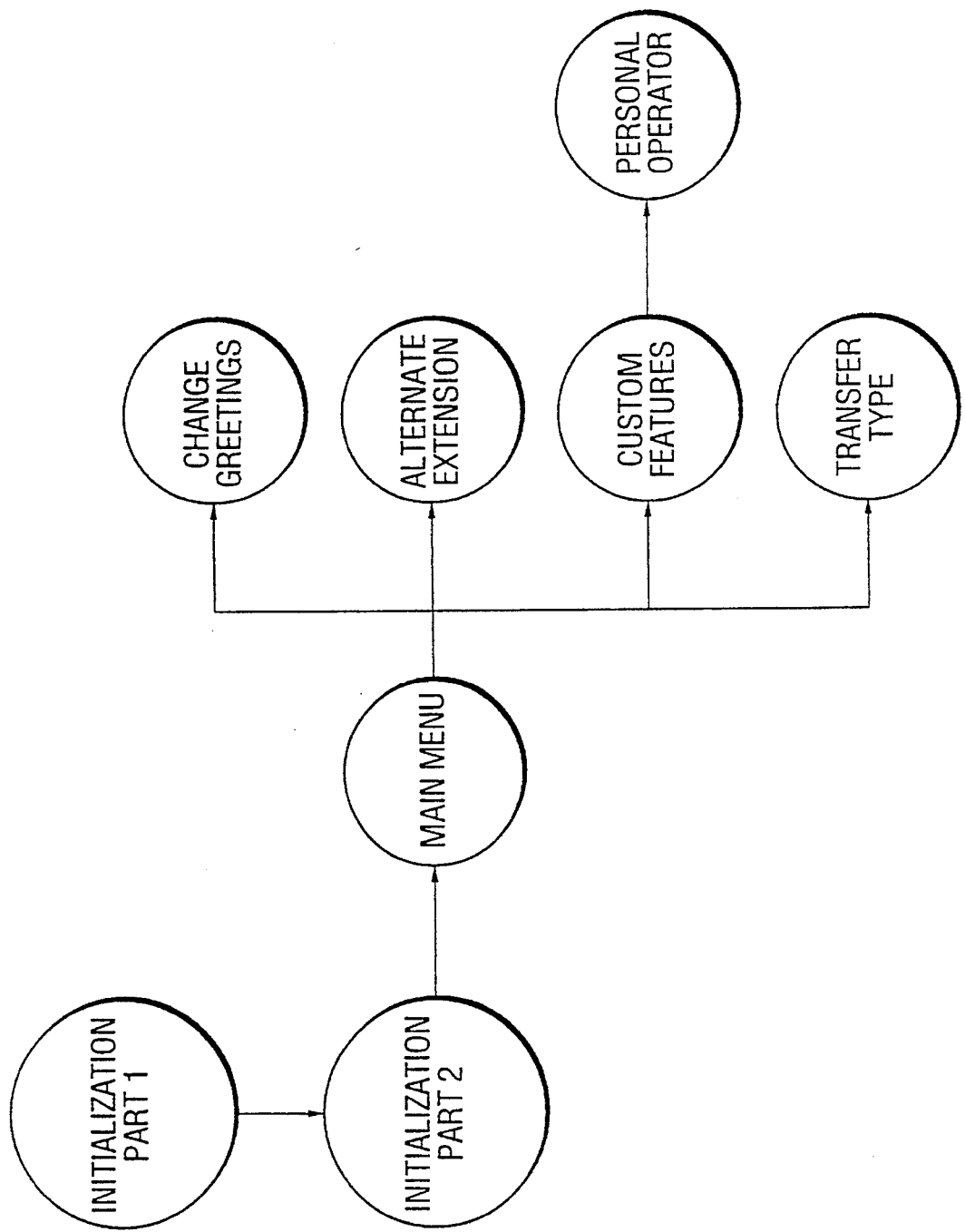
FIGS. 6A–6I are flowcharts of a voice interface between an information services system and a subscriber to an automated attendant service.
Figure 6B:
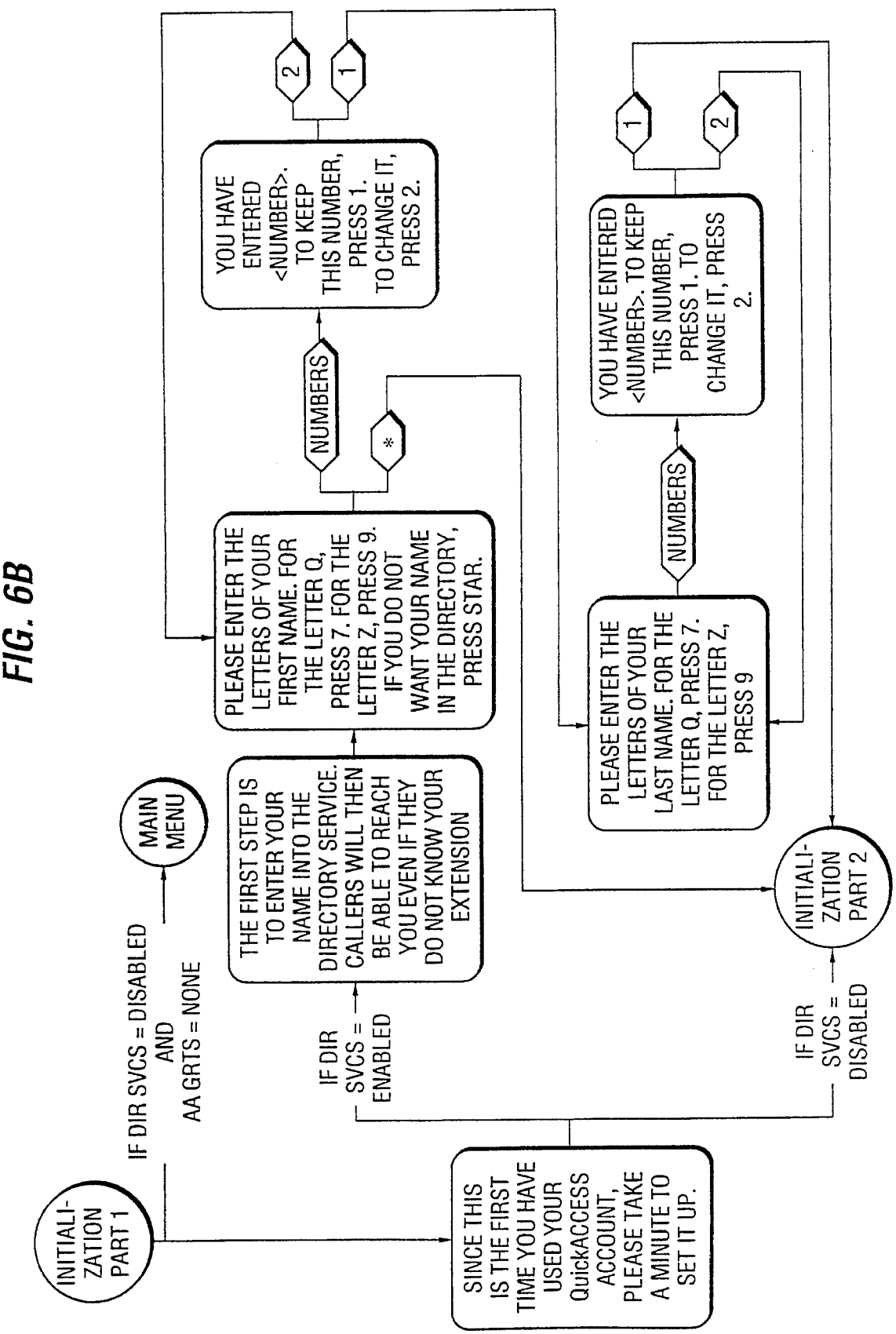
Figure 6C:
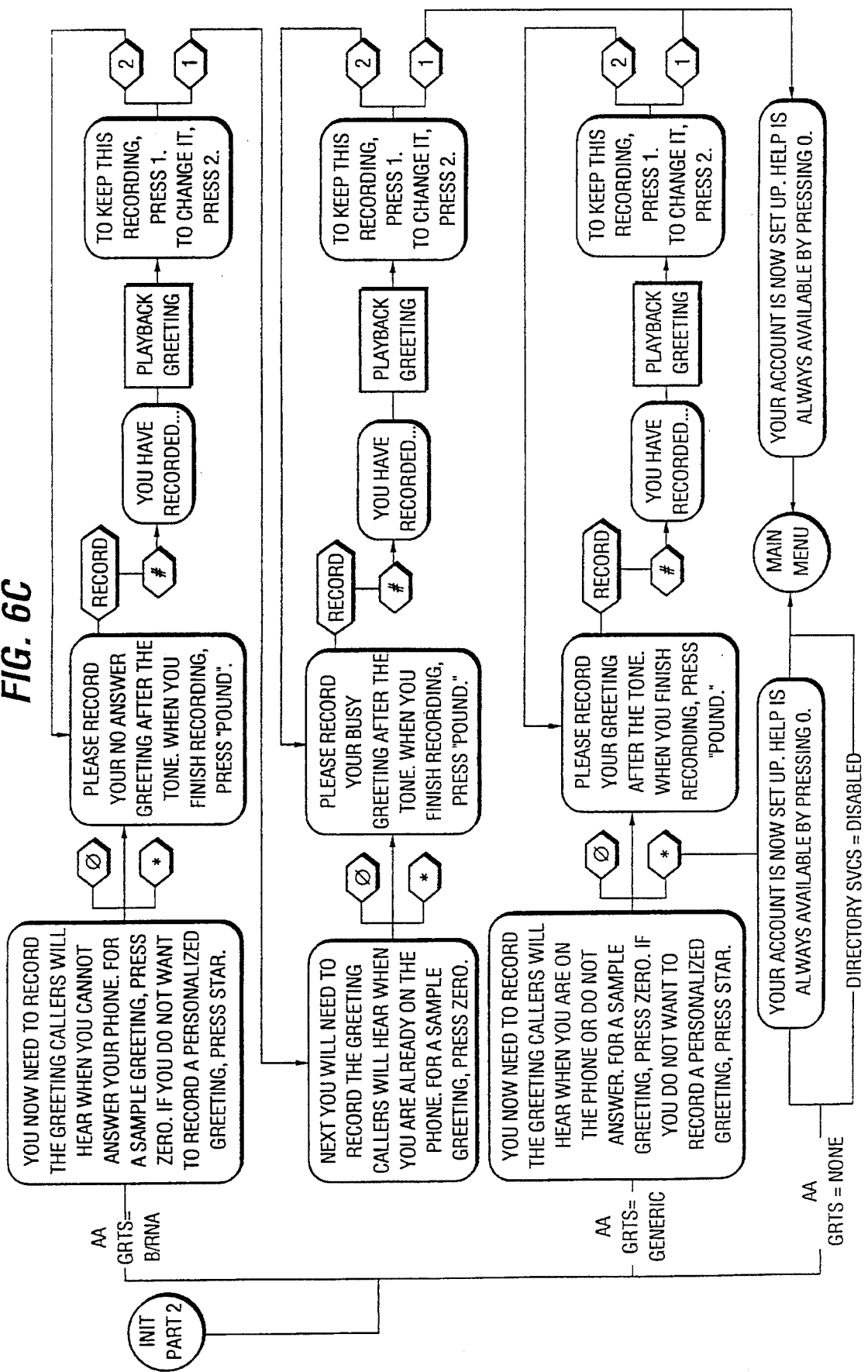
Figure 6D:
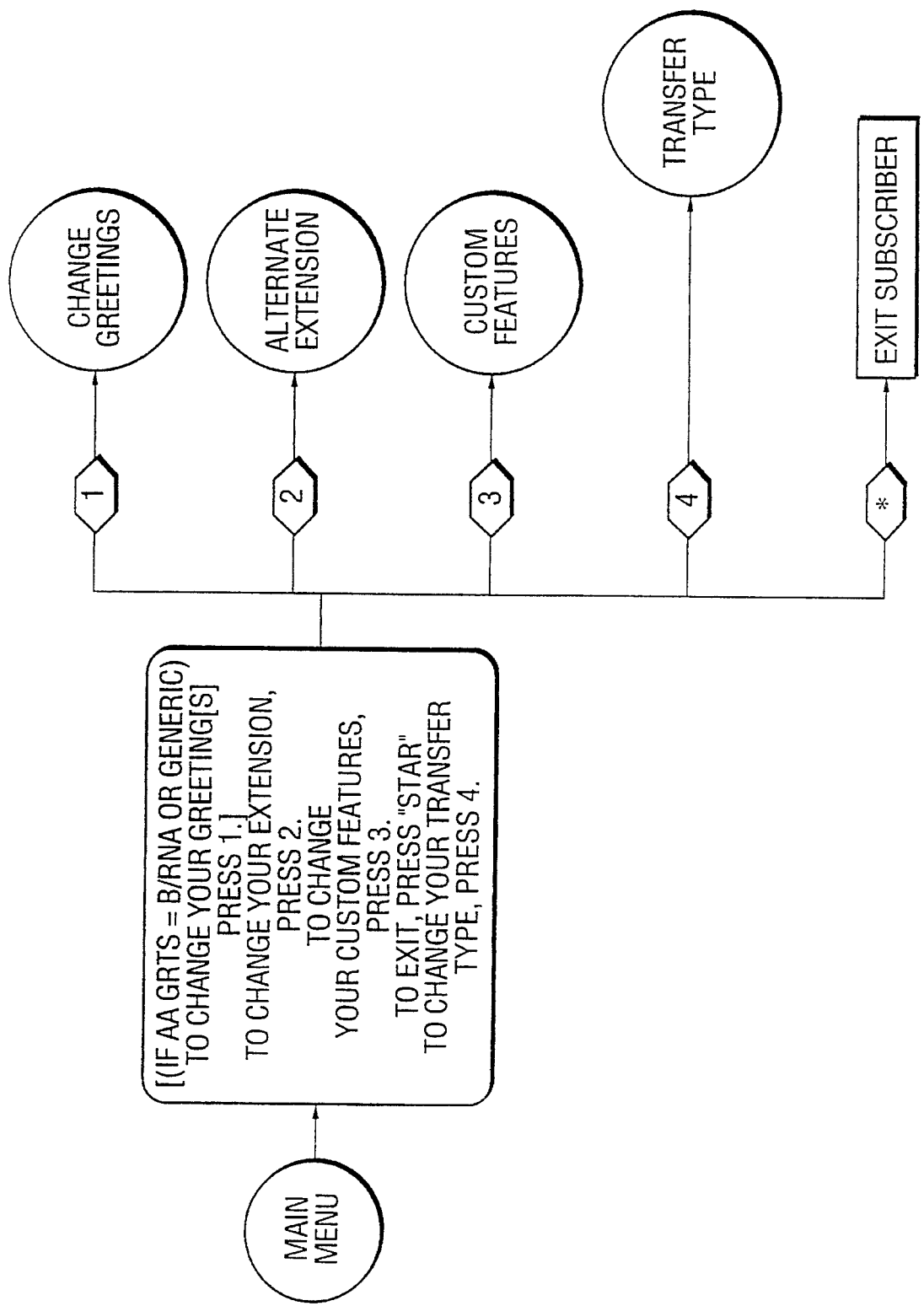
Figure 6E:
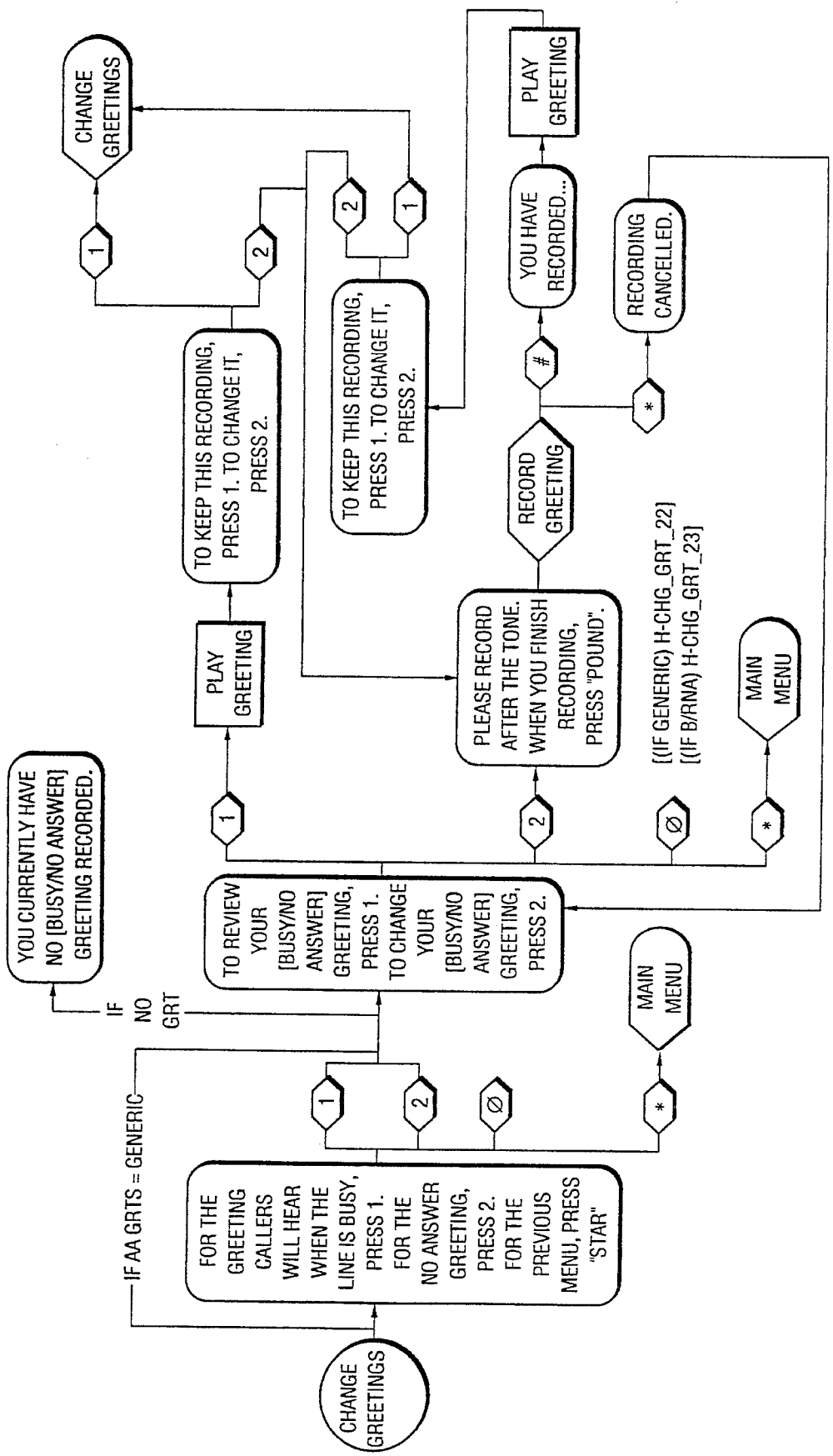
Figure 6F:
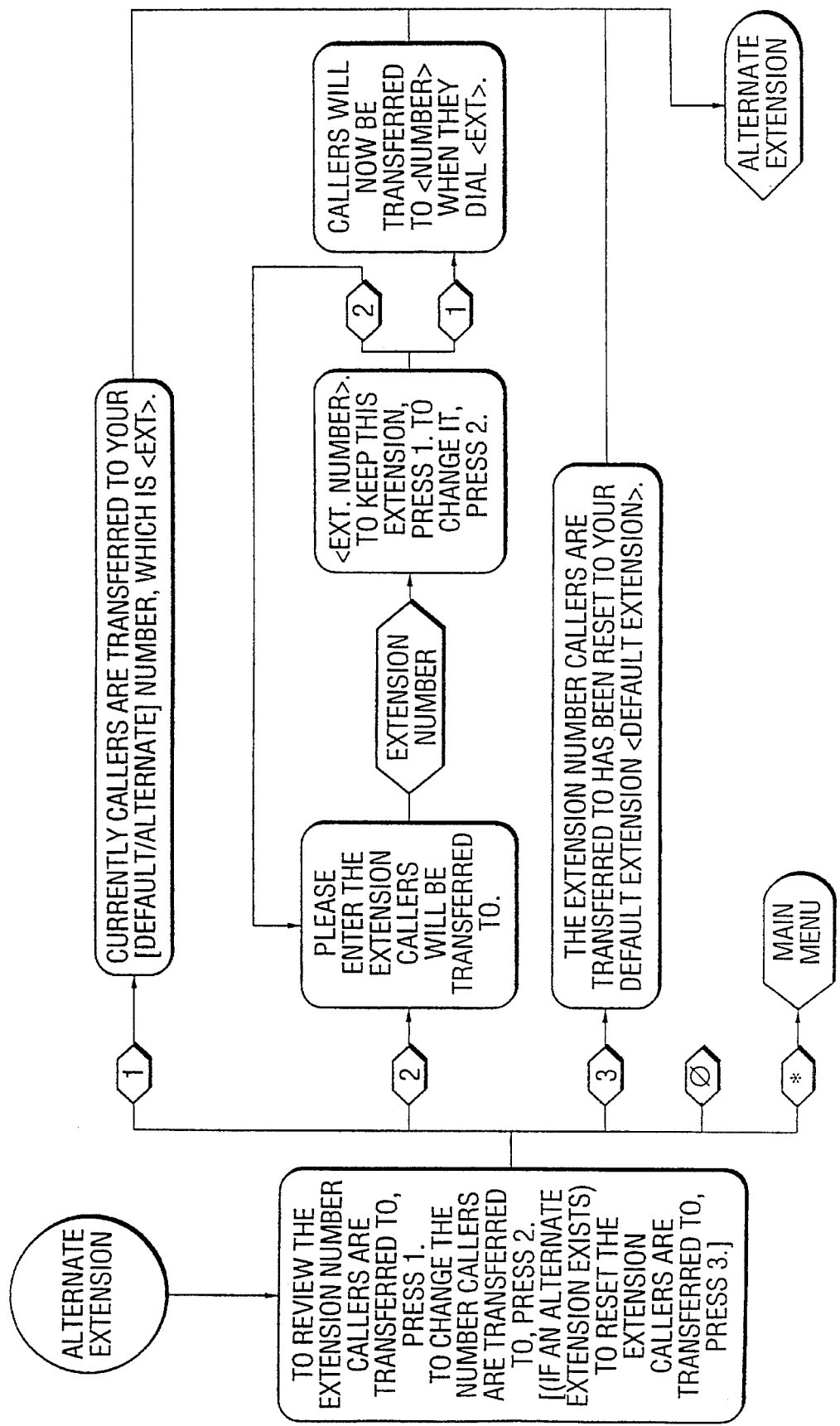
Figure 6G:
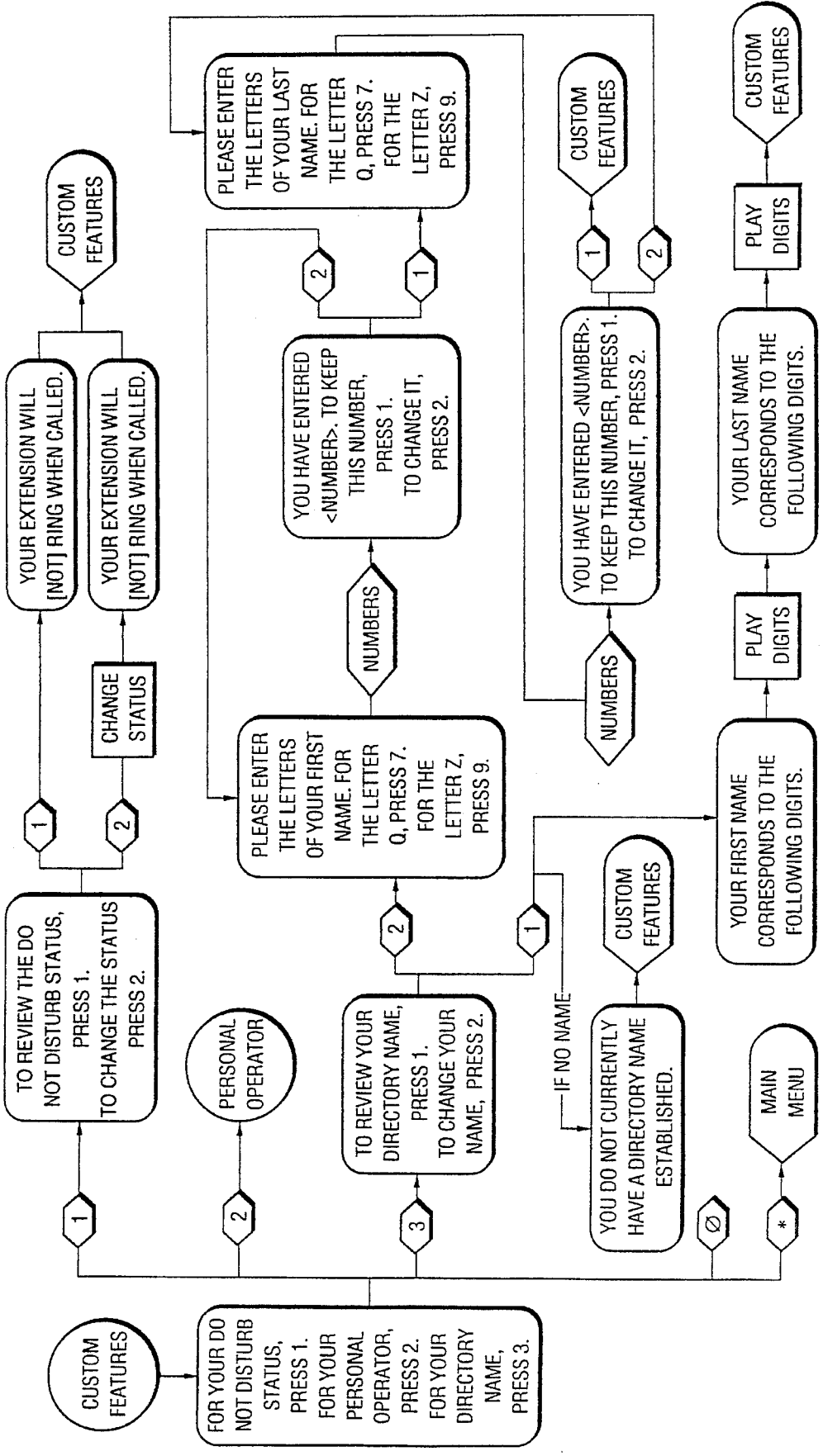
Figure 6H:
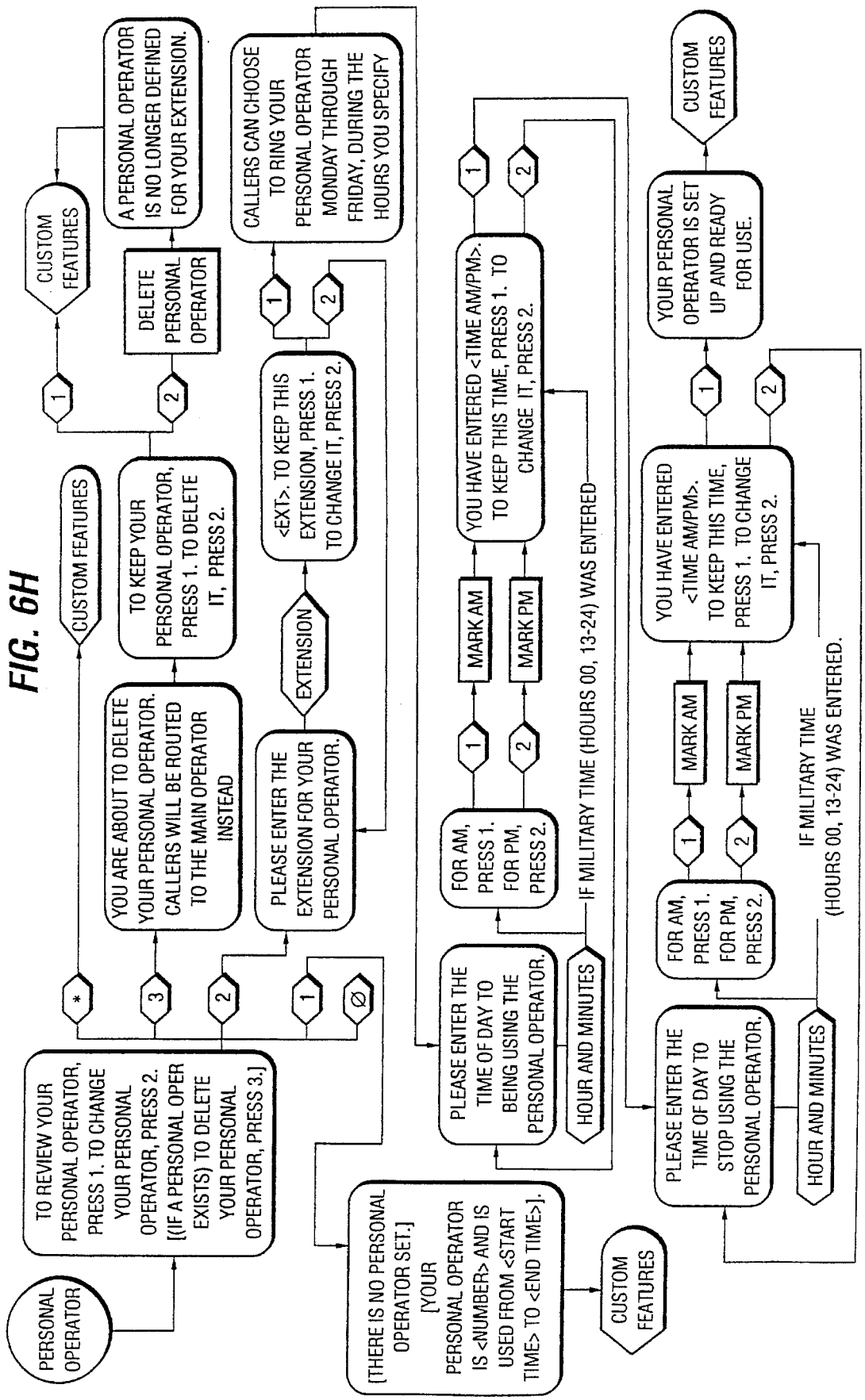
Figure 6I:
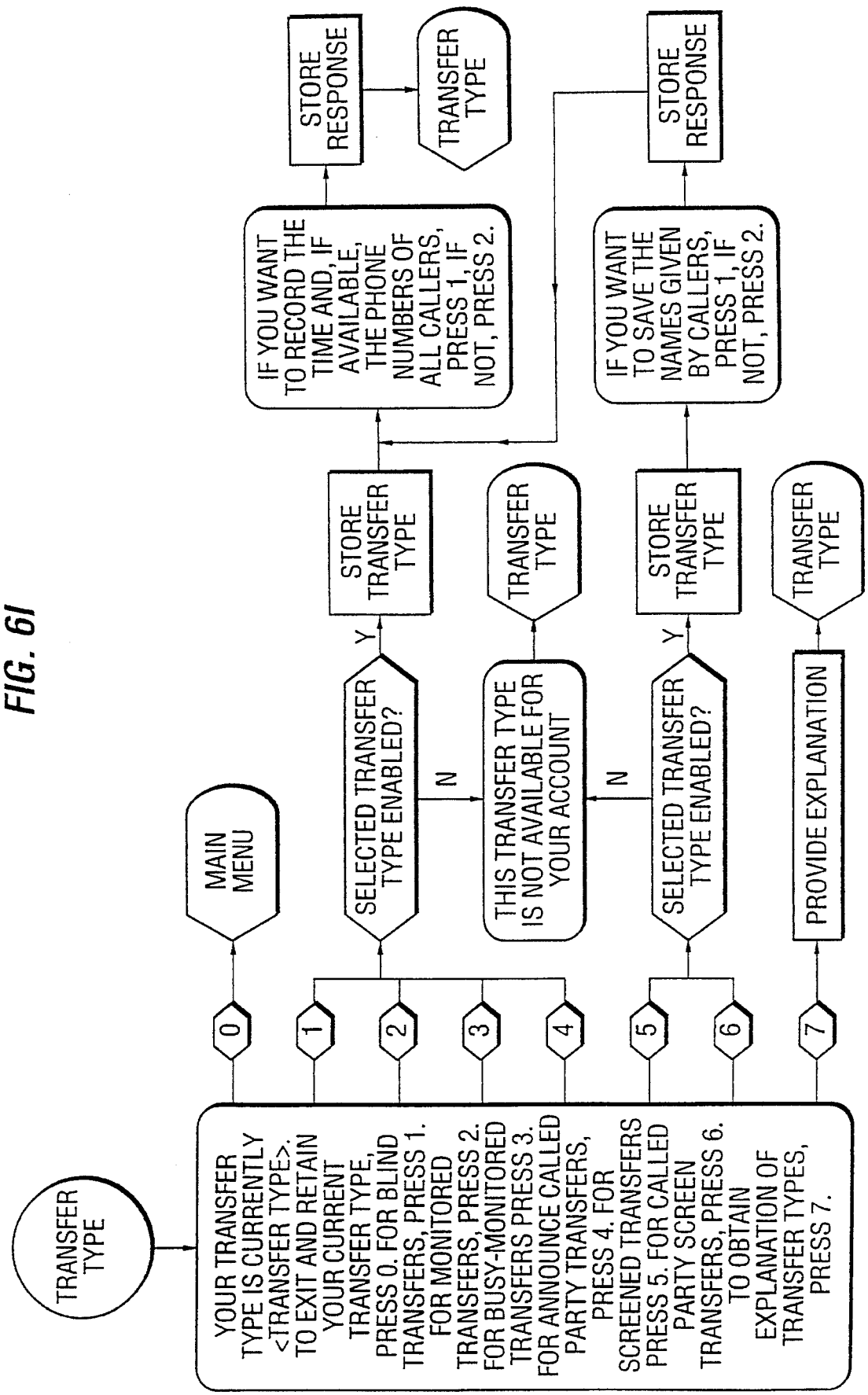

A subscriber accesses the subscriber records 122 via a subscriber account interface having the structure illustrated in FIGS. 6A–6I. As illustrated in FIG. 6A, a subscriber may change the greetings, provide an alternate extension, modify custom features including setting up a personal operator, or specify a transfer type. As illustrated in FIG. 6I, when the "screened" transfers and "called party screen" transfers (types 5 and 6) are selected, the subscriber is given the option to save the names given by the callers, together with any message they may leave. In addition, all transfer types have the option of recording the time and if available, the phone numbers of all callers, regardless of whether they leave a message. In most cases the caller's phone number will be available via the SMDI received via modem 32 (FIG. 1). These two options provide subscribers with the ability to return or at least identify calls even if the caller does not leave a message.

After the database illustrated in FIG. 3 has been set up as described above, the automated attendant service processes calls as illustrated in FIGS. 7A–7J. When a call is received 140 by the information services system 22, the control unit 24 determines 142 whether caller ID information is expected via out-of-band signalling, such as SMDI, for the trunk used by the call. If such information is expected, the control unit 24 waits 144 for five seconds to receive the telephone number of the caller and the number called by the caller from, e.g., SMDI. If the call information is not expected or not received after waiting for five minutes, the caller is connected 146 to a port of one of the APUs 44.

The APU 44 determines 148 whether a direct inward dial (DID) number is expected. If so, the DID address is obtained and resolved 150 into a full address. If a DID number is not expected, the APU determines 152 whether there is a default account for the APU port. When the resolved DID address is invalid and when there is no default account, the caller is requested 154 to input the number dialed in a manner described in more detail below with reference to FIG. 7B. If a valid address is obtained 150 or a default account was found 152, the address is used to read 156 a user record. User records are included for the access numbers, account administrators and subscribers of automated attendant services, e.g., direct inward dial (DID) numbers and CENTREX numbers. There are user records for all services which are stored in one of the MCUs 38, 40, and cached in the APUs 44.

If the call information was obtained in step 144, the APU determines 158 whether the call was forwarded. In the case of a forwarded call, the called party address is resolved 160, otherwise the address of the calling party is resolved 162. The resulting address is used to obtain 164 a user record. If no user record exists when requested in steps 156 or 164, a dialed number inquiry is performed 154. If a user record is found 167 when no caller ID information was available via, e.g., SMDI, or it is determined 168 from the call information that the call was forwarded, processing continues depending upon the services subscribed to by the user, as described below with reference to FIG. 7C. When the call information is available for a call that was not forwarded, the preferred embodiment assumes 170 that the caller is logging into the information services system 22 and gives 172 the caller three attempts to enter a correct password. If the APU 44 determines that a correct password was entered, processing continues in a logged in state as described below with reference to FIG. 7D.

As illustrated in FIG. 7B, when it is necessary to obtain an address from a caller, e.g., when the address resolved in step 150 is invalid, or the APU port does not have a default account, or no user record exists, the caller is prompted 180 to enter a voice mailbox and the digits entered are resolved 182 to form an address. The caller is given 184 three attempts to enter an address which is valid 186 and has a user record 188. After the user record is read 190, it is determined 192 whether the caller indicated a request to be logged in or for additional service.

As illustrated in FIG. 7C, when a caller requests additional service, first it must be determined 200 whether the user identified by the user record, e.g., obtained in one of steps 156, 164 and 190, has automated attendant service. If automated attendant service is not available, the call is processed by voicemail to leave 202 a message for the user, i.e., the called party. If the user record previously obtained has the automated attendant service flag set, it is determined 204 whether the user record is for an access number. If the APU 44 identifies 204 the number called as an automated attendant access number, call processing will be performed by that APU 44. The database for automated attendant services illustrated in FIG. 3 is stored in the control unit 24. The access number table 112 is used to identify the physical switch type and the announcements and maps 118 are read to select an appropriate announcement. A valid access number has a parent account which is loaded 206 and the call is processed as described below with reference to FIG. 7E. If no parent account exists, there is an error in the configuration of the parent automated attendant service and an alarm is issued 208.

If the user record is not for an access number, it is either for a subscriber or an account administrator. Account administrator processing was described above with respect to FIGS. 5A–5AA. If the user record indicates 210 that the number called is for an individual subscriber of an automated attendant service, the subscriber record 122 for the called number is read 212 to obtain the account number of the parent automated attendant account. If no parent account exists, an alarm is issued 214 to indicate that there is an error in the configuration of the automated attendant service. When the parent account is available, the parent account of the subscriber record is loaded 216 to access the extension specification matrix 114 to identify the physical switch type for calls forwarded from the subscriber's telephone number and to select the appropriate announcement as described in more detail below with reference to FIG. 7F.

When it is determined, e.g., at steps 174 or 192, that the caller has properly logged in, the steps illustrated in FIG. 7D are performed. First, it is determined 220 whether the user, i.e., the caller, has voicemail. If so, voicemail service is performed 222 permitting the caller to reproduce, delete, forward, etc. messages stored by others. When voicemail operation is completed, it is determined 224 whether other services are desired. If the user requests other services, or does not subscribe to voicemail, the available services are presented 226 as an audio menu. If no valid choice is made from the menu of services or the caller does not request other services, processing ends 228. When a valid choice is made, the requested service is performed 230.

When a call is received on one of the access numbers, i.e., the parent account has been loaded in step 206, the processing illustrated in FIG. 7E is performed. First, it is determined 232 whether any special flags are set, indicating, e.g., an emergency situation at the offices of the subscribers for the parent account. If no flags are set, a welcome announcement is reproduced 234; otherwise, the appropriate emergency announcement is reproduced 236. After the appropriate greeting announcement has been reproduced 234 or 236, an initial announcement which is determined by time-of-day and day-of-week is loaded 238 and processing continues as described below with respect to FIG. 7G.

When it has been determined 210 that a call is being processed which was originally to a subscriber, the steps illustrated in FIG. 7F are performed prior to the steps illustrated in FIG. 7G. If it is determined 240 that the emergency flag is set, the same emergency announcement reproduced in step 236 is reproduced 242. Regardless of whether the emergency flag is set, a busy/ring-no-answer announcement (determined by time-of-day and day-of-week) is loaded 244 and then processing is continued as described below with respect to FIG. 7G.

The basic caller processing for an automated attendant service according to the present invention is illustrated in FIG. 7G. An appropriate announcement loaded in step 238 or 244 is reproduced 250 and the response by the caller is obtained 252. If it is determined 254 that the response is a valid extension, processing continues as described below with reference to FIG. 7H. If a valid extension is not received in step 252, the response is checked 256 for a valid map choice, i.e., one of the options presented in the announcement reproduced in step 250. If valid, processing continues as described below with reference to FIG. 7I. If no valid extension or map choice was entered, an invalid choice message is reproduced 258.

When it has been determined, e.g., in step 254, that a valid extension has been obtained, the extension specification matrix 114 for the automated attendant service is accessed using the extension number. The extension specification matrix is used to convert 260 the extension number into a phone number that can be output via the digital ports 74 under the control of the CPU 58 and used to identify the subscriber account number for that extension. The corresponding subscriber record 122 is read to determine transfer type, call action scenario, and other information required for handling the transfer. If it is determined 262 that the transfer type is a screened call or a called party screen, the caller is prompted 264 using conventional voice synthesis circuitry in the line card to speak a name which identifies the caller and can be used as a caller announcement.

When the automated attendant service is ready to begin a transfer operation, the switch connecting the caller to the automated attendant service is signalled with the transfer code(s) specified in the transfer start field of the switch configuration 104 identified by the switch identifier in the access number table 112 if the caller directly called the automated attendant service, or in the extension specification matrix 114 if the call was forwarded from a subscriber telephone. This places 266 the caller on hold, so that the APU 44 providing the automated attendant service to the caller can outdial the telephone number obtained from the extension specification matrix 114. If the transfer type obtained from the subscriber record 122 is a blind transfer, the APU 44 providing the automated attendant service will generate an on-hook signal and the caller will be transferred to the extension number and hear the call progress signals. Any of the other transfer types will be performed as described above with respect to FIG. 4A.

The call analysis parameters identified in the switch configuration data 104 for the physical switch type identified in the extension specification matrix 114 for the particular extension dialed (e.g., PBX 15 for extension 12 in FIG. 1) are used to analyze the call progress signals. If the call is answered and the transfer procedure identified by the transfer type determines 268 that the caller should be connected, the APU 44 providing the automated attendant service generates 270 an onhook signal. If the caller is not connected, it is determined 72 whether to save information regarding this call. If the call storage option is enabled in the subscriber record 122, the time and, if available, the caller number are stored 274 as a message for the subscriber by the APU 44 using one of the hard drives 64, 66 or any other conventional way of storing messages. In addition, if the transfer type is one of the two screened transfer types and the subscriber has requested the name storage option, the name given by the caller as a caller announcement is also stored 274 as part of the message.

Figure 7H:
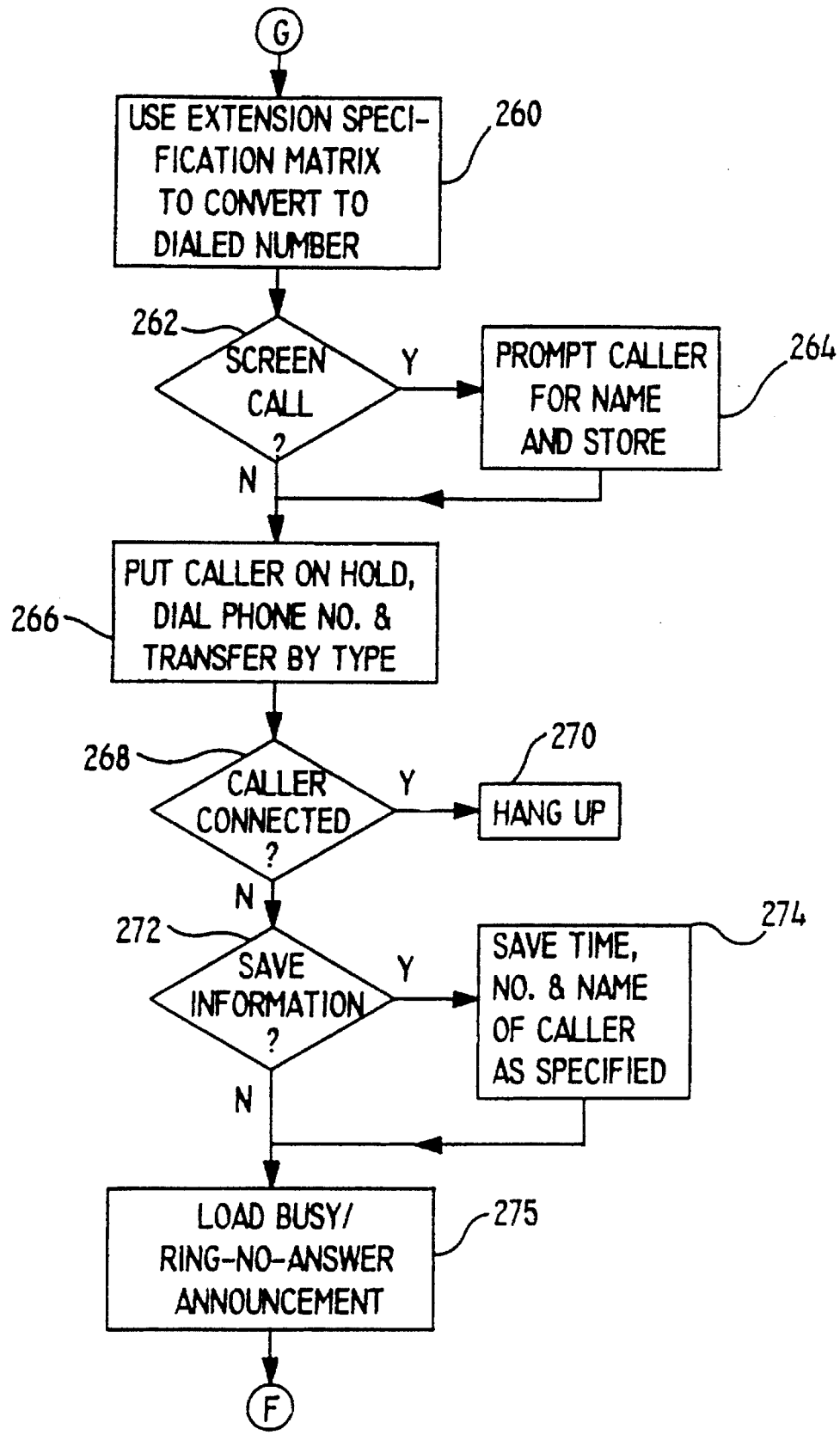
Figure 7:
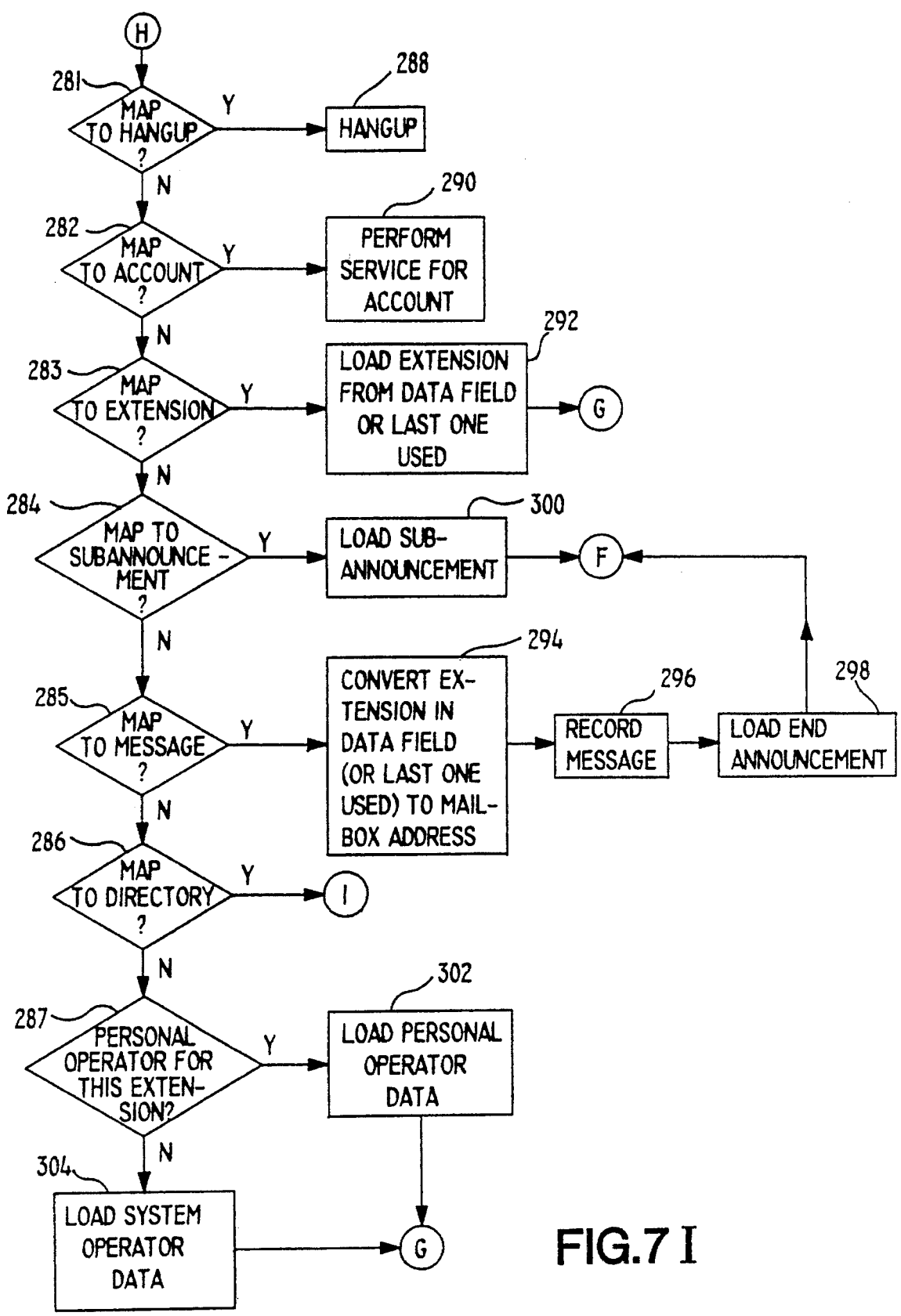

As indicated at the bottom of FIG. 7H, if the caller is not connected (and after saving information on the call, if enabled), a busy/ring-no-answer announcement is loaded 275 and call processing continues with the steps illustrated in FIG. 7G, as described above. Thus, the caller has an opportunity to enter 252 another valid extension in an effort to reach someone else. Whether on the first time that the busy/ring-no-answer announcement is loaded 244 and reproduced 250, or upon a later reproduction of this announcement, the caller may enter another option. These options may be further customized in call action scenarios, one of which must be selected by (or for) a subscriber.

There are many possible call action scenarios defining procedures for failed calls. Preferably a default scenario is defined which does not require any recorded greetings by a subscriber. Some scenarios may include informing the caller of the status of the call, e.g., the extension was busy or was not answered. Other call action scenarios preferably are provided which reproduce a greeting or announcement by the subscriber explaining the status, followed by an announcement 118 requesting that the caller take some action, such as dialing another extension or indicating a desire to leave a message.

The possible actions for a valid announcement choice are indicated in FIG. 7I. When it determined 256 (FIG. 7G) that a valid map choice was entered in response to the announcement reproduced in step 250, a series of tests 281–287 are performed to determine which of the possible choices was indicated by the caller. If the choice of the caller was to hang up, indicated by either an on-hook switch signal or depressing a key, the APU 44 produces 288 an on-hook signal. If a properly authorized caller requests access to an account, the APU 44 loads and executes 290 an application to provide service to the caller.

In addition to allowing a caller to enter 252 any valid extension, automatic transfer to an extension in response to a menu choice is possible by storing the extension number in the data field of the announcement map record. This extension, or the last extension which the caller attempted to reach (if the data field is blank in a busy/ring-no-answer map) is loaded 292 and processing continues with the steps illustrated in FIG. 7H. Similarly, an extension stored in the data field of the announcement map choice for a message action may be converted 294 into a mailbox address, based upon the subscriber record for a subscriber of voicemail services, so that the caller may record 296 a message. After the message has been recorded 296, an end announcement is loaded 298 and processing is continued as illustrated in FIG.

7G. The steps illustrated in FIG. 7G are also performed more directly when a subannouncement is loaded 300 in response to selection of a corresponding menu option by the caller.

In the preferred embodiment, one of the services which may be provided to subscribers of an automated attendant service is the use of a personal operator. If the automated attendant service has been configured to provide this option, a system operator, e.g., a telephone receptionist, is identified in the initial announcement. In addition, each subscriber to an automated attendant service configured in this manner may include a personal operator extension, e.g., the extension of a subscriber's secretary or colleague. If the caller requests transfer to a personal operator, and the subscriber has identified a personal operator, the personal operator data is loaded 302. Otherwise, the default system operator data is loaded 304. In either case, processing continues with the steps illustrated in FIG. 7H.

Figure 7J:
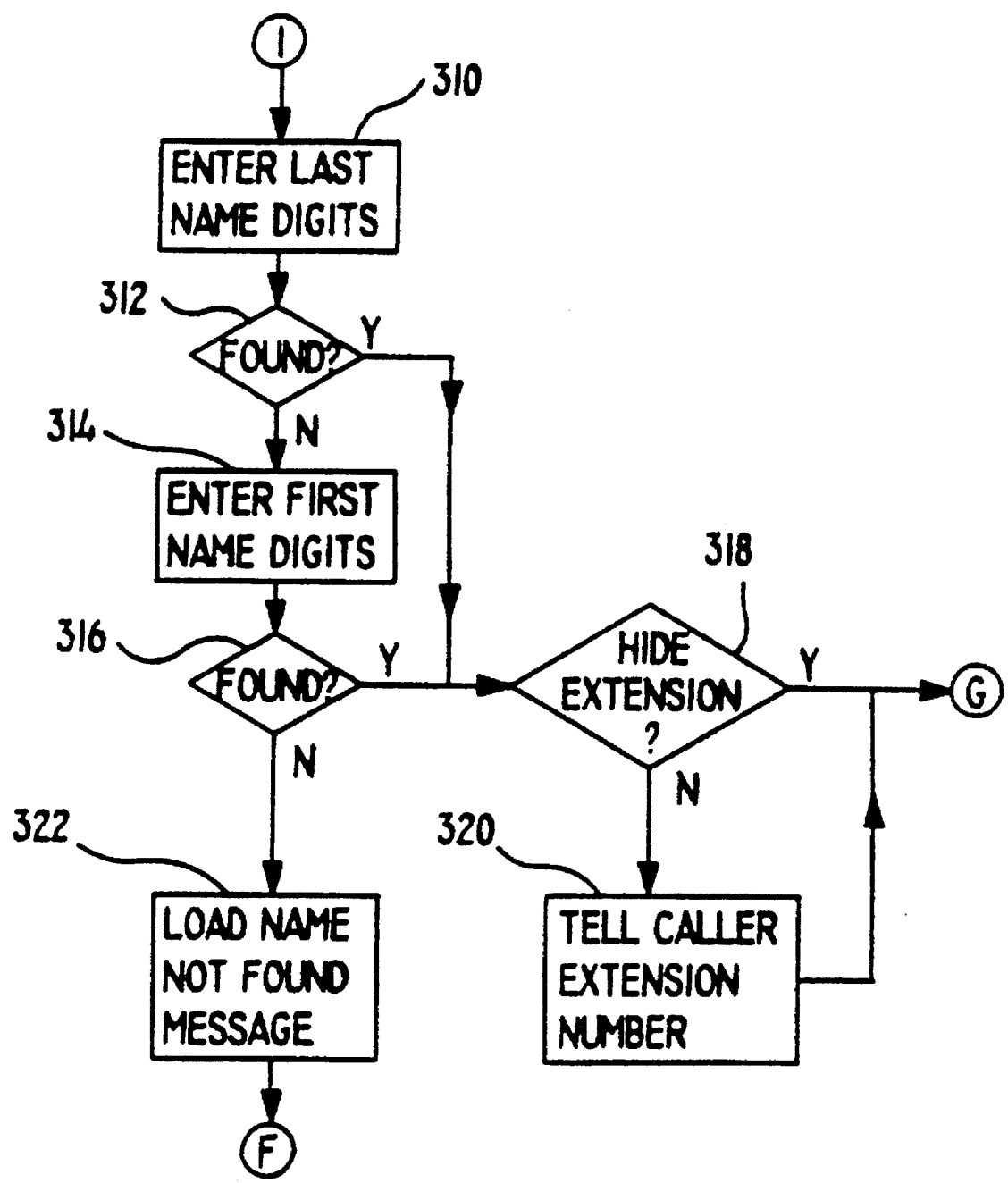

Another possible map destination in the preferred embodiment is access to a directory. If it is determined 286 that the caller has requested access to the directory, the steps illustrated in FIG. 7J are performed. The caller is prompted to enter 310 digits corresponding to the last name. If a match is not found 312 using the last name alone, the caller is prompted to enter 314 digits corresponding to the first name. If a match is found 316 after entry 314 of the first name, or after entry 310 of the last name alone, it is determined 318 whether the subscriber record indicates that the extension should not be given to callers. Ordinarily, the APU 44 will produce 320 a message informing the caller of the name entered and the extension number for future reference. If no name is found in the directory, a name not found message is loaded 322 and processing continues as illustrated in FIG. 7G.

Depending upon how the call and name storage options are implemented (and how many variations are provided), steps 272 and 274 (FIG. 7H) may occur elsewhere in the procedure. For example, if a subscriber wants to be sure that all calls to an extension are recorded and blind transfers are used, the time (and caller number) should be stored as soon as a valid extension number is obtained, e.g., in step 260. If messages are created at this time and successfully connected calls are not to be included, the hangup process, e.g., step 270, may include deleting messages of calls which are determined to be connected for transfer types which continue monitoring until the call is connected. Other times for saving the name of the caller are readily apparent, such as at the time that a message is obtained (or not obtained) in step 222, but it is simplest to save 274 information on a call at the time illustrated in FIG. 7H.

The storage of the time, caller's number and name may be used in other answering systems besides the system of the preferred embodiment. The time and caller number in particular can be stored in any system which has access to such information, even a conventional telephone answering machine for a single telephone. Other caller identification information, including personal identification codes entered using the 12-key keypad of the caller's telephone may also be stored, even if the caller does not leave a message.

As described above, the information saved in step 274 is preferably stored as a message. Thus, the subscriber can access the information in the same manner as used by conventional voice mail messaging systems. In one embodiment of the present invention, any message left by the caller is appended to the caller name and other information. In another embodiment of the present invention, the information saved in step 274 is stored separately, so that if the caller leaves a full message, the subscriber will not have to listen twice to the caller's telephone number and name. In this embodiment, the conventional voice mail messaging process is modified to include a menu option for reproducing the information saved in step 274 corresponding to a message left by the caller to which the subscriber has just listened. In addition, the voice mail messaging menus may include direct access to the "messages" stored in step 274.

The many features and advantages of the present invention are apparent from the detailed specification and thus, it is intended by the appended claims to cover all such features and advantages of the system which fall within the true spirit and scope of the invention. Further, numerous modifications and changes will readily occur to those skilled in the art from the disclosure of this invention. It is not desired to limit the invention to the exact construction and operation illustrated and described; accordingly, suitable modification and equivalents may be resorted to, as falling within the scope and spirit of the invention.

What is claimed is:

1. A database storage device for an automated attendant service, comprising:

access number storage to store an access number table, including at least one access number used to allow direct calls to the automated attendant service and a first switch identifier indicating a physical switch type used for transfers;

matrix storage to store an extension specification matrix correlating extension numbers to telephone numbers and at least one second switch identifier; and switch configuration storaqe to store switch configuration data for each physical switch type accessed by the automated attendant service, including transfer codes and call progress identification data.

2. A database storage device as recited in claim 1, wherein each access number in the access table in said access number storage is unique to the automated attendant service, and wherein the extension and telephone numbers in the extension specification matrix in said matrix storage are not unique to the automated attendant service, but may be stored in another matrix storage for another automated attendant service.

3. A database storage device as recited in claim 1, wherein the extension specification matrix in said matrix storage further stores at least one telephone number for a single-line phone as one of the extension numbers with a public switched telephone network switch identified by the second switch identifier correlated thereto.

4. A database storage device as recited in claim 1, further comprising:

default storaqe to store a default settings file with a record for the automated attendant service, including class of service and response for a failed call to an extension; and account storage to store an account administrators table indicating which users have access to account administration to make changes to the default settings file and perform other administrative duties for an automated attendant account.

5. A database storage device as recited in claim 4, further comprising subscriber storage to store a subscriber file containing records for subscribers, each record including fields for features specific to a subscriber and a subscriber specific response for failed calls to the extension of the subscriber.

6. A method of controlling administration of automated attendant services provided by at least one information services system, comprising the steps of:
  (a) providing access to switch configuration data, including a physical switch type, for each physical switch connecting subscribers of one of the automated attendant services to the information services system;
  (b) providing access to an access number table with at least one access number for each automated attendant service and a first switch identifier indicating the physical switch type used for transfers to and from a corresponding access number; and
  (c) providing access to an extension specification matrix correlating extension numbers to telephone numbers and at least one second switch identifier, for each automated attendant service.

7. A method as recited in claim 6,
  wherein each of said providing in step (a) and said providing in step (b) is performed using a first level of security for a system administrator of the information services system, and
  wherein said providing in step (c) is performed at a second level of security for the system administrator and an account administrator for each automated attendant service.

8. A method as recited in claim 7,
  wherein said providing in step (b) restricts each access number in the access number table to only one of the automated attendant services, and
  wherein said providing in step (c) permits the telephone numbers in the extension specification matrix for one of the automated attendant services to appear in the extension specification matrix for another of the automated attendant services.

9. A method as recited in claim 7, further comprising the step of (d) providing access at a third level of security for the system administrator, the account administrator and subscribers of each automated attendant service to records in a subscriber database defining how calls to the subscribers are handled.

10. A method as recited in claim 9,
  wherein step (a) provides access to the switch configuration data including enablement flags for transfer types, indicating support by the physical switch type corresponding to a set of the enablement flags, and
  wherein step (d) provides access to the records in the subscriber database, including specifying for each of the subscribers one of the transfer types indicated by the switch configuration data and the extension specification matrix as supported by the physical switch connecting a corresponding subscriber to one of the automated attendant services.

11. A method as recited in claim 10,
  wherein step (a) provides access to a screened transfer enablement flag for a screened transfer type, and
  wherein step (d) comprises the steps of:
    (d1) providing access to a selected transfer type to specify the screened transfer type when the corresponding subscriber wants callers to give a name upon reaching one of the automated attendant services; and
    (d2) providing access to a name storage option when the selected transfer type is the screened transfer type, the name storage option including storage of the name given by each of the callers when the corresponding subscriber does not answer.

12. A method as recited in claim 11, wherein step (d) further comprises the step of (d3) providing access to a call storage option for storing time called and, when available, a caller phone number of all calls not answered by the corresponding subscriber.

13. A method of automatically answering telephone calls for subscribers of a first automated attendant service, comprising the steps of:
  (a) obtaining an extension number from a caller using an audio menu to prompt input of the extension number;
  (b) signaling a first physical switch connecting the caller to the first automated attendant service to place the caller on hold;
  (c) calling a telephone corresponding to the extension number input by the caller while the caller is on hold;
  (d) connecting the caller directly to the telephone corresponding to the extension number if said calling in step (c) reaches a called party and an indication is obtained to connect the caller and the called party; and
  (e) performing a failed call procedure if said connecting in step (d) is not performed.

14. A method as recited in claim 13,
  wherein said calling in step (c) includes the steps of:
    (c1) calling one of the extensions of a private business exchange when the extension number is within a range of extension numbers assigned to telephone numbers in the private business exchange; and
    (c2) calling a single-line telephone when the extension number is assigned to the single-line telephone.

15. A method as recited in claim 13,
  wherein said signaling in step (b) comprises the steps of:
    (b1) reading an access number table to identify the first physical switch used by the caller;
    (b2) accessing a switch configuration file to determine at least one transfer code used by the first physical switch; and
    (b3) signaling the first physical switch using at least one of the at least one transfer code determined in step (b2),
  wherein said calling in step (c) comprises the steps of:
    (c1) accessing an extension specification matrix to identify a second physical switch connecting a corresponding automated attendant service to a telephone corresponding to the extension number;
    (c2) accessing a subscriber database to determine a transfer method for transfers to the extension number of a subscriber; and
    (c3) calling a telephone number corresponding to the extension number via the second physical switch identified in step (c1) using the transfer method determined in step (c2), and
  wherein said connecting in step (d) is performed using at least one of the at least one transfer code determined in step (b2).

16. A method as recited in claim 13,
  wherein said calling in step (c) comprises the steps of:
    (c1) accessing an extension specification matrix to identify a second physical switch connecting a second automated attendant service to a telephone corresponding to the extension number;
    (c2) accessing a subscriber database to determine a transfer method for transfers to the extension number of a subscriber; and
    (c3) calling a telephone number corresponding to the extension number via the second physical switch identified in step (c1) using the transfer method determined in step (c2), and wherein the failed call procedure in step (e) comprises:

(e1) accessing the extension specification matrix to identify the first physical switch connecting the caller to the first automated attendant service from a failed direct-inward-dialed telephone call to one of the subscribers of the first automated attendant service;

(e2) reproducing an announcement informing the caller of lack of connection and presenting further options after removing the caller from hold;

(e3) receiving a response from the caller; and (e4) performing further processing in dependence upon the response received in step (e3), including signaling the first physical switch to place the caller on hold and outdialling a new extension, if requested by the caller.

17. An apparatus for automatically answering telephone calls to a telephone of a subscriber of an automated attendant service, comprising:

caller interface means for obtaining an extension number from a caller using an audio menu to prompt input of the extension number;

signal means for signaling a first physical switch connecting the caller to the automated attendant service to place the caller on hold;

out-dialing means for calling the telephone corresponding to the extension number input by the caller while the caller is on hold; and control means for controlling said signal means to connect the caller directly to the telephone corresponding to the extension number if said calling means obtains an answer from a called party and an indication is received to connect the caller and the called party, and otherwise controlling said caller interface means to perform a failed call procedure.

* * * * *